(12) United States Patent
Lui

(10) Patent No.: US 11,645,873 B1
(45) Date of Patent: May 9, 2023

(54) SYSTEMS, MEDIA, AND METHODS PROVIDING A GOLF SWING COACH

(71) Applicant: 18Birdies LLC, Oakland, CA (US)

(72) Inventor: Pun Leung Eddy Lui, Piedmont, CA (US)

(73) Assignee: 18BIRDIES LLC, Oakland, CA (US)

( * ) Notice: Subject to any disclaimer, the term of this patent is extended or adjusted under 35 U.S.C. 154(b) by 246 days.

(21) Appl. No.: 17/207,285

(22) Filed: Mar. 19, 2021

Related U.S. Application Data

(60) Provisional application No. 62/992,575, filed on Mar. 20, 2020.

(51) Int. Cl.
*G06V 40/20* (2022.01)
*G06T 7/246* (2017.01)
*G06T 7/00* (2017.01)
*A63B 71/06* (2006.01)
*A63B 24/00* (2006.01)
*A63B 69/36* (2006.01)
*G06V 20/40* (2022.01)

(52) U.S. Cl.
CPC .......... *G06V 40/23* (2022.01); *A63B 24/0003* (2013.01); *A63B 69/3623* (2013.01); *A63B 71/0622* (2013.01); *G06T 7/0002* (2013.01); *G06T 7/251* (2017.01); *G06V 20/42* (2022.01); *G06V 20/47* (2022.01); *A63B 2220/05* (2013.01); *A63B 2220/806* (2013.01); *G06T 2200/24* (2013.01); *G06T 2207/10016* (2013.01); *G06T 2207/30224* (2013.01)

(58) Field of Classification Search
CPC ........ G06V 40/23; G06V 20/42; G06V 20/47; G06T 7/251; G06T 2200/24; G06T 2207/10016; G06T 2207/30224; A63B 24/003; A63B 69/3623; A63B 71/0622; A63B 2220/05; A63B 2220/806
USPC .......................................................... 434/252
See application file for complete search history.

(56) References Cited

U.S. PATENT DOCUMENTS

| | | | |
|---|---|---|---|
| 8,597,142 B2 * | 12/2013 | Mayles | A63F 13/213 473/226 |
| 9,604,142 B2 * | 3/2017 | Bentley | A63B 24/0006 |
| 10,213,645 B1 * | 2/2019 | Wu | A63B 24/0006 |
| 10,373,520 B1 * | 8/2019 | Jaure | A63B 69/3621 |
| 10,529,137 B1 | 1/2020 | Black et al. | |
| 2002/0114493 A1 | 8/2002 | McNitt et al. | |
| 2002/0115046 A1 | 8/2002 | McNitt et al. | |

(Continued)

*Primary Examiner* — Jay Trent Liddle
*Assistant Examiner* — Alyssa N Brandley
(74) *Attorney, Agent, or Firm* — Wilson Sonsini Goodrich & Rosati

(57) ABSTRACT

Described herein are platforms, systems, media, and methods for providing golf swing analysis and coaching by receiving a video of an individual performing a golf swing; applying an image processing algorithm to identify a plurality of body nodes of the individual in a plurality of frames of the video and generate a virtual skeleton by connecting the plurality of body nodes in the plurality of frames of the video; identifying a plurality of key frames of the video; applying at least one mathematical swing flaw evaluation to each key frame of the video to identify any swing flaws of the individual; generating a swing score for the individual; and providing access to one or more training modules based at least on any swing flaws of the individual identified and the swing score for the individual.

21 Claims, 60 Drawing Sheets

(56) References Cited

U.S. PATENT DOCUMENTS

| | | | |
|---|---|---|---|
| 2003/0031358 A1 | 2/2003 | Truxa et al. | |
| 2005/0054457 A1* | 3/2005 | Eyestone | A63B 60/16 |
| | | | 473/131 |
| 2006/0040755 A1 | 2/2006 | Choi | |
| 2006/0247070 A1* | 11/2006 | Funk | A63B 69/3623 |
| | | | 473/222 |
| 2006/0252018 A1* | 11/2006 | Sooch | A63B 69/3614 |
| | | | 434/252 |
| 2007/0238538 A1 | 10/2007 | Priester | |
| 2010/0277470 A1* | 11/2010 | Margolis | G06T 7/251 |
| | | | 348/135 |
| 2012/0143358 A1* | 6/2012 | Adams | G06F 3/0482 |
| | | | 700/92 |
| 2013/0102419 A1 | 4/2013 | Jeffery et al. | |
| 2013/0178304 A1 | 7/2013 | Chan | |
| 2014/0100050 A1* | 4/2014 | Ota | A63B 69/3632 |
| | | | 473/409 |
| 2014/0177926 A1* | 6/2014 | Nojima | G06T 7/246 |
| | | | 382/107 |
| 2015/0231477 A1 | 8/2015 | Jeffery et al. | |
| 2017/0270354 A1 | 9/2017 | Painter | |
| 2018/0053308 A1* | 2/2018 | Maani | G06T 7/251 |
| 2018/0177450 A1 | 6/2018 | Hansen et al. | |
| 2019/0224528 A1* | 7/2019 | Omid-Zohoor | A61B 5/0024 |
| 2019/0325206 A1 | 10/2019 | Painter | |
| 2019/0388730 A1* | 12/2019 | Shibuya | A63B 60/46 |
| 2020/0222757 A1* | 7/2020 | Yang | G09B 19/0038 |

\* cited by examiner

SYSTEMS, MEDIA, AND METHODS PROVIDING A GOLF SWING COACH

CROSS-REFERENCE TO RELATED APPLICATIONS

This application claims the benefit of U.S. Application No. 62/992,575, filed on Mar. 20, 2020, entitled "Systems, Media, And Methods Providing A Golf Swing Coach," the contents of which is incorporated herein by reference in its entirety for all purposes.

BACKGROUND

The modern game of golf originated in 15th century Scotland. However, current computing technology has enabled new possibilities for improving golf play.

SUMMARY

Described herein is a mobile-based golf swing analyzer framework which applies image processing technology to analyze golf swing video and apply a standardized rating system to score the performance of a golfer and furthermore generate a detailed report and personalized drill plan for improving and practicing. The mobile-based golf swing analyzer framework described herein solves multiple major problems of existing technologies.

First, existing technologies often require one or more motion sensors applied to a glove or a club to trace the swing based on movement data acquired by the sensors. Moreover, some existing technologies require hardware such as high-speed cameras to facilitate the swing tracing process. In contrast to these existing systems, the subject matter provided herein requires only a mobile device/app for the golfer to access useful data from a golf swing video.

Second, current technologies mostly focus on one node (hand, club, or ball) and data is limited to, for example, speed or angle of a sensor associated with that one node. Additionally, the data merely result data; the golfer is provided no insight on what happened during the swing process that lead to the result data. The subject matter provided herein, on the other hand, applies image processing algorithms to recognize multiple different body nodes and a resultant virtual skeleton, based on those data, the subject matter provided herein creates a complete model of the body during the entire swing process.

In one aspect, disclosed herein are computer-implemented platforms comprising a client device and a back-end computing infrastructure: the client device comprising at least one processor and instructions executable to cause the client device to perform at least the following: capture a video of an individual performing a golf swing; and upload the video to the back-end computing infrastructure; the back-end computing infrastructure comprising at least one processor and instructions executable to cause the back-end computing infrastructure to perform at least the following: receive the video uploaded by the client device; apply an image processing algorithm to perform at least: identify a plurality of body nodes of the individual in a plurality of frames of the video; and generate a virtual skeleton by connecting the plurality of body nodes in the plurality of frames of the video; identify a plurality of key frames of the video; apply at least one mathematical swing flaw evaluation to each key frame of the video to identify any swing flaws of the individual; generate a swing score for the individual; and provide access to one or more training modules based at least on any swing flaws of the individual identified and the swing score for the individual. In some embodiments, the video is captured from a down-the-line perspective. In other embodiments, the video is captured from a face-on perspective. In some embodiments, the back-end computing infrastructure is configured to perform data compression processing on the video uploaded by the client device. In some embodiments, the back-end computing infrastructure is configured to persist video data pertaining to the video uploaded by the client device to a data storage system. In some embodiments, the plurality of body nodes comprise one or more of: nose, neck, mid hip, right ear, right eye, right shoulder, right elbow, right wrist, right hip, right knee, right ankle, left ear, left eye, left shoulder, left elbow, left wrist, left hip, left knee, and left ankle. In various embodiments, the plurality of body nodes comprise at least 10, at least 15, at least 20, or at least 25 body nodes. In some embodiments, the back-end computing infrastructure is configured to identify one or more of a golf club head and a golf club shaft in a plurality of frames of the video. In some embodiments, the back-end computing infrastructure is configured to identify a golf ball in a plurality of frames of the video. In some embodiments, the back-end computing infrastructure is configured to identify three key frames of the video. In some embodiments, the plurality of key frames are identified at least in part by generating a function graph of distance from wrist body node to heel body node vs. video frame. In particular embodiments, the plurality of key frames comprise: a set-up frame, a top of back-swing frame, and an impact frame. In further embodiments, the at least one mathematical swing flaw evaluation applied to the set-up frame comprises one or more of: a shaft plane evaluation, a spine angle evaluation, a stance width evaluation, and a hand position evaluation. In further embodiments, the at least one mathematical swing flaw evaluation applied to the top of back- swing frame comprises one or more of: a head movement evaluation, a spine angle evaluation, a posterior position evaluation, a hip sway evaluation, and a hip rotation evaluation. In further embodiments, the at least one mathematical swing flaw evaluation applied to the impact frame comprises one or more of: a head movement evaluation, a spine angle evaluation, a posterior position evaluation, a hand placement evaluation, a hip rotation evaluation, and a hip sway evaluation. In some embodiments, the back-end computing infrastructure is configured to calculate a swing tempo based at least in part on the plurality of body nodes in the plurality of frames of the video. In further embodiments, the at least one mathematical swing flaw evaluation comprises a swing tempo evaluation. In various embodiments, the at least one mathematical swing flaw evaluation comprises at least 10 or at least 15 mathematical swing flaw evaluations. In some embodiments, the swing score comprises one or more of: a rhythm score, a stability score, an impact score, and an overall score. In some embodiments, the back-end computing infrastructure is configured to generate a list of one or more ranked swing flaws. In further embodiments, the one or more training modules address the one or more ranked swing flaws in rank order. In some embodiments, the one or more training modules comprise an instructional video. In some embodiments, the one or more training modules comprise one or more drills.

In another, yet related aspect, disclosed herein are computer-implemented methods for providing golf swing analysis and coaching comprising: receiving a video of an individual performing a golf swing; applying an image processing algorithm to perform at least: identify a plurality of body nodes of the individual in a plurality of frames of the video; and generate a virtual skeleton by connecting the plurality of body nodes in the plurality of frames of the video; identifying a plurality of key frames of the video; applying at least one mathematical swing flaw evaluation to each key frame of the video to identify any swing flaws of the individual; generating a swing score for the individual; and providing access to one or more training modules based at least on any swing flaws of the individual identified and the swing score for the individual. In some embodiments, the video has a down-the-line perspective. In other embodiments, the video has a face-on perspective. In some embodiments, the method further comprises performing data compression processing on the received video. In some embodiments, the method further comprises persisting video data pertaining to the received video to a data storage system. In some embodiments, the plurality of body nodes comprise one or more of: nose, neck, mid hip, right ear, right eye, right shoulder, right elbow, right wrist, right hip, right knee, right ankle, left ear, left eye, left shoulder, left elbow, left wrist, left hip, left knee, and left ankle. In various embodiments, the plurality of body nodes comprise at least 10, at least 15, at least 20, or at least 25 body nodes. In some embodiments, the method further comprises identifying one or more of a golf club head and a golf club shaft in a plurality of frames of the video. In some embodiments, the method further comprises identifying a golf ball in a plurality of frames of the video. In some embodiments, identifying a plurality of key frames of the video comprises identifying three key frames of the video. In some embodiments, the plurality of key frames are identified at least in part by generating a function graph of distance from wrist body node to heel body node vs. video frame. In particular embodiments, the plurality of key frames comprise: a set-up frame, a top of back-swing frame, and an impact frame. In further embodiments, the at least one mathematical swing flaw evaluation applied to the set-up frame comprises one or more of: a shaft plane evaluation, a spine angle evaluation, a stance width evaluation, and a hand position evaluation. In further embodiments, the at least one mathematical swing flaw evaluation applied to the top of back-swing frame comprises one or more of: a head movement evaluation, a spine angle evaluation, a posterior position evaluation, a hip sway evaluation, and a hip rotation evaluation. In further embodiments, the at least one mathematical swing flaw evaluation applied to the impact frame comprises one or more of: a head movement evaluation, a spine angle evaluation, a posterior position evaluation, a hand placement evaluation, a hip rotation evaluation, and a hip sway evaluation. In some embodiments, the method further comprises calculating a swing tempo based at least in part on the plurality of body nodes in the plurality of frames of the video. In some embodiments, the at least one mathematical swing flaw evaluation comprises a swing tempo evaluation. In various embodiments, the at least one mathematical swing flaw evaluation comprises at least 10 or at least 15 mathematical swing flaw evaluations. In some embodiments, the swing score comprises one or more of: a rhythm score, a stability score, an impact score, and an overall score. In some embodiments, the method further comprises generating a list of one or more ranked swing flaws. In further embodiments, the one or more training modules address the one or more ranked swing flaws in rank order. In some embodiments, the one or more training modules comprise an instructional video. In some embodiments, the one or more training modules comprise one or more drills.

In another, yet related aspect, disclosed herein are computer-implemented systems comprising: at least one processor, a memory, and instructions executable by the at least one processor to create a golf swing coach application comprising: a swing recognition module configured to receive a video of an individual performing a golf swing and apply an image processing algorithm to perform at least: identify a plurality of body nodes of the individual in a plurality of frames of the video, and generate a virtual skeleton by connecting the plurality of body nodes in the plurality of frames of the video; a swing evaluation module configured to identify a plurality of key frames of the video, apply at least one mathematical swing flaw evaluation to each key frame of the video to identify any swing flaws of the individual, and generate a swing score for the individual; and an improvement plan module configured to recommend one or more training modules based at least on any swing flaws of the individual identified and the swing score for the individual. In some embodiments, the video comprises a down-the-line perspective of the individual performing the golf swing. In other embodiments, the video comprises a face-on perspective of the individual performing the golf swing. In some embodiments, the swing recognition module is further configured to perform data compression processing on the received video. In some embodiments, the swing recognition module is further configured to persist video data pertaining to the received video to a data storage system. In various embodiments, the plurality of body nodes comprise one or more of: nose, neck, mid hip, right ear, right eye, right shoulder, right elbow, right wrist, right hip, right knee, right ankle, left ear, left eye, left shoulder, left elbow, left wrist, left hip, left knee, and left ankle. In various embodiments, the plurality of body nodes comprise at least 10, at least 15, at least 20, or at least 25 body nodes. In some embodiments, the swing recognition module is further configured to identify one or more of a golf club head and a golf club shaft in a plurality of frames of the video. In some embodiments, the swing recognition module is further configured to identify a golf ball in a plurality of frames of the video. In a particular embodiment, the swing evaluation module is configured to identify three key frames of the video. In some embodiments, the swing evaluation module identifies the plurality of key frames at least in part by generating a function graph of distance from wrist body node to heel body node vs. video frame. In some embodiments, the plurality of key frames comprise: a set-up frame, a top of back-swing frame, and an impact frame. In further embodiments, the swing evaluation module applies to the set-up frame at least one mathematical swing flaw evaluation selected from the group consisting of: a shaft plane evaluation, a spine angle evaluation, a stance width evaluation, and a hand position evaluation. In further embodiments, the swing evaluation module applies to the top of back-swing frame at least one mathematical swing flaw evaluation selected from the group consisting of: a head movement evaluation, a spine angle evaluation, a posterior position evaluation, a hip sway evaluation, and a hip rotation evaluation. In further embodiments, the swing evaluation module applies to the impact frame at least one mathematical swing flaw evaluation selected from the group consisting of: a head movement evaluation, a spine angle evaluation, a posterior position evaluation, a hand placement evaluation, a hip rotation evaluation, and a hip sway evaluation. In some embodiments, the swing evaluation module is further configured to calculate a swing tempo based at least in part on the plurality of body nodes in the plurality of frames of the video. In further embodiments, the at least one mathematical swing flaw evaluation comprises a swing tempo evaluation. In some embodiments, the at least one mathematical swing flaw evaluation comprises at least 10 or at least 15 mathematical swing flaw evaluations. In various embodiments, the swing score comprises one or more of: a rhythm score, a stability score, an impact score, and an overall score. In some embodiments, the swing evaluation module is further configured to generate a list of one or more ranked swing flaws. In further embodiments, the improvement plan module is configured to recommend one or more training modules addressing the one or more ranked swing flaws in rank order. In various embodiments, the one or more training modules comprise an instructional video, one or more drills, or both.

In another, yet related aspect, disclosed herein are non-transitory computer-readable storage media encoded with instructions executable by at least one processor to create an golf swing coach application comprising: a swing recognition module configured to receive a video of an individual performing a golf swing and apply an image processing algorithm to perform at least: identify a plurality of body nodes of the individual in a plurality of frames of the video, and generate a virtual skeleton by connecting the plurality of body nodes in the plurality of frames of the video; a swing evaluation module configured to identify a plurality of key frames of the video, apply at least one mathematical swing flaw evaluation to each key frame of the video to identify any swing flaws of the individual, and generate a swing score for the individual; and an improvement plan module configured to recommend one or more training modules based at least on any swing flaws of the individual identified and the swing score for the individual. In some embodiments, the video comprises a down-the-line perspective of the individual performing the golf swing. In other embodiments, the video comprises a face-on perspective of the individual performing the golf swing. In some embodiments, the swing recognition module is further configured to perform data compression processing on the received video. In some embodiments, the swing recognition module is further configured to persist video data pertaining to the received video to a data storage system. In various embodiments, the plurality of body nodes comprise one or more of: nose, neck, mid hip, right ear, right eye, right shoulder, right elbow, right wrist, right hip, right knee, right ankle, left ear, left eye, left shoulder, left elbow, left wrist, left hip, left knee, and left ankle. In various embodiments, the plurality of body nodes comprise at least 10, at least 15, at least 20, or at least 25 body nodes. In some embodiments, the swing recognition module is further configured to identify one or more of a golf club head and a golf club shaft in a plurality of frames of the video. In some embodiments, the swing recognition module is further configured to identify a golf ball in a plurality of frames of the video. In a particular embodiment, the swing evaluation module is configured to identify three key frames of the video. In some embodiments, the swing evaluation module identifies the plurality of key frames at least in part by generating a function graph of distance from wrist body node to heel body node vs. video frame. In some embodiments, the plurality of key frames comprise: a set-up frame, a top of back-swing frame, and an impact frame. In further embodiments, the swing evaluation module applies to the set-up frame at least one mathematical swing flaw evaluation selected from the group consisting of: a shaft plane evaluation, a spine angle evaluation, a stance width evaluation, and a hand position evaluation. In further embodiments, the swing evaluation module applies to the top of back-swing frame at least one mathematical swing flaw evaluation selected from the group consisting of: a head movement evaluation, a spine angle evaluation, a posterior position evaluation, a hip sway evaluation, and a hip rotation evaluation. In further embodiments, the swing evaluation module applies to the impact frame at least one mathematical swing flaw evaluation selected from the group consisting of: a head movement evaluation, a spine angle evaluation, a posterior position evaluation, a hand placement evaluation, a hip rotation evaluation, and a hip sway evaluation. In some embodiments, the swing evaluation module is further configured to calculate a swing tempo based at least in part on the plurality of body nodes in the plurality of frames of the video. In further embodiments, the at least one mathematical swing flaw evaluation comprises a swing tempo evaluation. In some embodiments, the at least one mathematical swing flaw evaluation comprises at least 10 or at least 15 mathematical swing flaw evaluations. In various embodiments, the swing score comprises one or more of: a rhythm score, a stability score, an impact score, and an overall score. In some embodiments, the swing evaluation module is further configured to generate a list of one or more ranked swing flaws. In further embodiments, the improvement plan module is configured to recommend one or more training modules addressing the one or more ranked swing flaws in rank order. In various embodiments, the one or more training modules comprise an instructional video, one or more drills, or both.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Described herein, in certain embodiments, are computer-implemented platforms comprising a client device and a back-end computing infrastructure: the client device comprising at least one processor and instructions executable to cause the client device to perform at least the following: capture a video of an individual performing a golf swing; and upload the video to the back-end computing infrastructure; the back-end computing infrastructure comprising at least one processor and instructions executable to cause the back-end computing infrastructure to perform at least the following: receive the video uploaded by the client device; apply an image processing algorithm to perform at least: identify a plurality of body nodes of the individual in a plurality of frames of the video; and generate a virtual skeleton by connecting the plurality of body nodes in the plurality of frames of the video; identify a plurality of key frames of the video; apply at least one mathematical swing flaw evaluation to each key frame of the video to identify any swing flaws of the individual; generate a swing score for the individual; and provide access to one or more training modules based at least on any swing flaws of the individual identified and the swing score for the individual.

Figure 1:
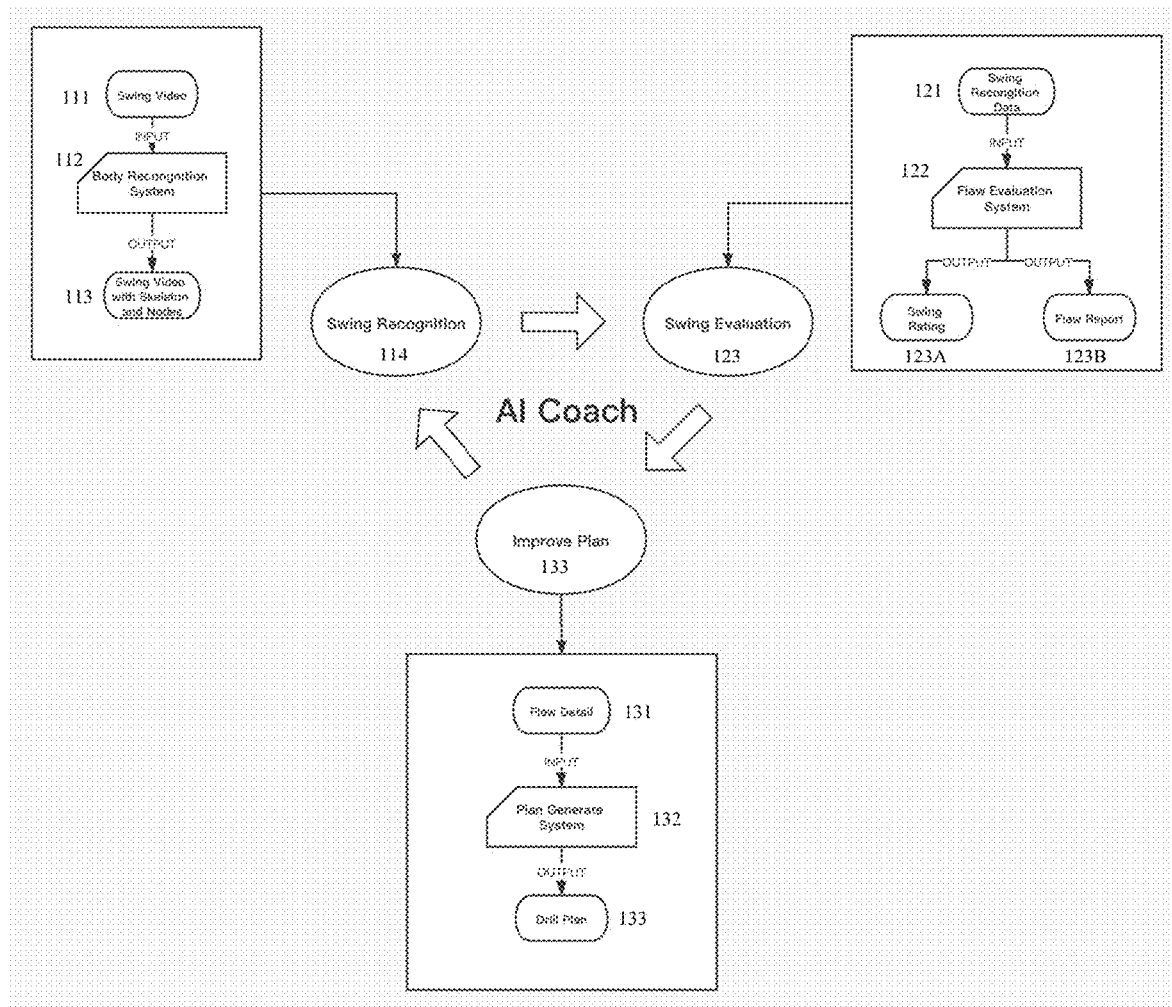
FIG. 1 shows a non-limiting schematic overview diagram; in this case, a schematic overview diagram illustrating a golf swing AI coaching methodology comprising a swing recognition process, a swing evaluation process, and a swing improvement planning process.

As shown per FIG. 1, in some embodiments, an AI Coach (e.g., a golf swing coach) includes, for example, a swing recognition module 114, a swing evaluation module 123, and an improvement plan module 133. In further embodiments, the swing recognition module 114 is configured to receive a golf swing video 111 and apply an image processing algorithm via a body recognition system 112 to, for example, identify a plurality of body nodes of the individual in a plurality of frames of the video, and generate a virtual skeleton by connecting the plurality of body nodes in the plurality of frames of the video 113. In further embodiments, the swing evaluation module 123 is configured to ingest swing recognition data 121, identify a plurality of key frames of the video, and apply at least one mathematical swing flaw evaluation via a flaw evaluation system 122 to each key frame of the video to identify any swing flaws of the individual, and generate a swing rating 123A and a flaw report 123B for the individual. In further embodiments, the improvement plan module 133 is configured to ingest flaw details 131 via a plan generation system 132, to output a drill plan 133 that recommends one or more training modules based at least on any swing flaws of the individual identified and the swing rating 123A and flaw report 123B for the individual.

Further, as shown per FIG. 1, in some embodiments, a body recognition system 112 receives a swing video 111 and outputs a swing recognition video with a skeleton and nodes 113. In some embodiments, the swing video 111 is captured by a user's device. In some embodiments, the body recognition system resides in a server. In some embodiments, the user uploads the video to the server for analysis. In such embodiments, the swing video 111 may be compressed by the user's device before being sent to the server. In some embodiments, the body recognition system resides in a user's device. In some embodiments, the user's device stores the swing video 111. In some embodiments, the server stores the swing video 111. In some embodiments, the server receives the swing video 111 by requesting new videos periodically. In some embodiments, the user's device does not store the swing video 111. In some embodiments, the server does not store the swing video 111. In some embodiments, the swing video 111 further comprises a swing video 111 property. In some embodiments, the swing video 111 property is a time the video was captured, a username of user submitting the swing video 111, a weather condition, a course identifier, or any combination thereof. Further as shown, in some embodiments, a flaw evaluation system 122 receives the swing recognition video 121 and outputs a swing rating 123A, a flaw report 123B, or both based on the swing recognition video 121. In some embodiments, the swing rating 123A comprises an overall rating, a substantive rating, or both. In some embodiments, the substantive rating is based on a rhythm of the swing, a stability of the swing, an impact precision of the swing, or any combination thereof. Finally, as shown, in some embodiments, the flaw report 123B is received by a plan generating system 132 which forms an improvement plan 133 based on the flaw report 123B, wherein the improvement plan 133 comprises a drill plan. In some embodiments, the improvement plan 133 comprises two or more drill plans 133. In some embodiments, the improvement plan 133 further comprises a priority for each of the two or more drill plans 133.

Figure 2:
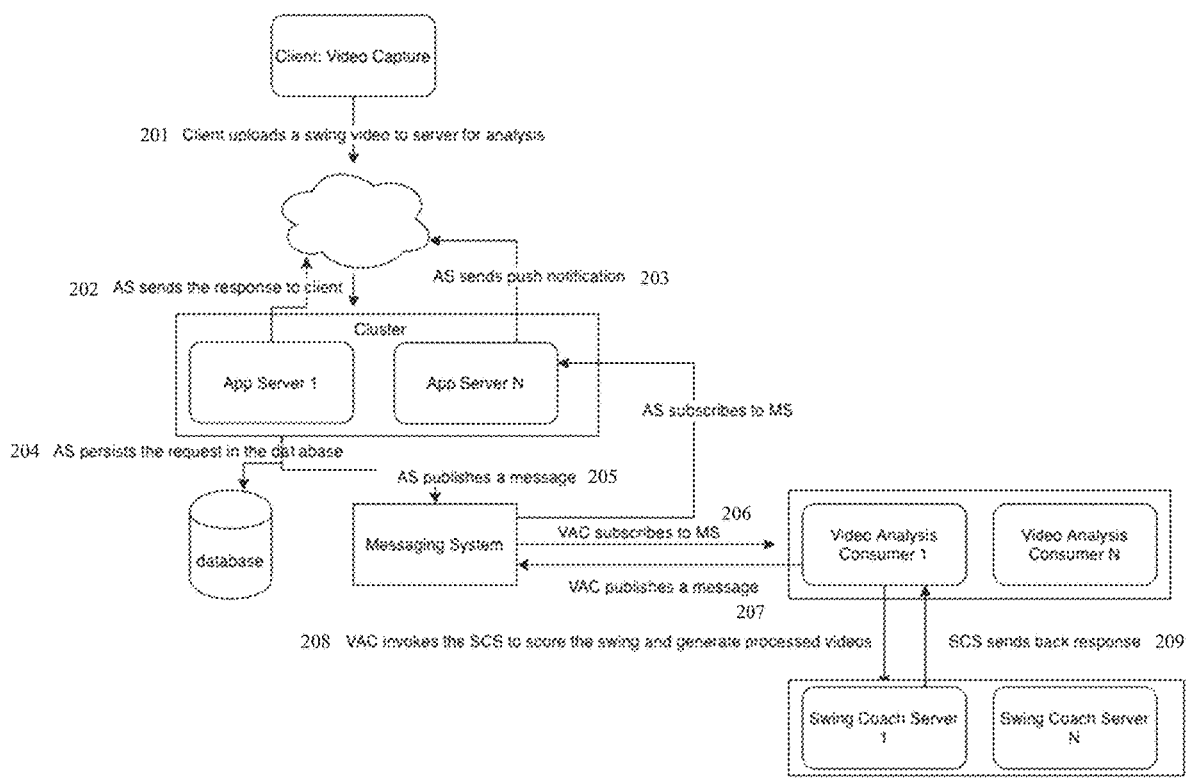
FIG. 2 shows a non-limiting architecture diagram; in this case, an architecture diagram illustrating a golf swing analysis platform comprising a client device, an application server, a video analysis module(s), and a swing coach module(s)

In some embodiments, per FIG. 2, the user uploads their swing video to a server 201. Upon upload of the video to the server 201, the server then sends a response notice 202 and/or a push notification that the video has been uploaded 203. In some embodiments, the server then stores the swing video 204 and any information related to the user and the time/location of capture. In some embodiments, the server then publishes a message to a video analysis server 206, wherein the video analysis server publishes a message that it has received the swing video 207. In some embodiments, the video analysis server coordinates the analysis of the swing videos. In some embodiments, the video analysis server then sends at least a portion of the swing video to a swing coach server 208. In some embodiments, the swing coach server then sends a confirmation response 209. In some embodiments, the swing coach server and the video analysis servers reside on the same machine. In some embodiments, the swing coach server and the video analysis servers reside on different machines. In some embodiments, the swing coach server performs keyframe identification, body point identification, or both based on the swing video. In some embodiments, the swing coach server determines the body points for each keyframe of a plurality of key frames. In some embodiments, the swing coach servers performs a swing analysis based on the body points in each of the plurality of key frames. In some embodiments, the swing coach servers determine a swing flaw based on the body points in each of the plurality of key frames.

Figure 3:
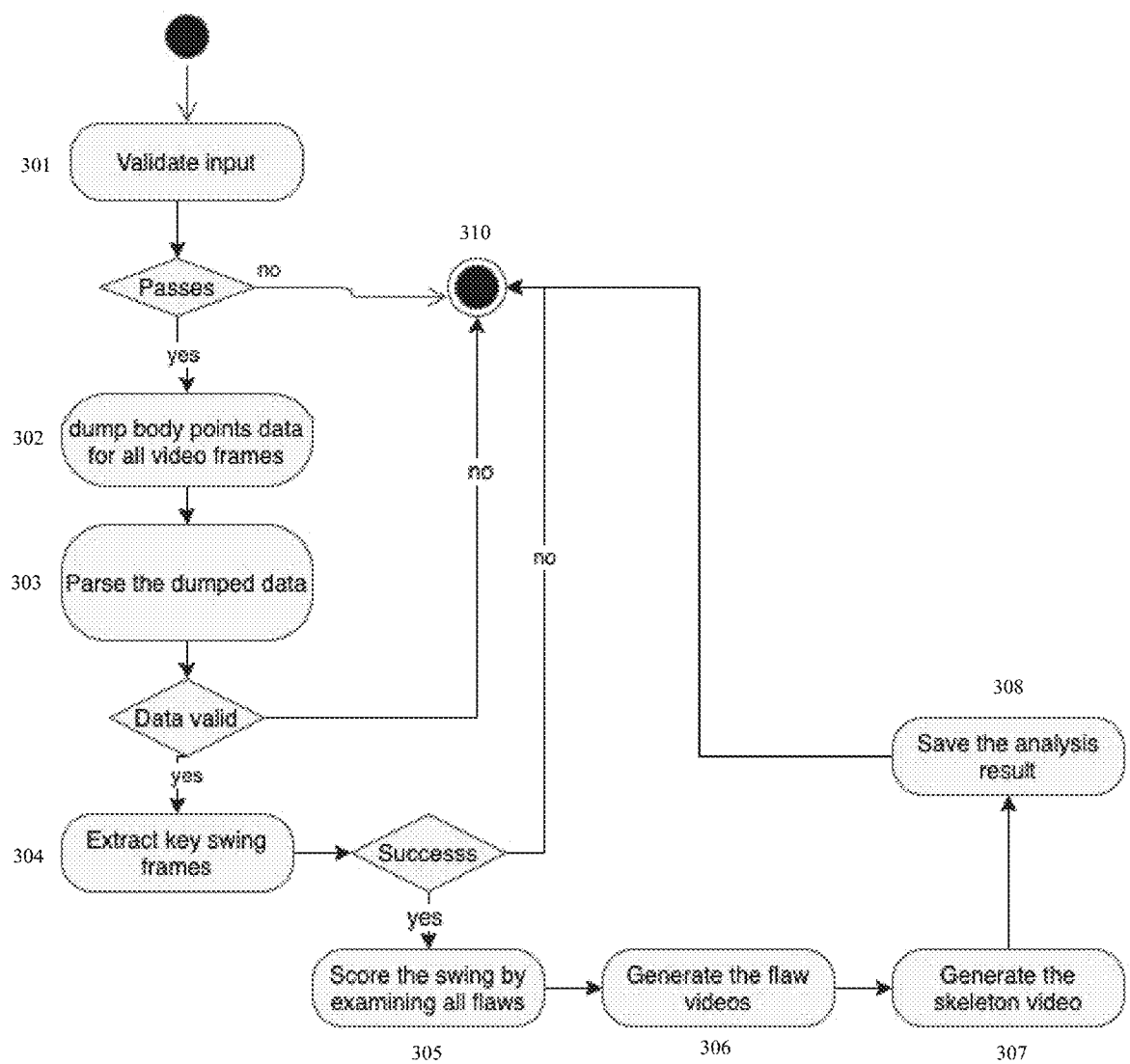
FIG. 3 shows a non-limiting process flow; in this case, a process flow illustrating a golf swing scoring methodology.

FIG. 3 shows a non-limiting process flow illustrating a golf swing scoring methodology. As shown, the process for golf swing scoring comprises: validating an input video 301; dumping body points data 302 for all video frames if the input video is valid; parsing the dumped data 303, extracting key swing frames 304, scoring the swing by examining all flaws 305 if the extraction of the key swing frames is successful; generating the flaw video 306, generating the skeleton video 307, and saving the analysis video 308. Further as shown, in some embodiments, if the input is invalid, if the dumped data is invalid, if the extraction of key swing frames is not successful, or any combination thereof, the golf swing scoring method terminates. Further, in some embodiments, upon saving the analysis results, the golf swing scoring method terminates.

In some embodiments, the video is captured from a down-the-line perspective. In other embodiments, the video is captured from a face-on perspective. In some embodiments, the back-end computing infrastructure is configured to perform data compression processing on the video uploaded by the client device. In some embodiments, the back-end computing infrastructure is configured to persist video data pertaining to the video uploaded by the client device to a data storage system. In some embodiments, the plurality of body nodes comprise one or more of: nose, neck, mid hip, right ear, right eye, right shoulder, right elbow, right wrist, right hip, right knee, right ankle, left ear, left eye, left shoulder, left elbow, left wrist, left hip, left knee, and left ankle. In various embodiments, the plurality of body nodes comprise at least 10, at least 15, at least 20, or at least 25 body nodes. In some embodiments, the back-end computing infrastructure is configured to identify one or more of a golf club head and a golf club shaft in a plurality of frames of the video. In some embodiments, the back-end computing infrastructure is configured to identify a golf ball in a plurality of frames of the video. In some embodiments, the back-end computing infrastructure is configured to identify three key frames of the video. In some embodiments, the back-end computing infrastructure is configured to identify three key frames of the video using motion graphs per FIGS. 52-54.

Figure 52:
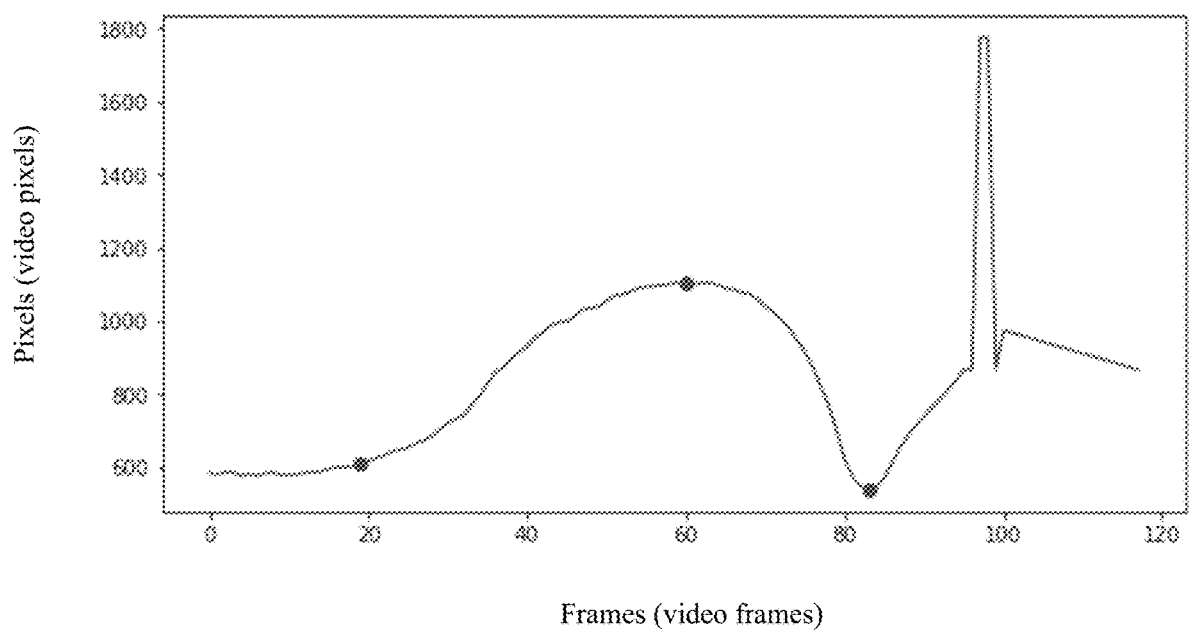
FIG. 52 shows a non-limiting example of a first graph of the golfer's hand; in this case to determine a key frame.

Referring to FIG. 52, in some embodiments, body characteristic quantities are used to generate a function graph, to which motion-smoothing processing is applied. In such embodiments, identifying certain wave patterns on the graph is optionally used to determine key frames in the video. Continuing to refer to FIG. 52, in a particular embodiment, a graph of the distance from wrist to heel (plotted on the Y-axis) and video frame (plotted on the X-axis) is used to identify three key frames, as follows:

Setup keyframe: From the very beginning, we will look for the time point that the differential variation trend coefficient significantly changed, that means the player start to swing;

Top of back-swing keyframe: After the setup, we will find the max volume of the distance, that should be the top of the back-swing; and Impact keyframe: After top of back-swing, the point that the volume reach the lowest and the coefficient significantly hit the max, that point will be exactly the impact point.

Figure 53:
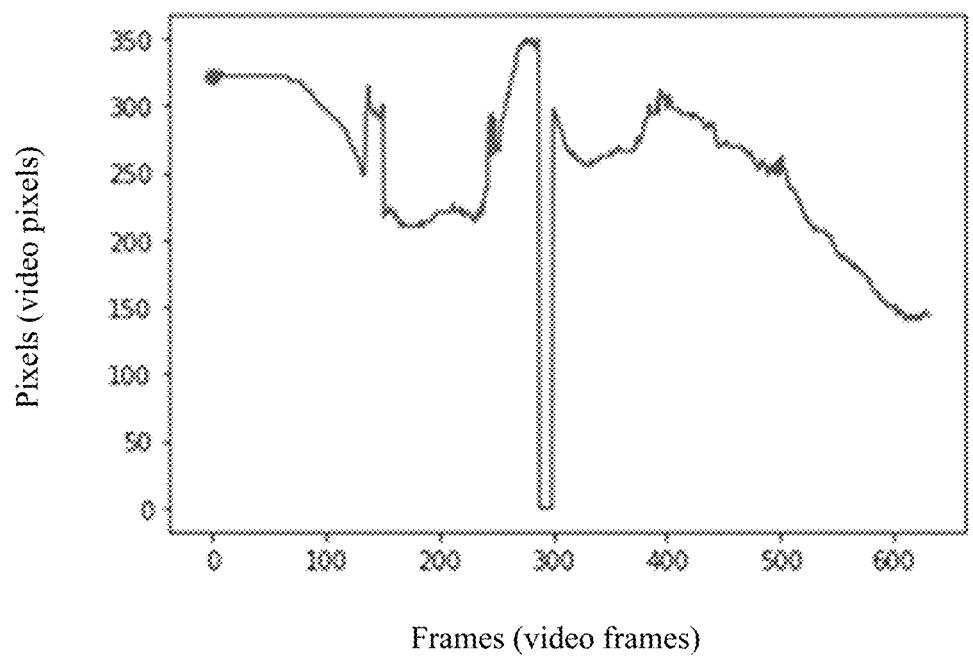
FIG. 53 shows a non-limiting example of a second graph of the golfer's hand; in this case to determine a key frame.
Figure 54:
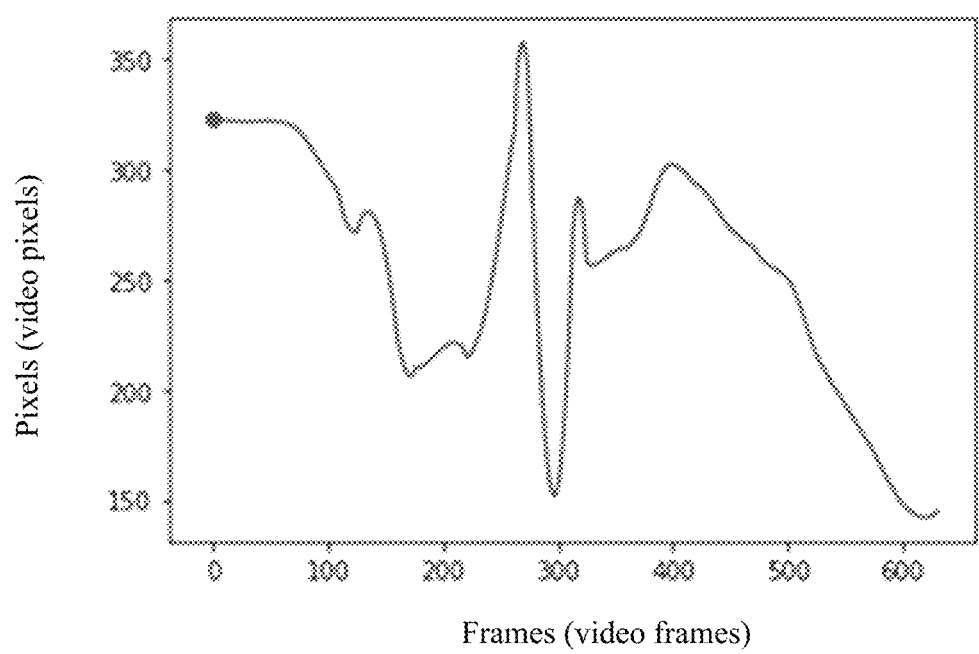
FIG. 54 shows a non-limiting example of a third graph of the golfer's hand; in this case to determine a key frame.

Referring to FIGS. 53 and 54, in some embodiments, additional function graphs are optionally generated (such as hand movement) to provide cross-analysis in order to identify key frames more accurately.

In some embodiments, the plurality of key frames are identified at least in part by generating a function graph of distance from wrist body node to heel body node vs. video frame. In particular embodiments, the plurality of key frames comprise: a set-up frame, a top of back-swing frame, and an impact frame. In further embodiments, the at least one mathematical swing flaw evaluation applied to the set-up frame comprises one or more of: a shaft plane evaluation, a spine angle evaluation, a stance width evaluation, and a hand position evaluation. In further embodiments, the at least one mathematical swing flaw evaluation applied to the top of back-swing frame comprises one or more of: a head movement evaluation, a spine angle evaluation, a posterior position evaluation, a hip sway evaluation, and a hip rotation evaluation. In further embodiments, the at least one mathematical swing flaw evaluation applied to the impact frame comprises one or more of: a head movement evaluation, a spine angle evaluation, a posterior position evaluation, a hand placement evaluation, a hip rotation evaluation, and a hip sway evaluation. In some embodiments, the back-end computing infrastructure is configured to calculate a swing tempo based at least in part on the plurality of body nodes in the plurality of frames of the video. In further embodiments, the at least one mathematical swing flaw evaluation comprises a swing tempo evaluation. In various embodiments, the at least one mathematical swing flaw evaluation comprises at least 10 or at least 15 mathematical swing flaw evaluations. In some embodiments, the swing score comprises one or more of: a rhythm score, a stability score, an impact score, and an overall score. In some embodiments, the back-end computing infrastructure is configured to generate a list of one or more ranked swing flaws. In further embodiments, the one or more training modules address the one or more ranked swing flaws in rank order. In some embodiments, the one or more training modules comprise an instructional video. In some embodiments, the one or more training modules comprise one or more drills.

Also described herein, in certain embodiments, are computer-implemented methods for providing golf swing analysis and coaching comprising: receiving a video of an individual performing a golf swing; applying an image processing algorithm to perform at least: identify a plurality of body nodes of the individual in a plurality of frames of the video; and generate a virtual skeleton by connecting the plurality of body nodes in the plurality of frames of the video; identifying a plurality of key frames of the video; applying at least one mathematical swing flaw evaluation to each key frame of the video to identify any swing flaws of the individual; generating a swing score for the individual; and providing access to one or more training modules based at least on any swing flaws of the individual identified and the swing score for the individual. In some embodiments, the video has a down-the-line perspective. In other embodiments, the video has a face-on perspective. In some embodiments, the method further comprises performing data compression processing on the received video. In some embodiments, the method further comprises persisting video data pertaining to the received video to a data storage system. In some embodiments, the plurality of body nodes comprise one or more of: nose, neck, mid hip, right ear, right eye, right shoulder, right elbow, right wrist, right hip, right knee, right ankle, left ear, left eye, left shoulder, left elbow, left wrist, left hip, left knee, and left ankle. In various embodiments, the plurality of body nodes comprise at least 10, at least 15, at least 20, or at least 25 body nodes. In some embodiments, the method further comprises identifying one or more of a golf club head and a golf club shaft in a plurality of frames of the video. In some embodiments, the method further comprises identifying a golf ball in a plurality of frames of the video. In some embodiments, identifying a plurality of key frames of the video comprises identifying three key frames of the video. In some embodiments, the plurality of key frames are identified at least in part by generating a function graph of distance from wrist body node to heel body node vs. video frame. In particular embodiments, the plurality of key frames comprise: a set-up frame, a top of back-swing frame, and an impact frame. In further embodiments, the at least one mathematical swing flaw evaluation applied to the set-up frame comprises one or more of: a shaft plane evaluation, a spine angle evaluation, a stance width evaluation, and a hand position evaluation. In further embodiments, the at least one mathematical swing flaw evaluation applied to the top of back-swing frame comprises one or more of: a head movement evaluation, a spine angle evaluation, a posterior position evaluation, a hip sway evaluation, and a hip rotation evaluation. In further embodiments, the at least one mathematical swing flaw evaluation applied to the impact frame comprises one or more of: a head movement evaluation, a spine angle evaluation, a posterior position evaluation, a hand placement evaluation, a hip rotation evaluation, and a hip sway evaluation. In some embodiments, the method further comprises calculating a swing tempo based at least in part on the plurality of body nodes in the plurality of frames of the video. In some embodiments, the at least one mathematical swing flaw evaluation comprises a swing tempo evaluation. In various embodiments, the at least one mathematical swing flaw evaluation comprises at least 10 or at least 15 mathematical swing flaw evaluations. In some embodiments, the swing score comprises one or more of: a rhythm score, a stability score, an impact score, and an overall score. In some embodiments, the method further comprises generating a list of one or more ranked swing flaws. In further embodiments, the one or more training modules address the one or more ranked swing flaws in rank order. In some embodiments, the one or more training modules comprise an instructional video. In some embodiments, the one or more training modules comprise one or more drills.

In some embodiments, each swing flaw associated with a video direction, a key frame, a reference item, one or more body nodes, or any combination thereof. In some embodiments, a swing flaw is determined if a relationship between one or more of the reference items and/or one or more of the body nodes meets a flaw condition per Table 1 below and FIGS. 50A-50S. Note that in FIGS. 50A-50S body nodes are illustrated with a solid circle and judgement points (X) are illustrated with a solid circle surrounded by a hollow circle. Some of the evaluation criteria for swing analysis require recognition of the club, while others do not.

TABLE 1

| Video Direction | Key Frame | Reference Item | Body Node(s) | FIG. | Flaw Condition |
|---|---|---|---|---|---|
| Down the line | Setup | Shaft Plane | RShoulder, RHip | 50A | X outside A and B on AC |
| | Top of Backswing | Head Movement | REar, Nose | 50B | XA > AB/2 |
| | | Spine Angle | Neck MidHip | 50C | LD \|\| MB $\angle ABL - \angle CDL$ \| > 4° |
| | | Butt Position | MidHip, REar, Nose | 50D | \| Cx − Dx \| > AB/3 |
| | Impact | Head Movement | REar, nose | 50E | XA > AB/2 & Xy > Ay OR Xx − Ax > AB/2 & Xy < Ay |
| | | Spine Angle | Neck, MidHip | 50F | LD \|\| MB \| $\angle ABL - \angle CDL$ \| > 3° |
| | | Butt Position | MidHip, REar, Nose | 50G | \| Cx − Dx \| > AB/2 |
| Face On | Setup | Spine Angle | Neck, MidHip | 50H | Driver $\angle ABL > 5°$ OR $\angle ABL < 0°$ 5-Iron $\angle ABL > 8°$ OR $\angle ABL < 0$ |
| | | Stance Width | RShoulder, LShoulder, LHeel, RHeel | 50I | CD < AB*0.9 OR CD > AB*1.5 |
| | | Hand Placement | RWrist | 50J | Driver $\angle ABL > 5°$ OR $\angle ABL < 0°$ 5-Iron $\angle ABL > 8°$ OR $\angle ABL < 0$ |
| | Top of Backswing | Head Movement | MidHip, RHip, Nose | 50K | AB > CD/2 |
| | | Hip Sway | MidHip, RHip | 50L | BC > AB/2 |
| | | Hip Rotation | LHip, RHip | 50M | LC \|\| AB $\angle DCL < 30°$ |
| | | Spine Angle | Neck, Midhip | 50N | LD \|\| MB \| $\angle ABL - \angle CDL$ \| > 3° |
| | | Length of Back Swing | RHip, LHip | 50O | LC \|\| AB $\angle DCL < 5°$ |
| | Impact | Head Movement | MidHip, RHip, Nose, | 50P | AB > CD/2 |
| | | Hand Placement | RWrist | 50Q | $\angle ABL < 0$ |
| | | Hip Rotation | LHip, RHip | 50R | LC \|\| AB $\angle DCL < 25°$ |
| | | Hip Sway | MidHip, RHip | 50S | BC > AB/2 |

TABLE 1-continued

| Video Direction | Key Frame | Reference Item | Body Node(s) | FIG. | Flaw Condition |
|---|---|---|---|---|---|
| | Tempo of Swing | Tempo of Swing | TimeA = Time_TOB − Time_setup<br>TimeB = Time_impact − Time_TOB | — | TimeB/TimeA > 1/3<br>OR<br>TimeB/TimeA < 1/2.5 |

Figure 50A:
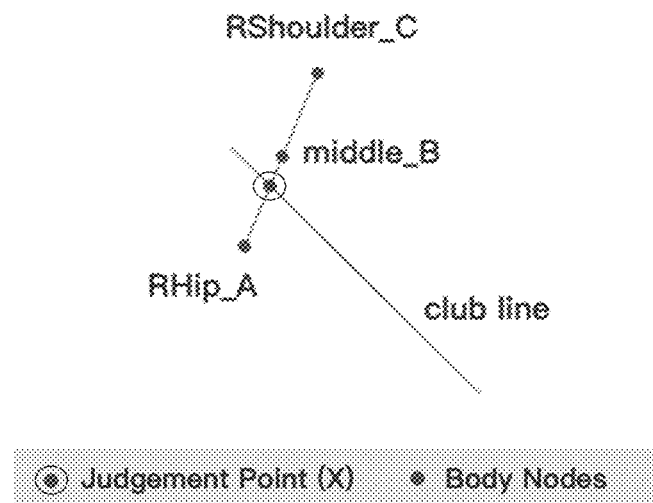
FIG. 50A shows a non-limiting example of a mathematical swing flaw evaluation; in this case a shaft plane evaluation during swing setup.
Figure 50B:
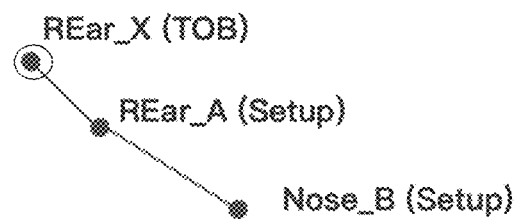
FIG. 50B shows a non-limiting example of a mathematical swing flaw evaluation; in this case a head movement evaluation during a top of a backswing.
Figure 50C:
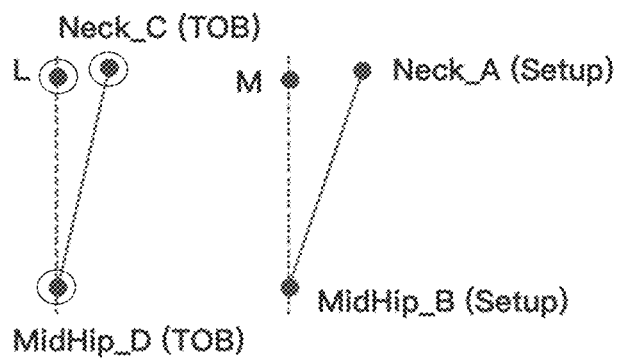
FIG. 50C shows a non-limiting example of a mathematical swing flaw evaluation; in this case a spine angle evaluation during a top of a backswing.
Figure 50D:
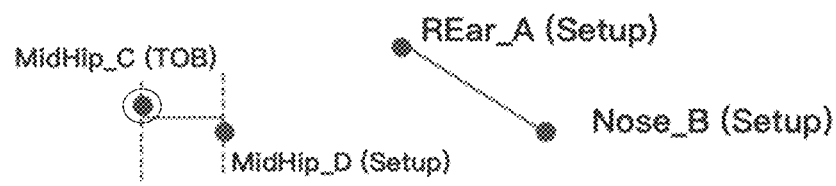
FIG. 50D shows a non-limiting example of a mathematical swing flaw evaluation; in this case a butt position evaluation during a top of a backswing.
Figure 50E:
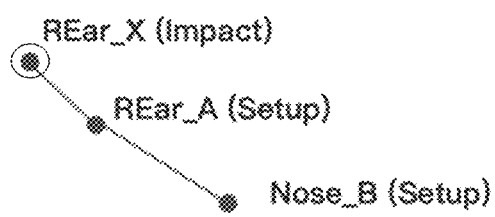
FIG. 50E shows a non-limiting example of a mathematical swing flaw evaluation; in this case a head movement evaluation during ball impact.
Figure 50F:
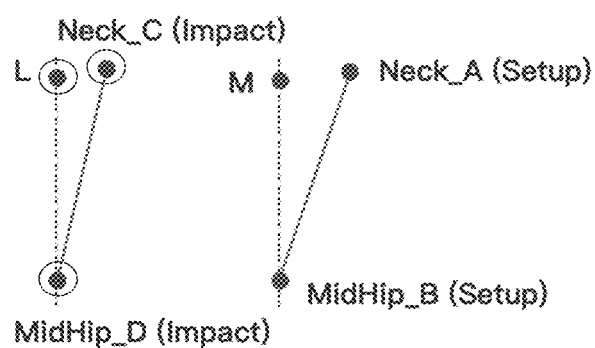
FIG. 50F shows a non-limiting example of a mathematical swing flaw evaluation; in this case a spine angle evaluation during ball impact.
Figure 50G:
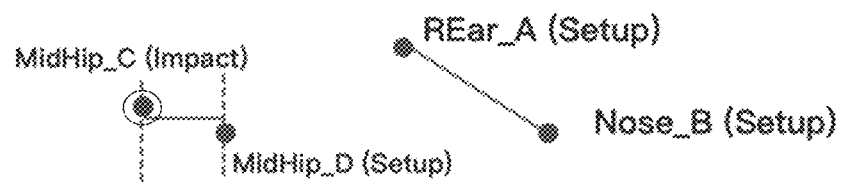
FIG. 50G shows a non-limiting example of a mathematical swing flaw evaluation; in this case a butt position evaluation during ball impact.

In some embodiments, per FIG. 50A, when the video of the golf swing is taken down the line, a swing flaw is determined if the golfer's club shaft is setup too upright to the ball, whereas the club shaft is more vertically tilted from the golf ball up and points higher than the bottom of their rib cage, or if the golfer's club shaft is setup too flat and is tilting from the ball lower than the hip. In some embodiments, per FIG. 50B, when the video of the golf swing is taken down the line, a swing flaw is determined during a backswing if the golfer's head (e.g., ear, nose) moves up, down, towards, or away from the golf ball more than a set amount. In some embodiments, per FIG. 50C, when the video of the golf swing is taken down the line, a swing flaw is determined during a backswing if the golfer's spine angle changes vertically or horizontally from where it was at setup by more than a set amount. In some embodiments, per FIG. 50D, when the video of the golf swing is taken down the line, a swing flaw is determined during a backswing if the golfer's butt moves inward or outward more than a set amount from where it was at setup. In some embodiments, per FIG. 50E, when the video of the golf swing is taken down the line, a swing flaw is determined during a ball impact if the golfer's head moves more than a set amount from where it was at setup. In some embodiments, per FIG. 50F, when the video of the golf swing is taken down the line, a swing flaw is determined during a ball impact if the golfer's spine angle increases or decreases by more than a set amount from where it was at setup. In some embodiments, per FIG. 50G, when the video of the golf swing is taken down the line, a swing flaw is determined during a ball impact if the golfer's butt moves inward or outward more than a set amount from where it was at setup.

Figure 50H:
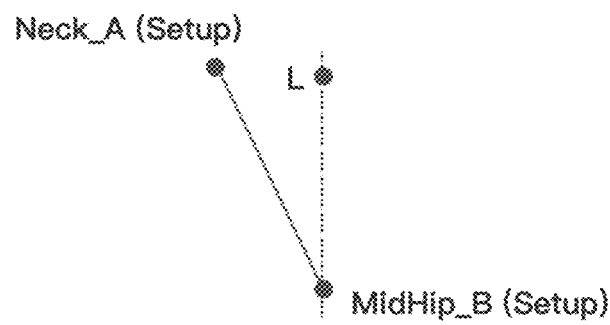
FIG. 50H shows a non-limiting example of a mathematical swing flaw evaluation; in this case a spine angle evaluation during swing setup.
Figure 50I:
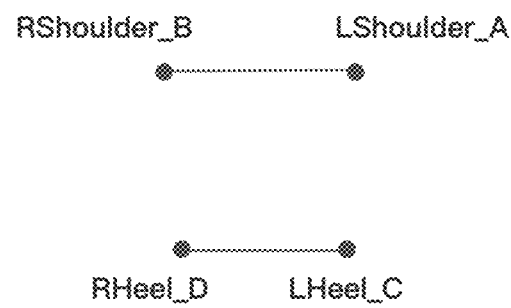
FIG. 50I shows a non-limiting example of a mathematical swing flaw evaluation; in this case a stance width evaluation during swing setup.
Figure 50J:
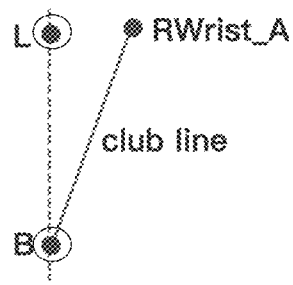
FIG. 50J shows a non-limiting example of a mathematical swing flaw evaluation; in this case a hand position evaluation during swing setup.
Figure 50K:
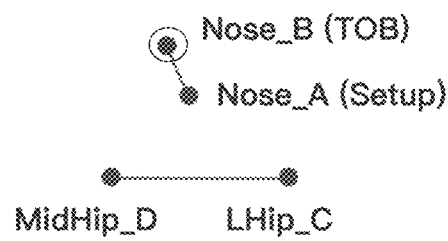
FIG. 50K shows a non-limiting example of a mathematical swing flaw evaluation; in this case a head movement evaluation at the top of the backswing.
Figure 50L:
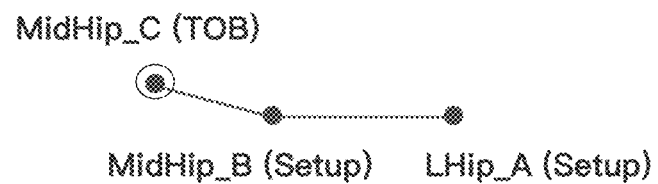
FIG. 50L shows a non-limiting example of a mathematical swing flaw evaluation; in this case a hip sway evaluation at the top of the backswing.
Figure 50M:
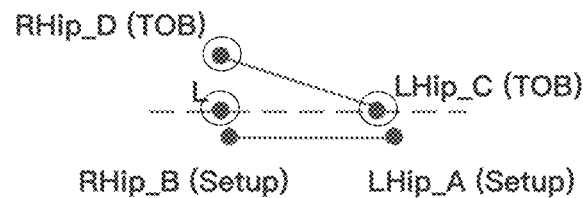
FIG. 50M shows a non-limiting example of a mathematical swing flaw evaluation; in this case a hip rotation evaluation at the top of the backswing.
Figure 50N:
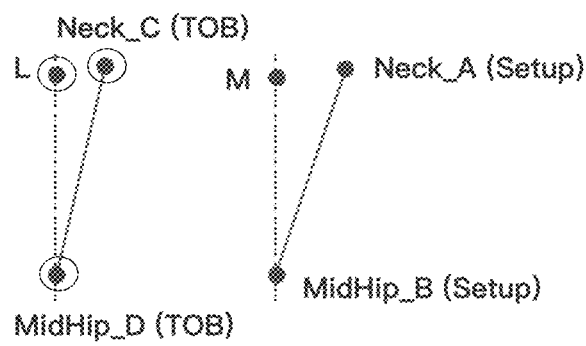
FIG. 50N shows a non-limiting example of a mathematical swing flaw evaluation; in this case a spine angle evaluation at the top of the backswing.
Figure 50O:
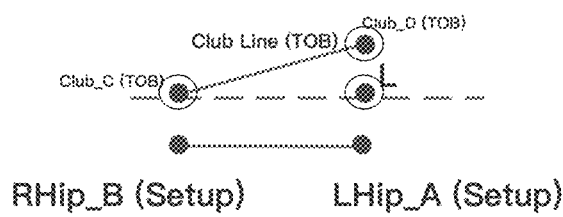
FIG. 50O shows a non-limiting example of a mathematical swing flaw evaluation; in this case a backswing length evaluation at the top of the backswing.
Figure 50P:
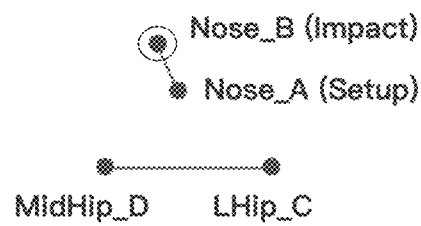
FIG. 50P shows a non-limiting example of a mathematical swing flaw evaluation; in this case a head movement evaluation during ball impact.
Figure 50Q:
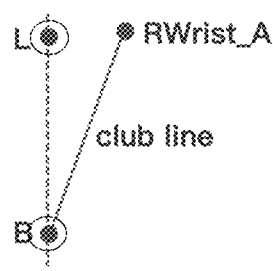
FIG. 50Q shows a non-limiting example of a mathematical swing flaw evaluation; in this case a hand placement evaluation during ball impact.
Figure 50R:
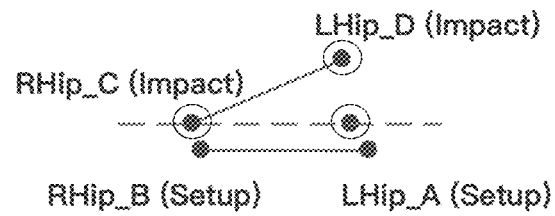
FIG. 50R shows a non-limiting example of a mathematical swing flaw evaluation; in this case a hip rotation evaluation during ball impact.
Figure 50S:
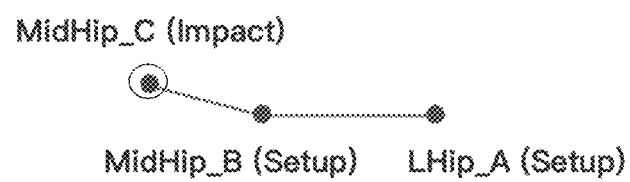
FIG. 50S shows a non-limiting example of a mathematical swing flaw evaluation; in this case a hip sway evaluation during ball impact.

In some embodiments, per FIG. 50H, when the video of the golf swing is taken face on, a swing flaw is determined during setup if an angle between the golfer's and ground is within a set value. In some embodiments, per FIG. 50I, when the video of the golf swing is taken face on, a swing flaw is determined if a ratio between the width of the golfer's feet and the width of their shoulders is within a set value. In some embodiments, per FIG. 50J, when the video of the golf swing is taken face on, a swing flaw is determined if an angle between the golfer's hands and their club is within a set range. For example, a swing flaw is determined if the hands are not ahead of the ball or ahead by more than 8 degrees. In some embodiments, per FIG. 50K, when the video of the golf swing is taken face on, a swing flaw is determined during the backswing if the golfer's head moves by more than a set amount. In some embodiments, per FIG. 50L, when the video of the golf swing is taken face on, a swing flaw is determined during the backswing if the golfer's hips moves by more than a set amount. In some embodiments, per FIG. 50M, when the video of the golf swing is taken face on, a swing flaw is determined during the backswing if the golfer's hips rotate by more than a set amount. In some embodiments, per FIG. 50N, when the video of the golf swing is taken face on, a swing flaw is determined during the backswing if the golfer's spine angle changes by more than a set amount. In some embodiments, per FIG. 50O, when the video of the golf swing is taken face on, a swing flaw is determined during the backswing if the golfer's head moves by more than a set amount. In some embodiments, per FIG. 50P, when the video of the golf swing is taken face on, a swing flaw is determined during the ball impact if the golfer's head moves by more than a set amount. In some embodiments, per FIG. 50Q, when the video of the golf swing is taken face on, a swing flaw is determined during the ball impact if the golfer's hands closer to the head or if the shaft is leaned farther from the target than a vertical line. In some embodiments, per FIG. 50R, when the video of the golf swing is taken face on, a swing flaw is determined if a ratio between golfer's hip rotation during the backswing is more than during the ball impact by more than a set amount. In some embodiments, per FIG. 50S, when the video of the golf swing is taken face on, a swing flaw is determined if a ratio between golfer's hip movement during the backswing is more than during the setup by more than a set amount. Finally, evaluation criteria with regard to tempo of swing are provided. In some embodiments, when the video of the golf swing is taken face on, a swing flaw is determined (wherein TimeA=Time_TOB−Time_setup and TimeB=Time_impact−Time_TOB) if TimeB/TimeA>1/3 or TimeB/TimeA<1/2.5.

Figure 51:
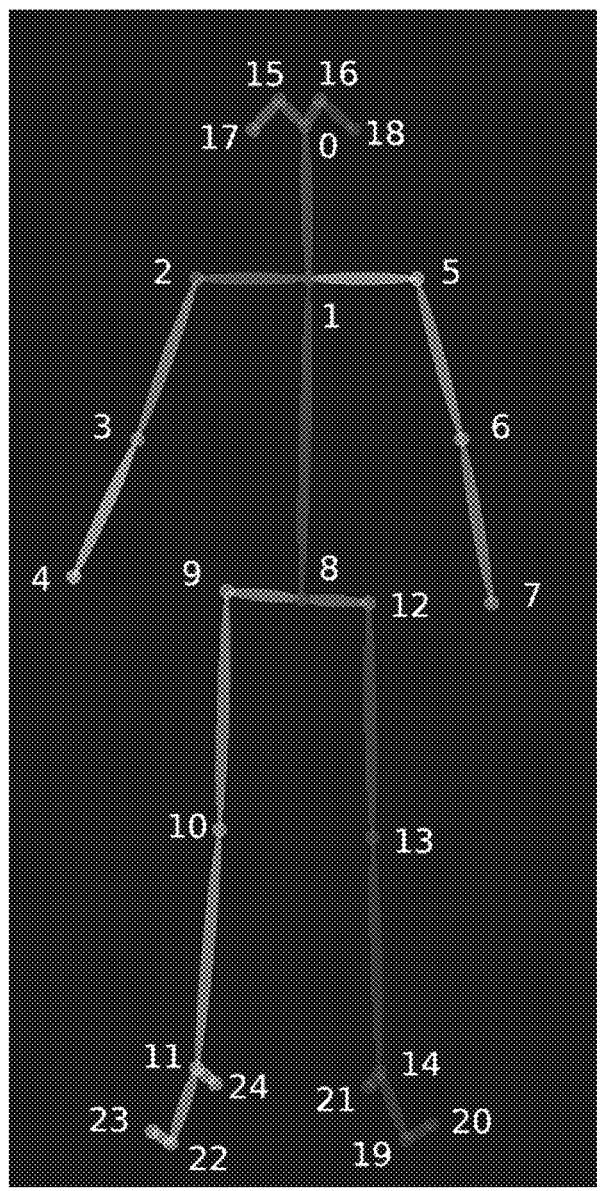
FIG. 51 shows a non-limiting example of body nodes; in this case body nodes for determining swing flaws.

Exemplary locations of body nodes are show in FIG. 51 and per Table 2 below.

TABLE 2

| Node Number | Node Name |
|---|---|
| 1 | Neck |
| 2 | RShoulder |
| 3 | RElbow |
| 4 | RWrist |
| 5 | LShoulder |
| 6 | LElbow |
| 7 | LWrist |
| 8 | MidHip |
| 9 | RHip |
| 10 | RKnee |
| 11 | RAnkle |
| 12 | LHip |
| 13 | LKnee |
| 14 | LAnkle |
| 15 | REye |
| 16 | LEye |

In some embodiments, different aspects of swing, as represented by captured keyframes, are evaluated with a particular priority. By way of example, per Table 3, in a particular embodiment, when analyzing video shot face on, setup is given first priority, swing tempo is given second priority, top of backswing is given third priority, and point of impact is given fourth priority. Within each aspect of swing, one or more potential flaws can be evaluated. In some embodiments, flaws are evaluated with a particular priority. By way of further example, per Table 3, in a particular embodiment, when analyzing video shot face on, and evaluating the setup key frame, spine angle is given first priority and stance width is given second priority. Overall, Table 3 provides an example prioritized rubric for swing evaluation from two different filming angles.

TABLE 3

| Filming Angle | Key Frame | Check Flaw |
|---|---|---|
| Face on | Setup (1st) | Spine Angle (1st) |
| | | Stance Width (2nd) |
| | Swing Tempo (2nd) | Swing Tempo (3rd) |
| | Top of Backswing (3rd) | Spine Angle (4th) |
| | | Hips Sway (5th) |
| | | Head Movements (6th) |
| | | Hips Rotation (7th) |
| | Impact (4th) | Head Movements (8th) |
| | | Hips Rotation (9th) |
| | | Hips Sway (10th) |
| Down the line | Swing Tempo (1st) | Swing Tempo (1st) |
| | Top of Backswing (2nd) | Spine Angle (2nd) |
| | | Head Movements (3rd) |
| | | Butt Position (4th) |
| | Impact (3rd) | Spine Angle (5th) |
| | | Butt Position (6th) |
| | | Head Movements (7th) |

Graphical User Interfaces

Figure 4:
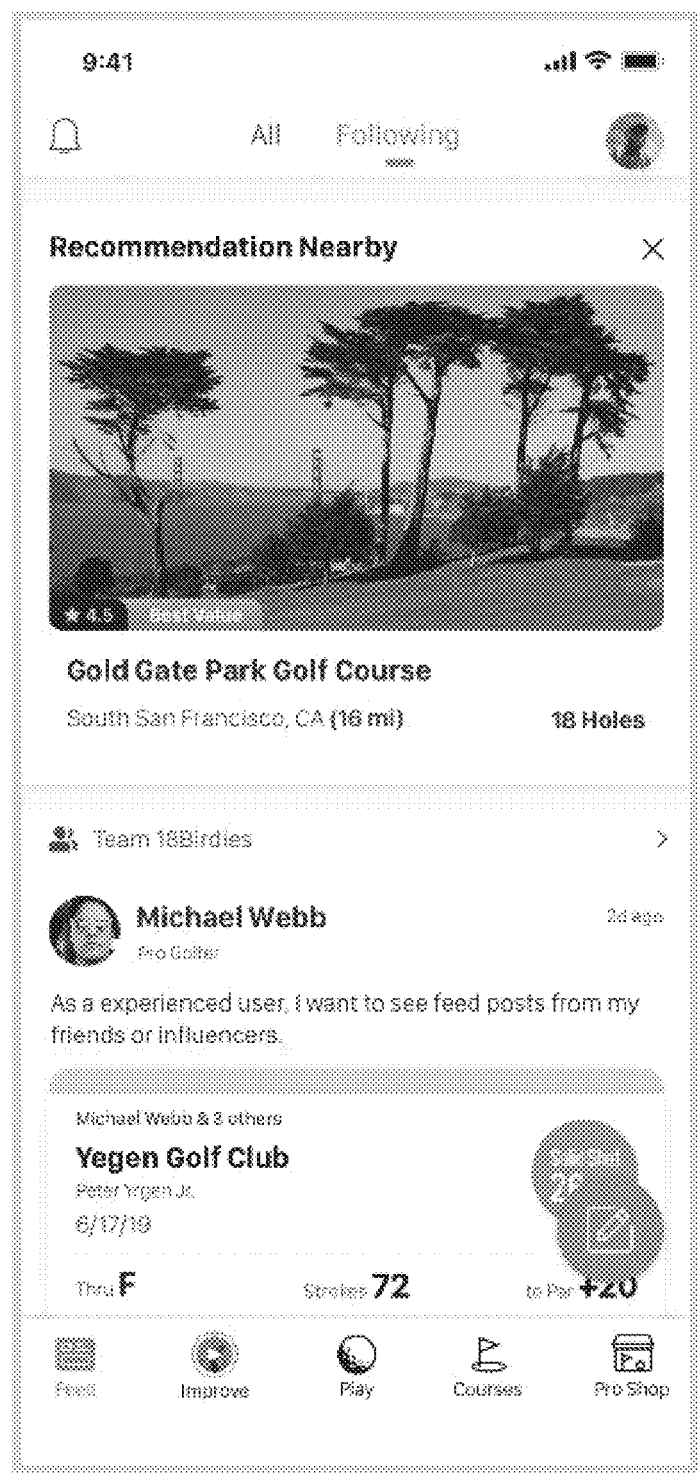
FIG. 4 shows a non-limiting graphical user interface (GUI); in this case, a GUI for a recommendation and a review for a golf course.
Figure 5:
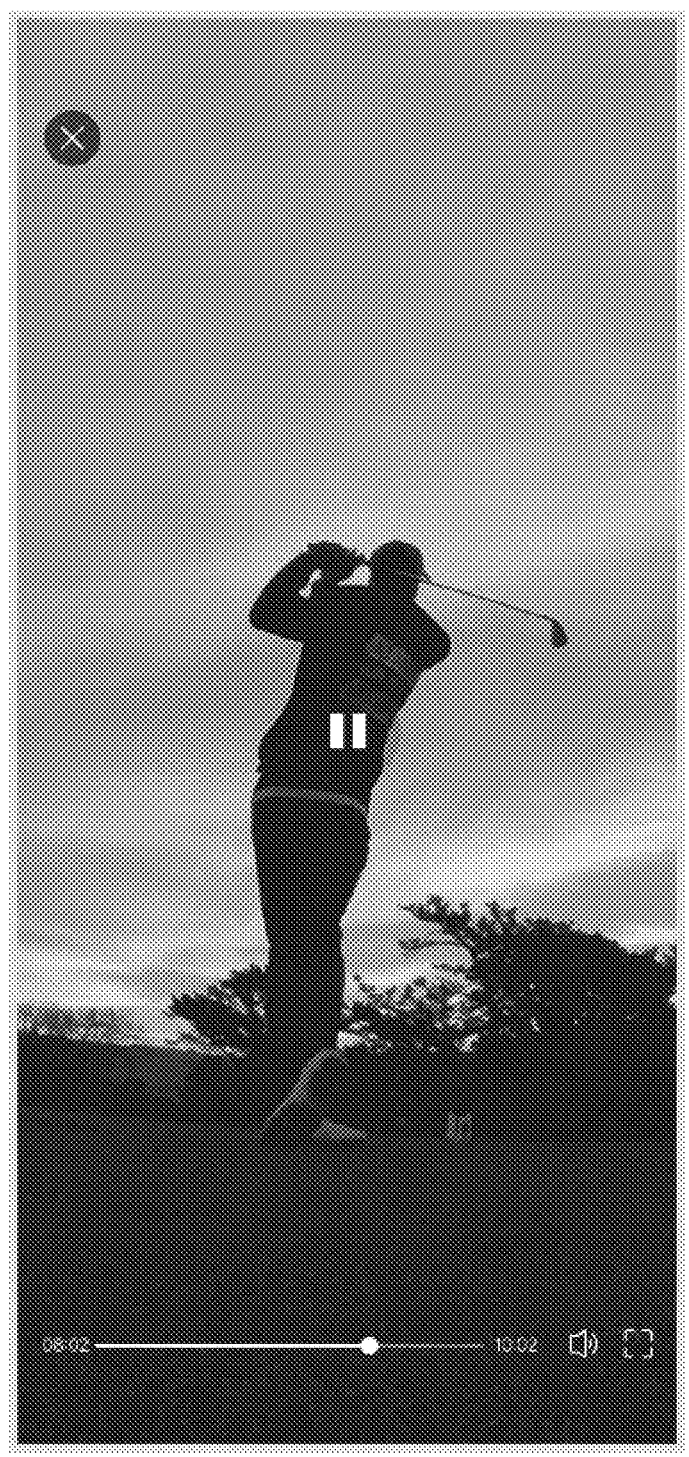
FIG. 5 shows a non-limiting golf swing analysis GUI; in this case, a GUI for viewing a swing video.
Figure 6:
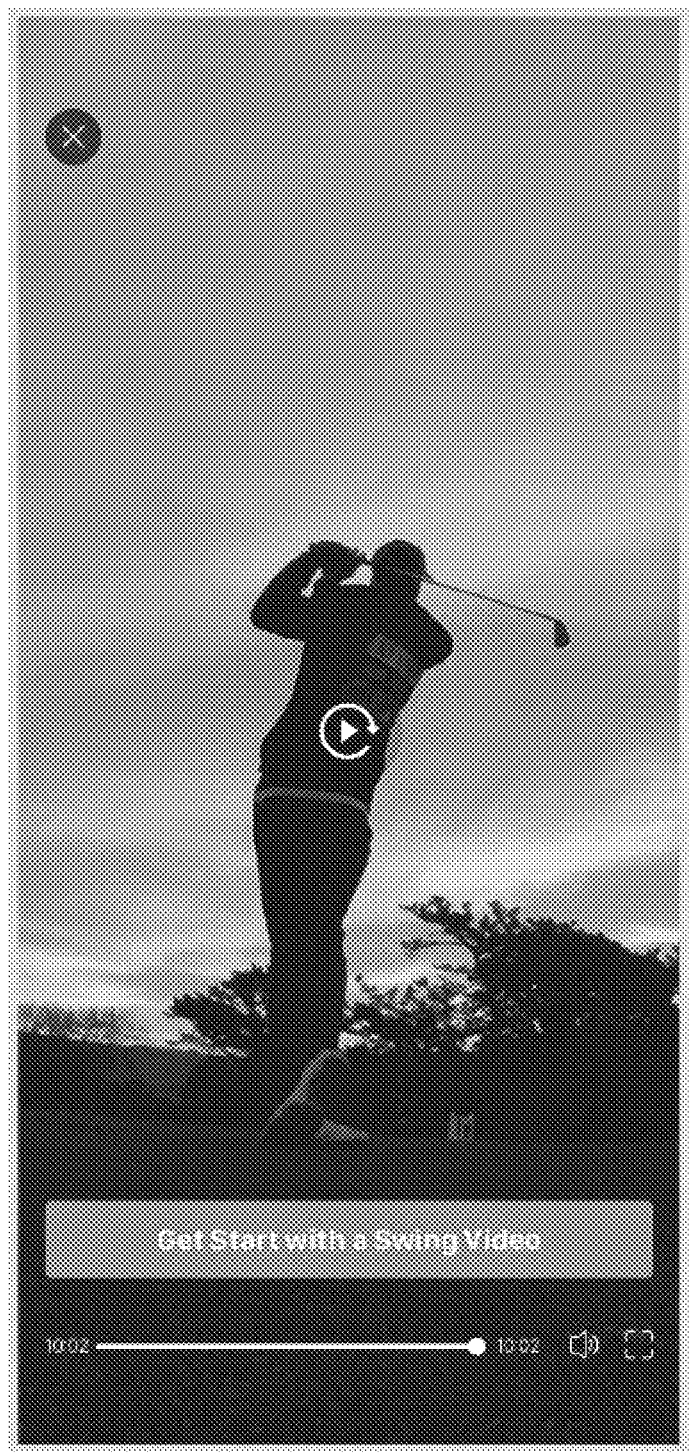
FIG. 6 shows a non-limiting golf swing analysis GUI; in this case, a GUI for starting a swing video.
Figure 7:
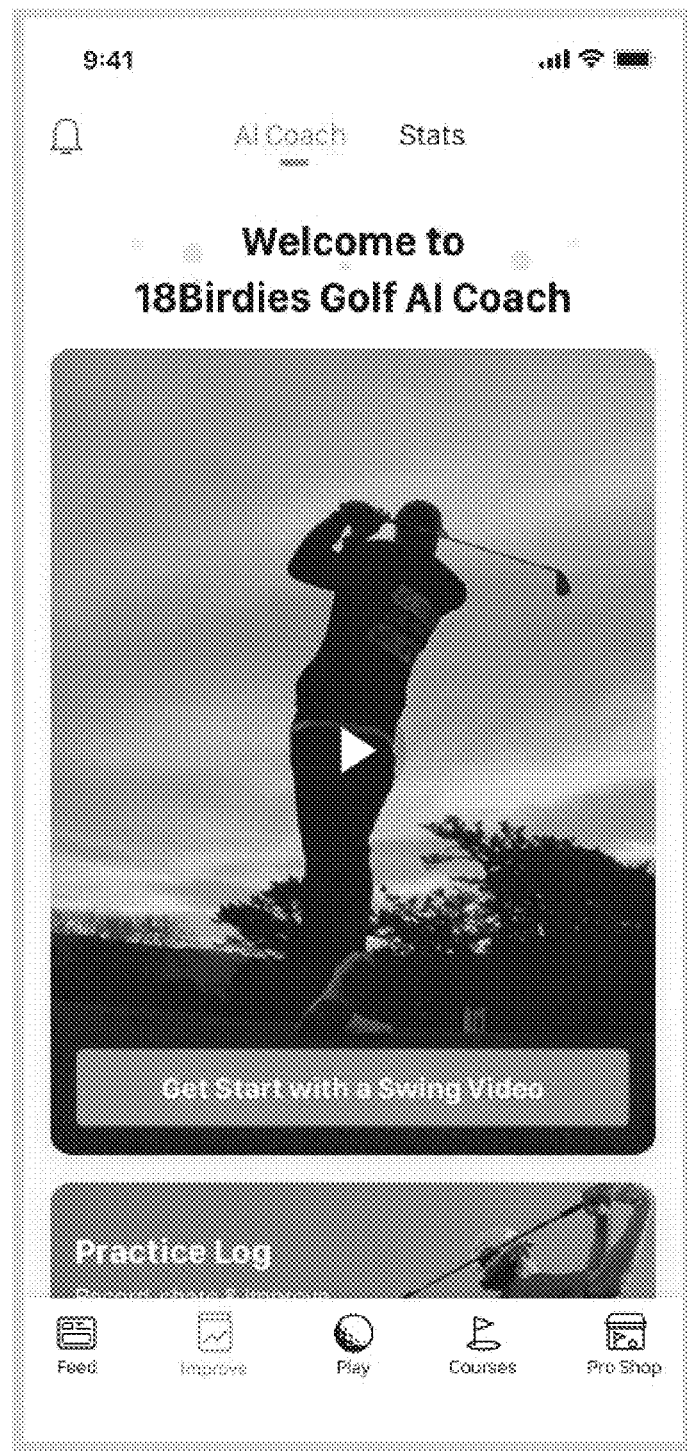
FIG. 7 shows a non-limiting golf swing analysis GUI; in this case, a GUI for a first home screen.
Figure 8:
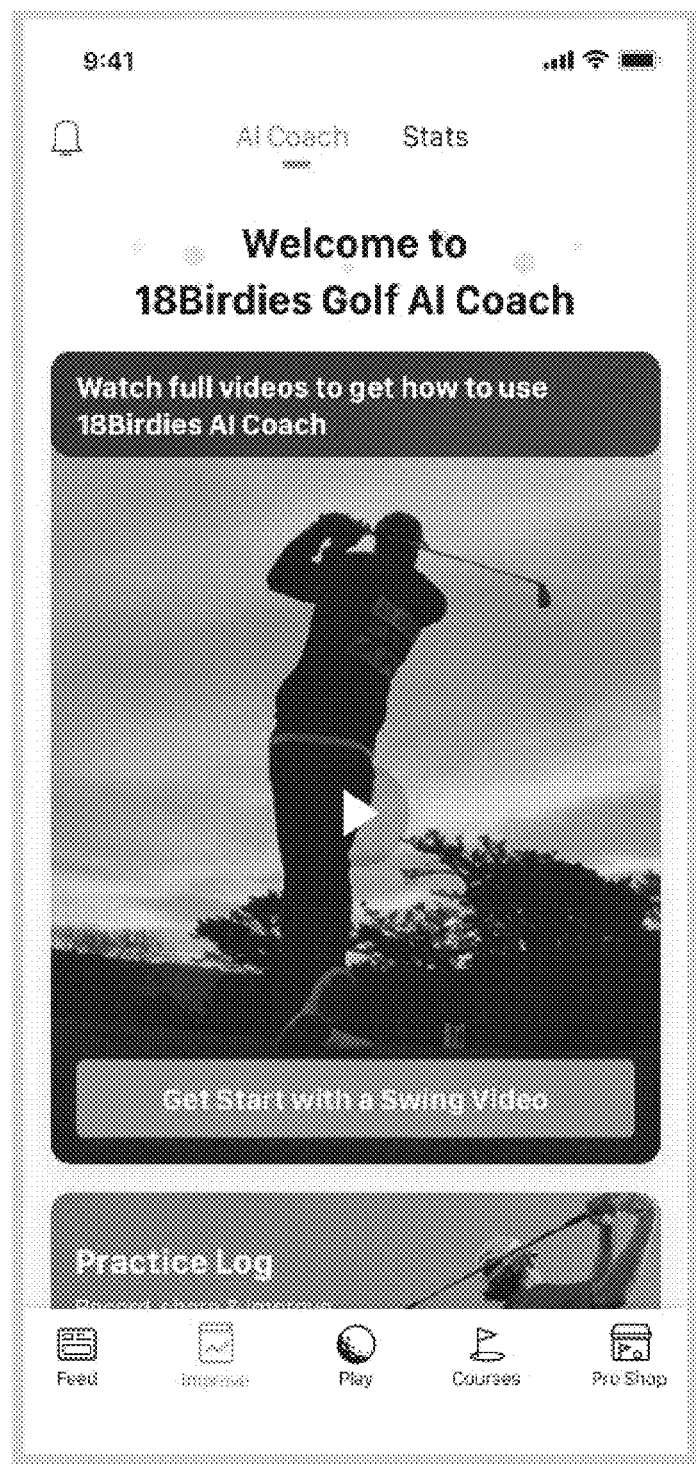
FIG. 8 shows a non-limiting golf swing analysis GUI; in this case, a GUI for a second home screen.
Figure 9:
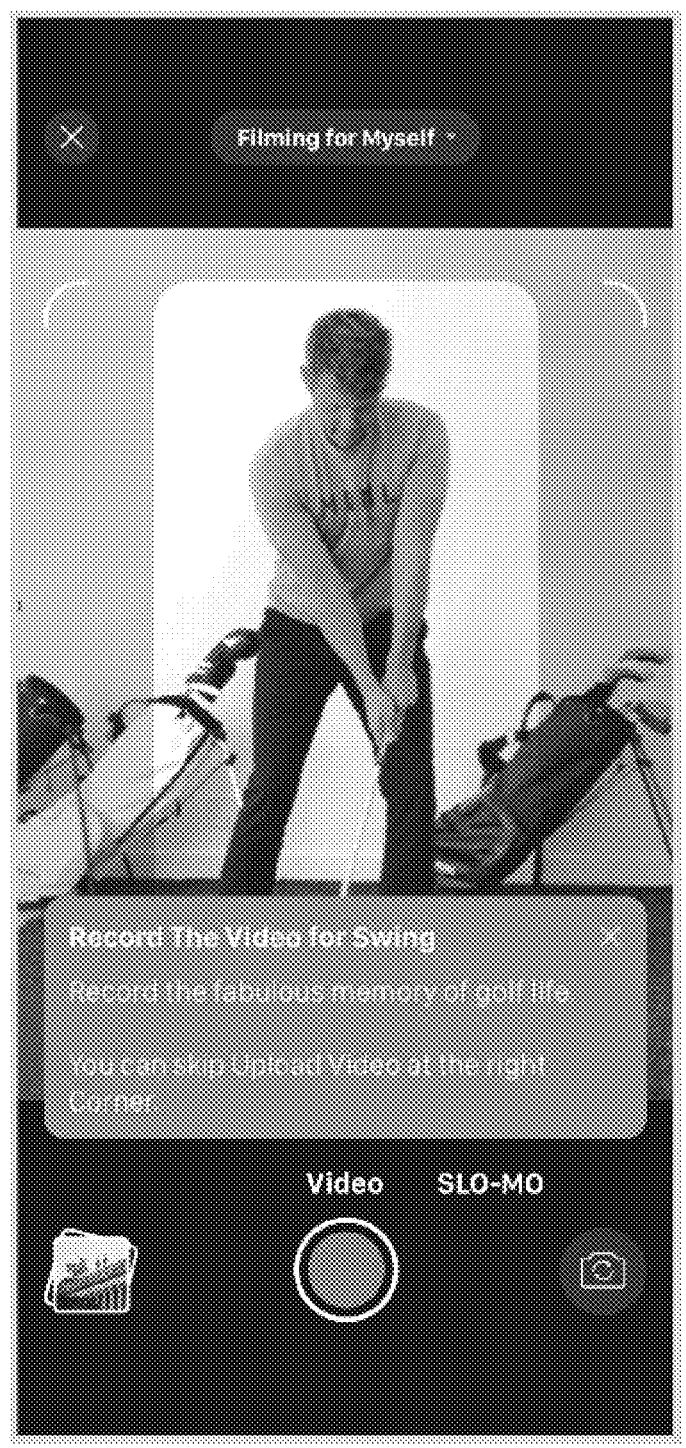
FIG. 9 shows a non-limiting golf swing analysis GUI; in this case, a GUI for instructions for recording a golf swing video.
Figure 10:
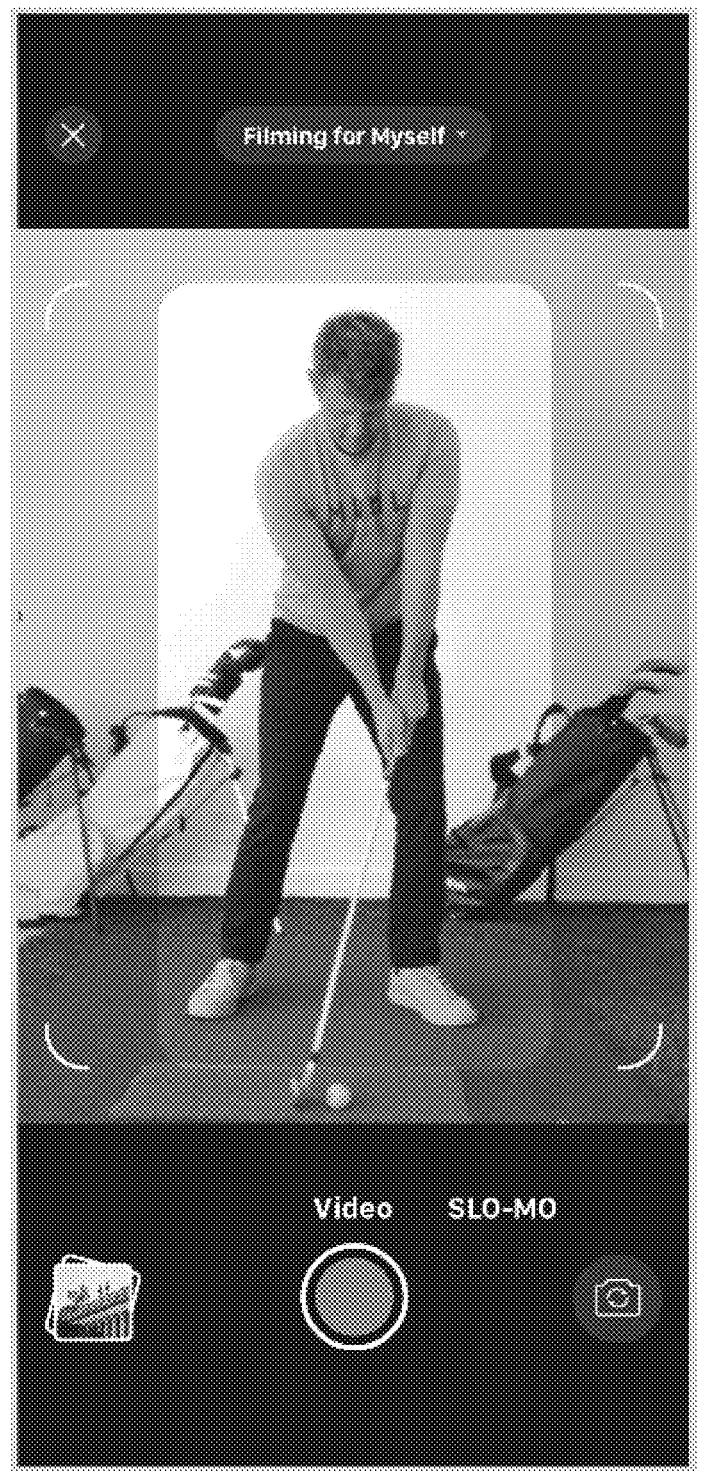
FIG. 10 shows a non-limiting golf swing analysis GUI; in this case, a GUI for recording a golf swing video.
Figure 11:
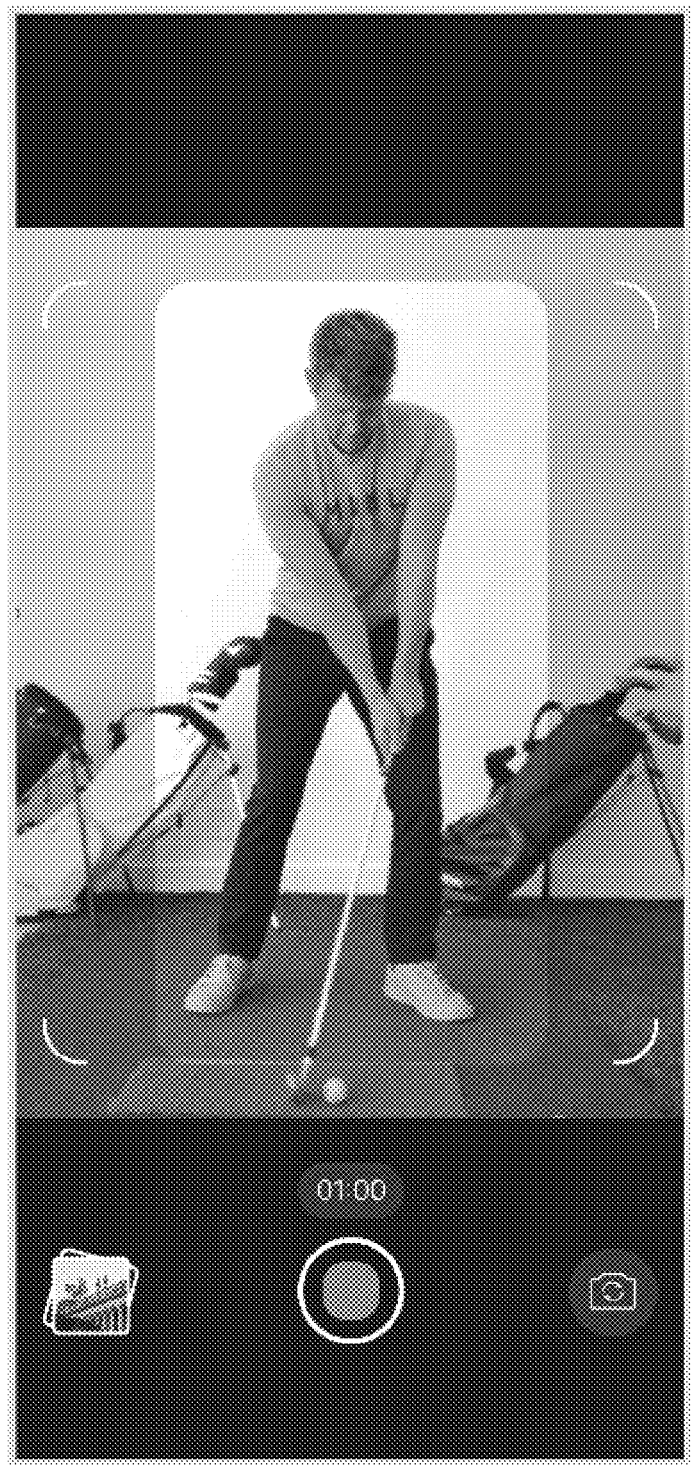
FIG. 11 shows a non-limiting golf swing analysis GUI; in this case, a GUI for viewing a golf swing video.
Figure 12:
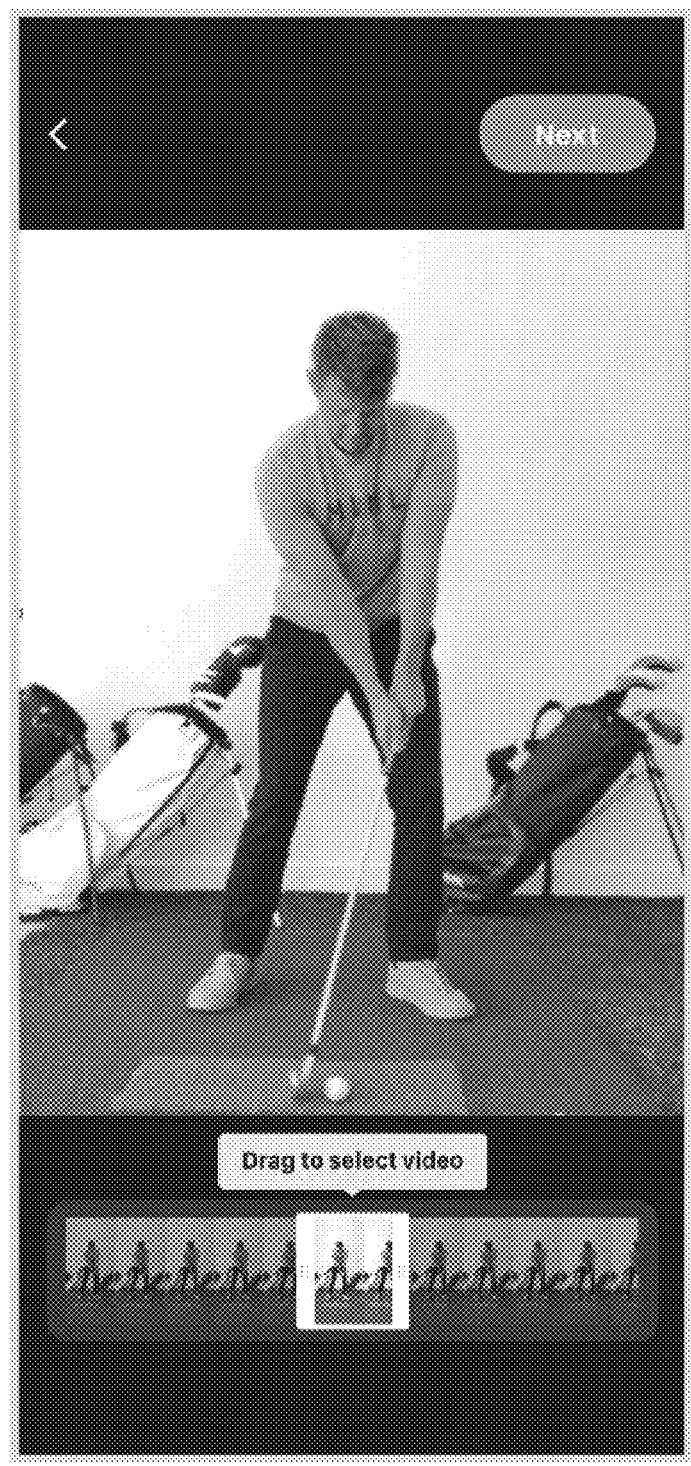
FIG. 12 shows a non-limiting golf swing analysis GUI; in this case, a GUI for viewing individual frames of a golf swing video.
Figure 13:
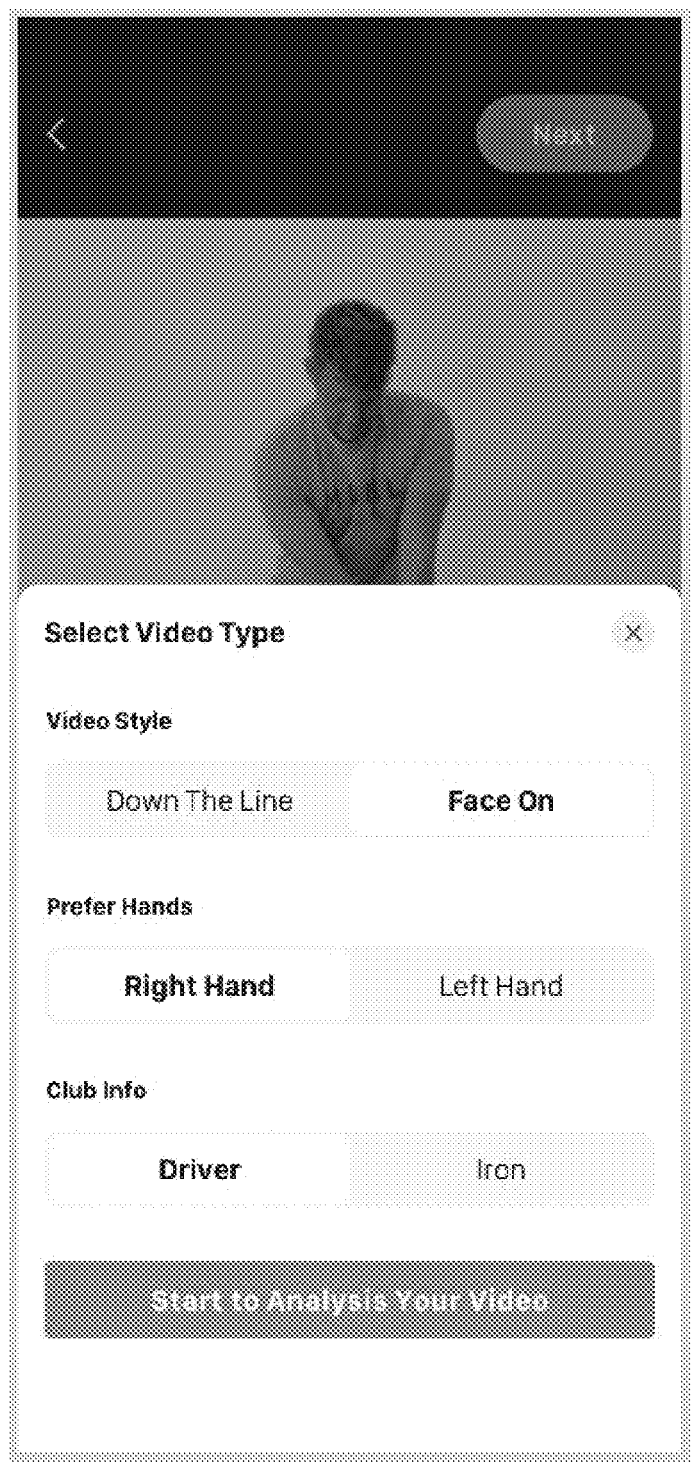
FIG. 13 shows a non-limiting golf swing analysis GUI; in this case, a GUI for modifying an input variable associated with the golf swing video.
Figure 14:
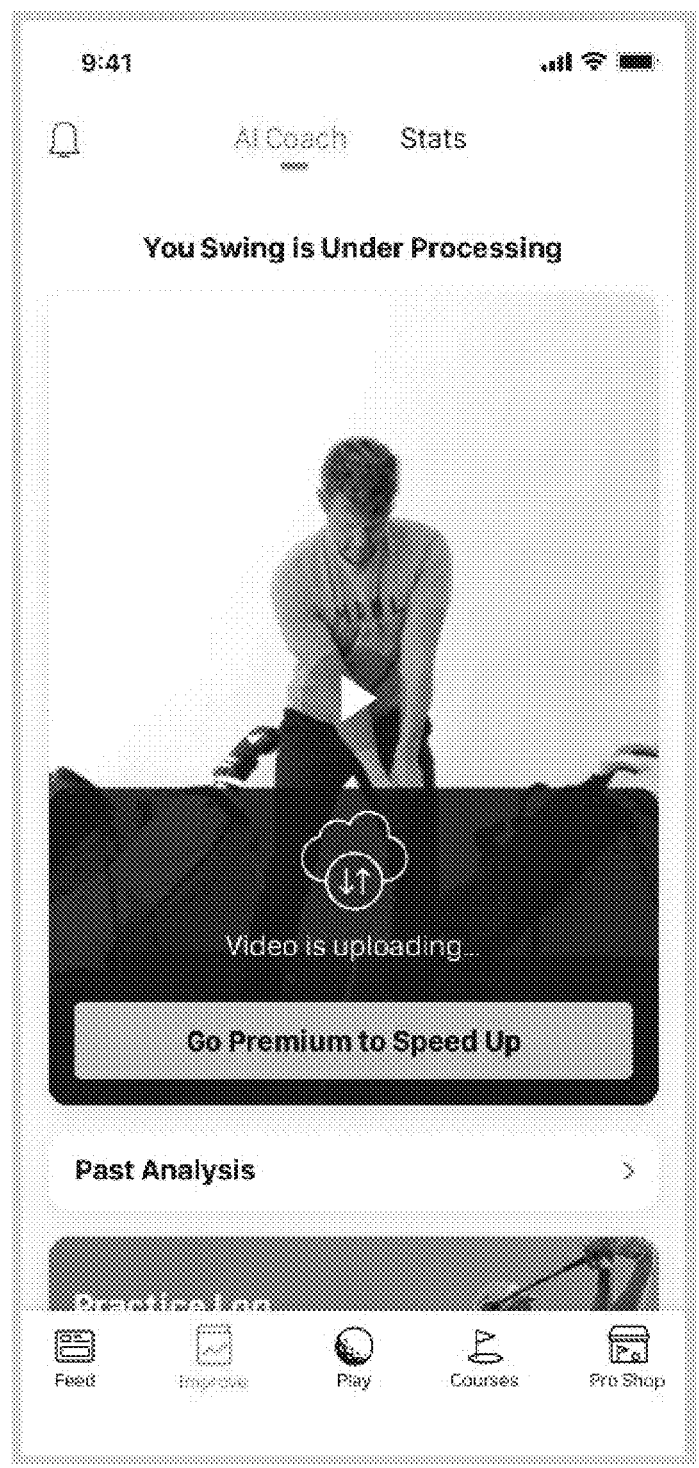
FIG. 14 shows a non-limiting golf swing analysis GUI; in this case, a GUI for a notification that the golf swing video is being uploaded.
Figure 15:
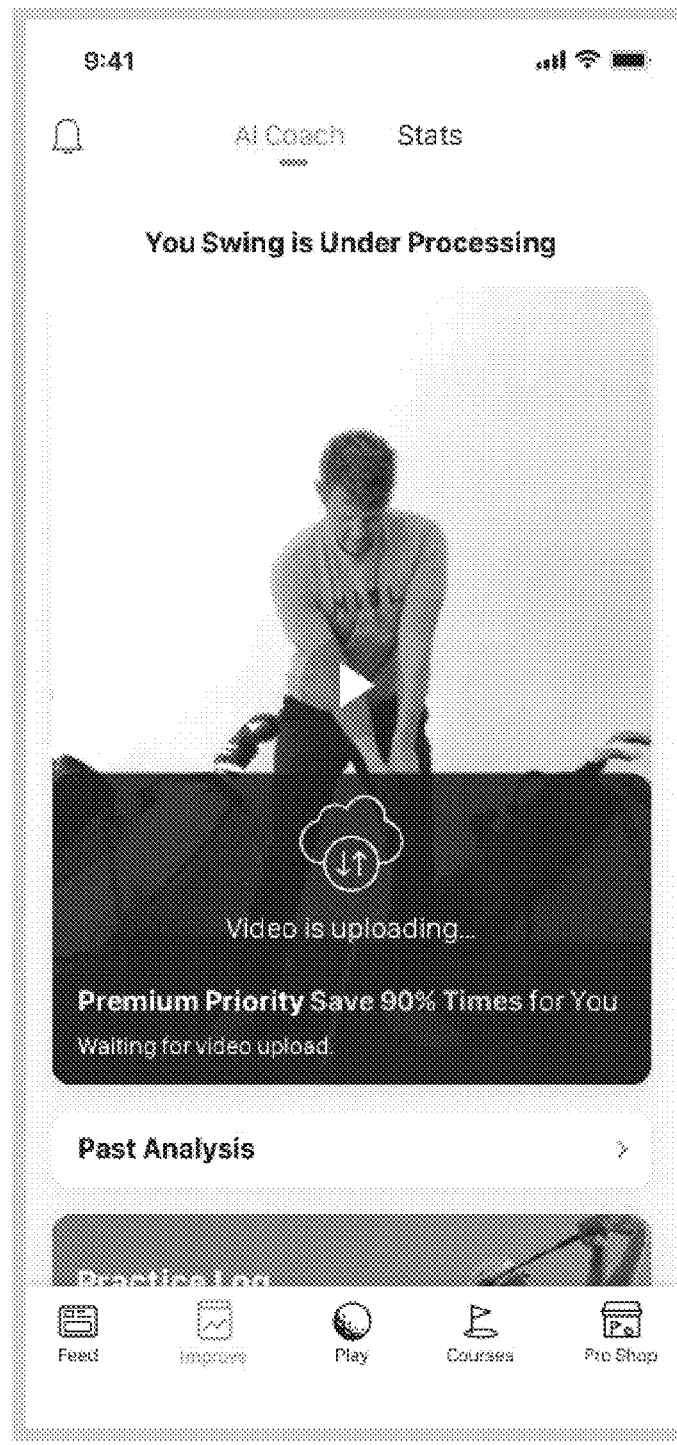
FIG. 15 shows a non-limiting golf swing analysis GUI; in this case, a GUI for a notification of a video upload speed improvement upon an upgraded membership.
Figure 16:
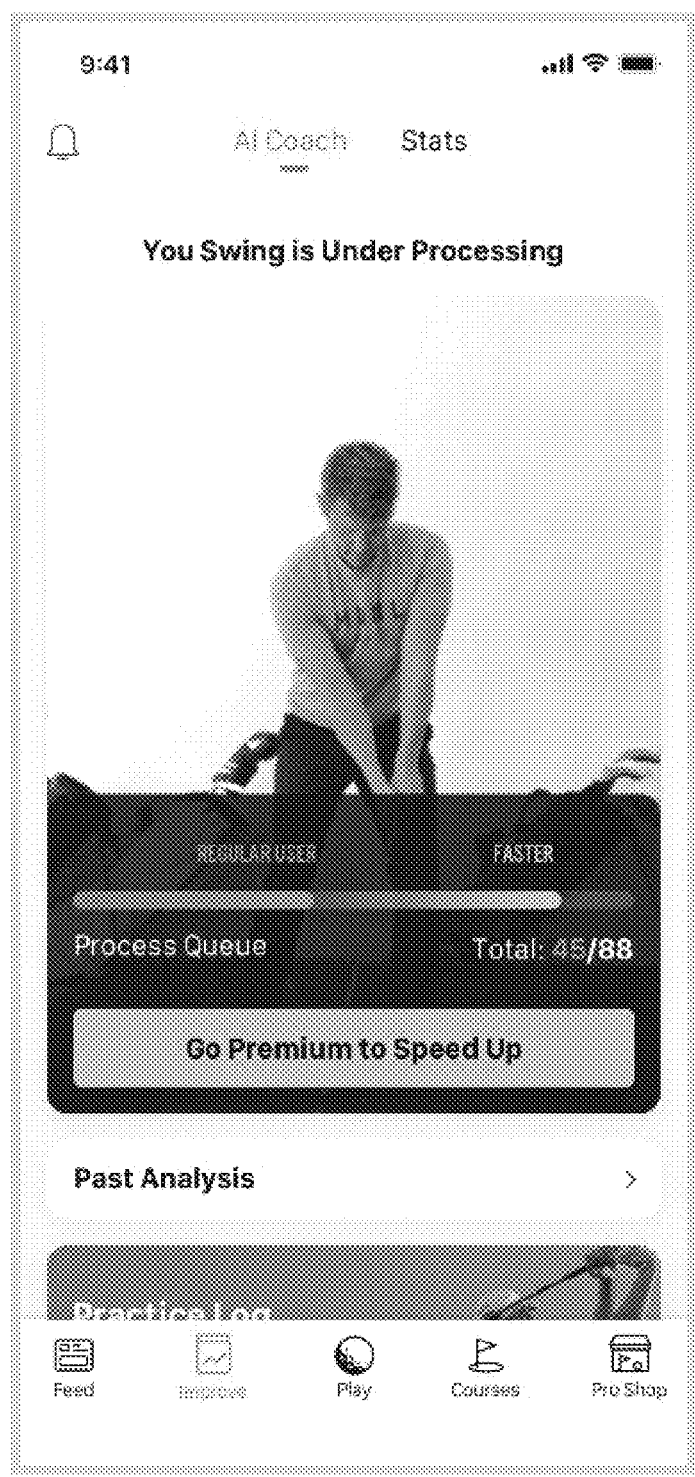
FIG. 16 shows a non-limiting golf swing analysis GUI; in this case, a GUI for a process queue for uploading a golf swing video for a regular user.
Figure 17:
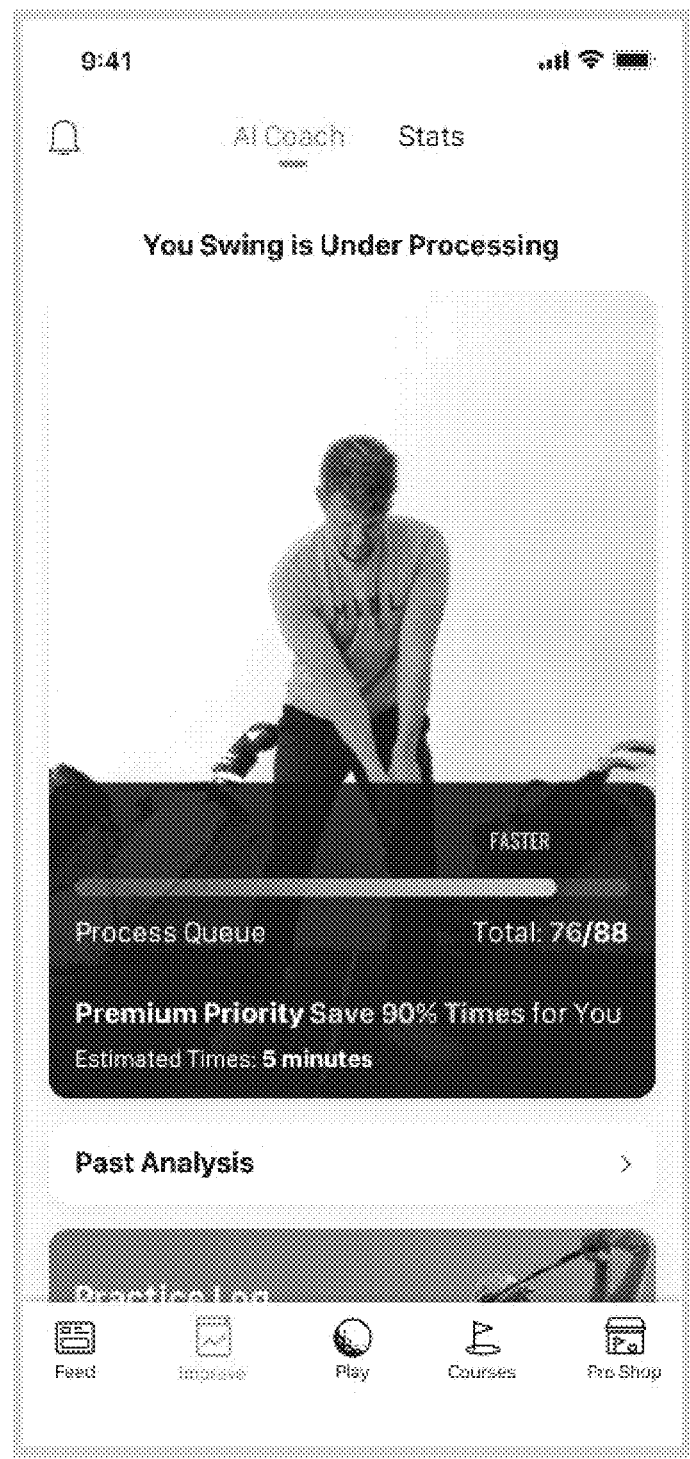
FIG. 17 shows a non-limiting golf swing analysis GUI; in this case, a GUI for a process queue for uploading a golf swing video for a premium user.
Figure 18:
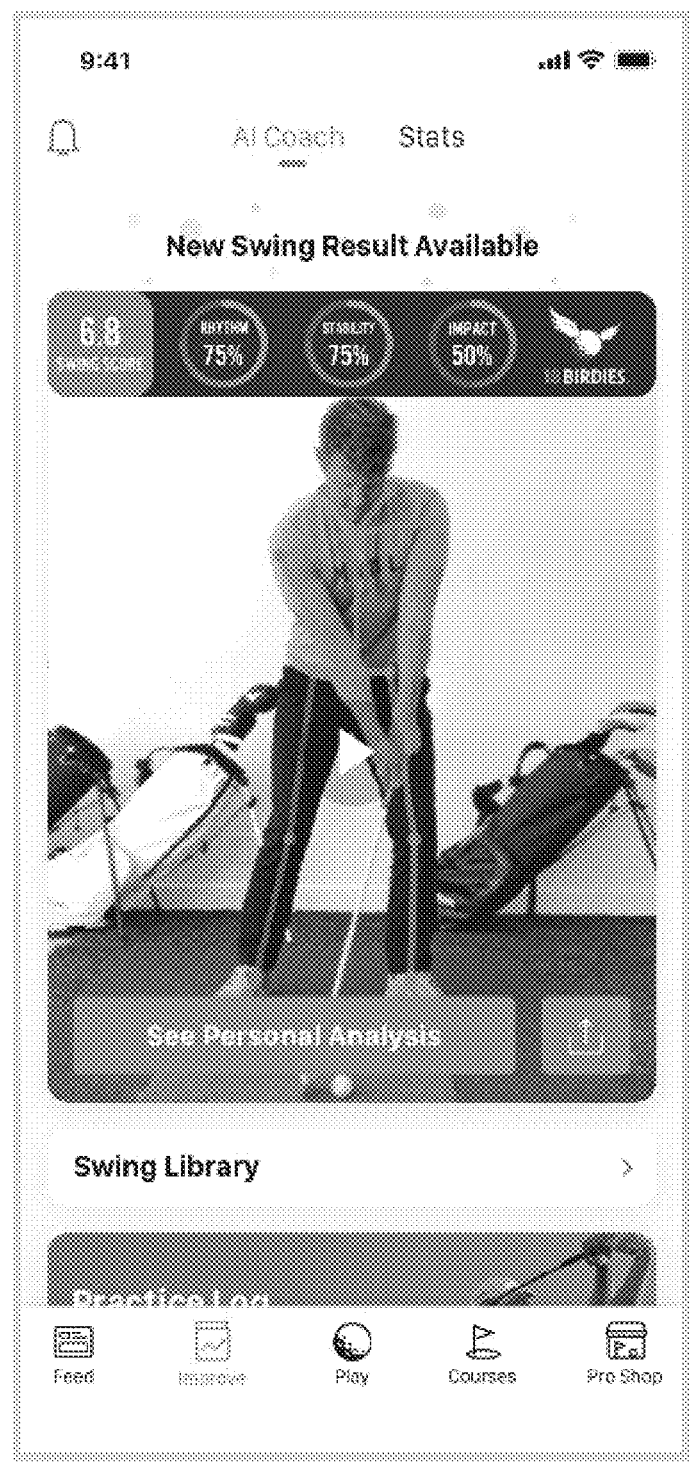
FIG. 18 shows a non-limiting golf swing analysis GUI; in this case, a GUI for displaying the results of the analysis of the golf swing video.
Figure 19:
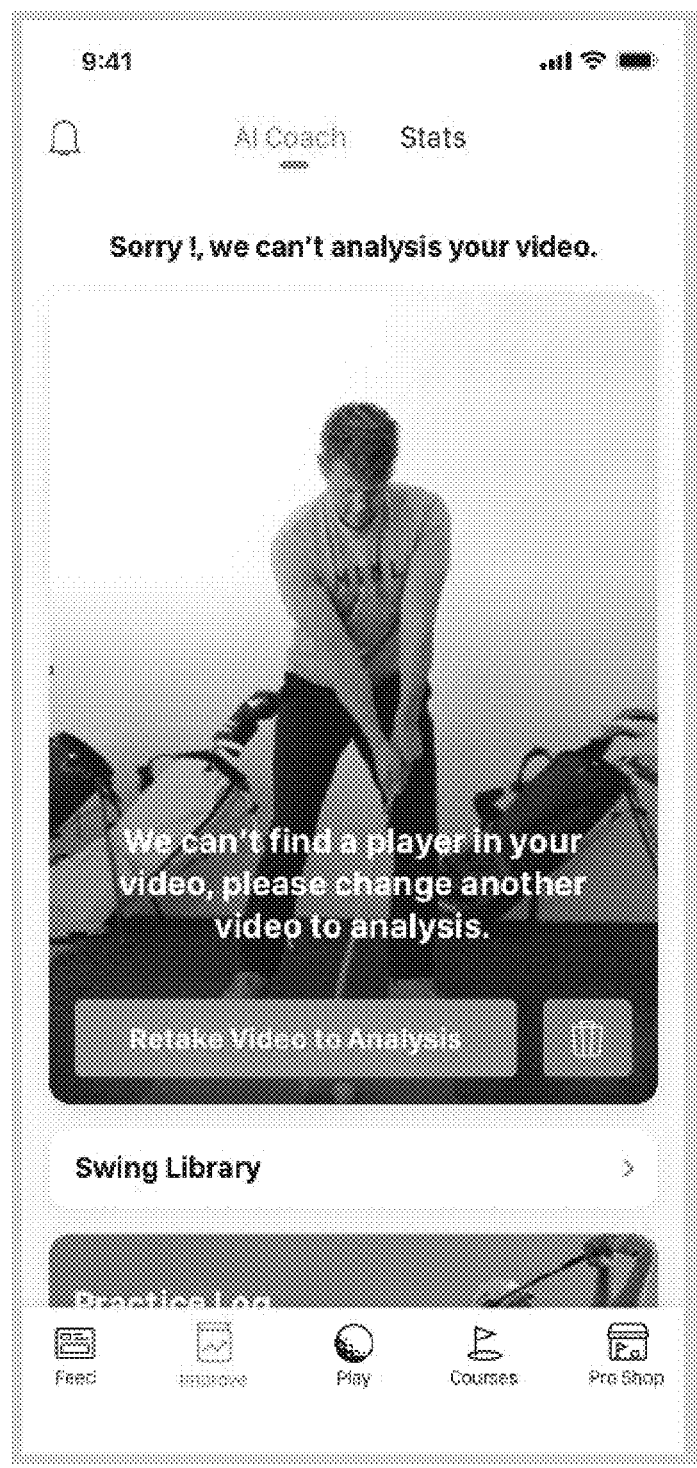
FIG. 19 shows a non-limiting golf swing analysis GUI; in this case, a GUI for displaying a video analysis error.
Figure 20:
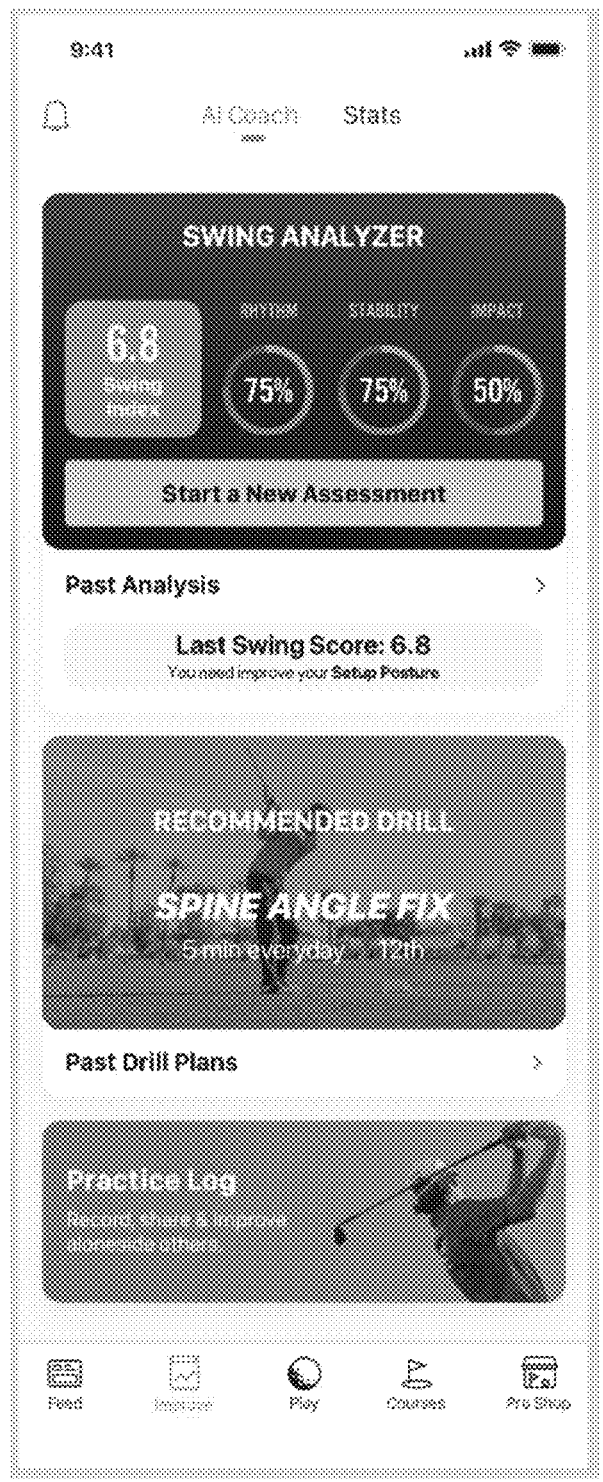
FIG. 20 shows a non-limiting golf swing analysis GUI; in this case, a GUI for a swing analyzer and recommended drills.
Figure 21:
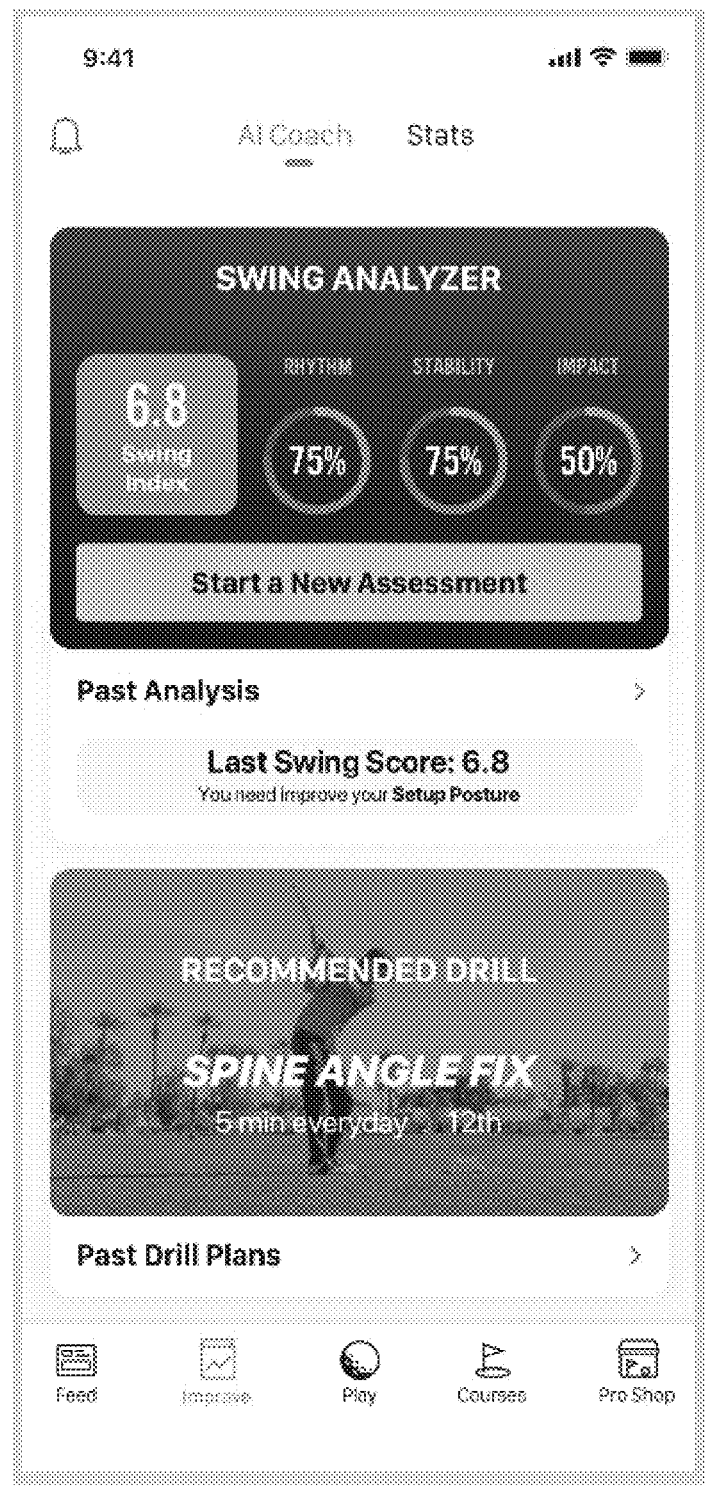
FIG. 21 shows a non-limiting golf swing analysis GUI; in this case, a GUI for a swing score.
Figure 22:
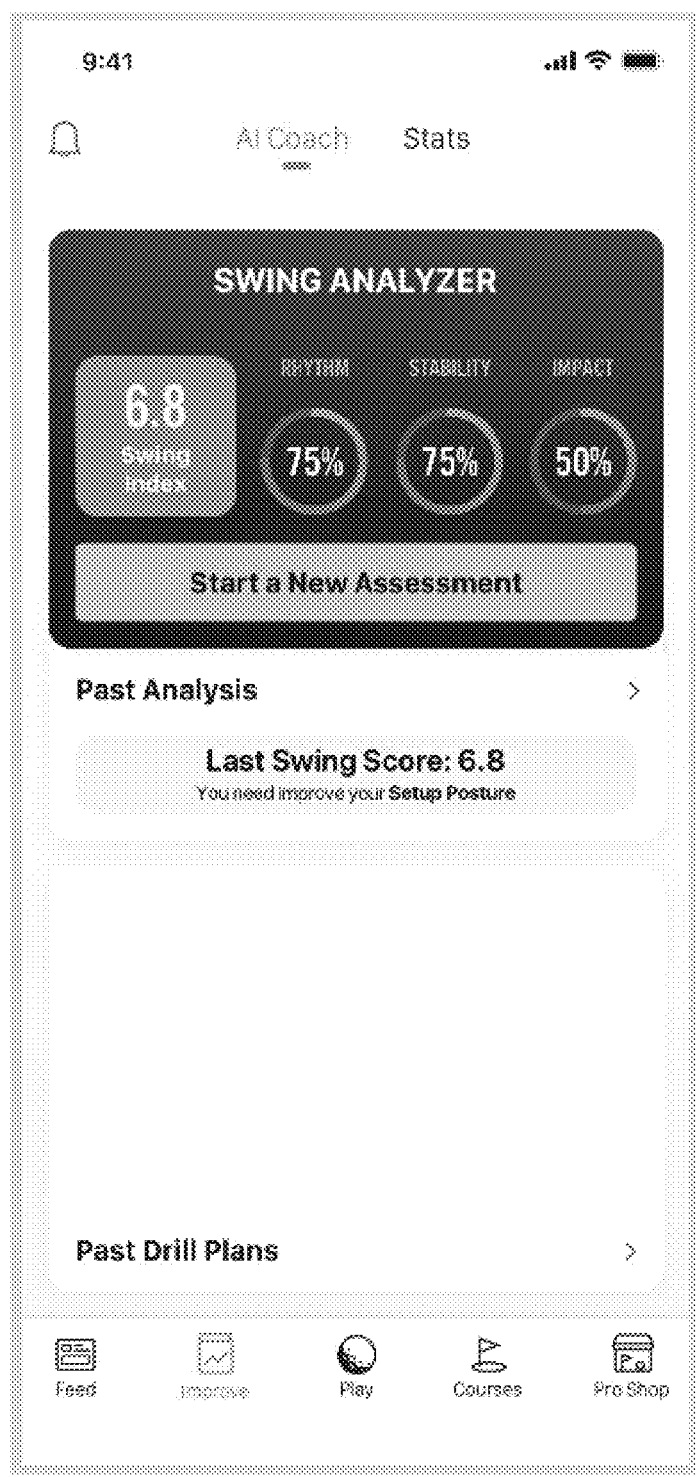
FIG. 22 shows a non-limiting golf swing analysis GUI; in this case, a GUI for a swing analyzer without past drill plans.
Figure 23:
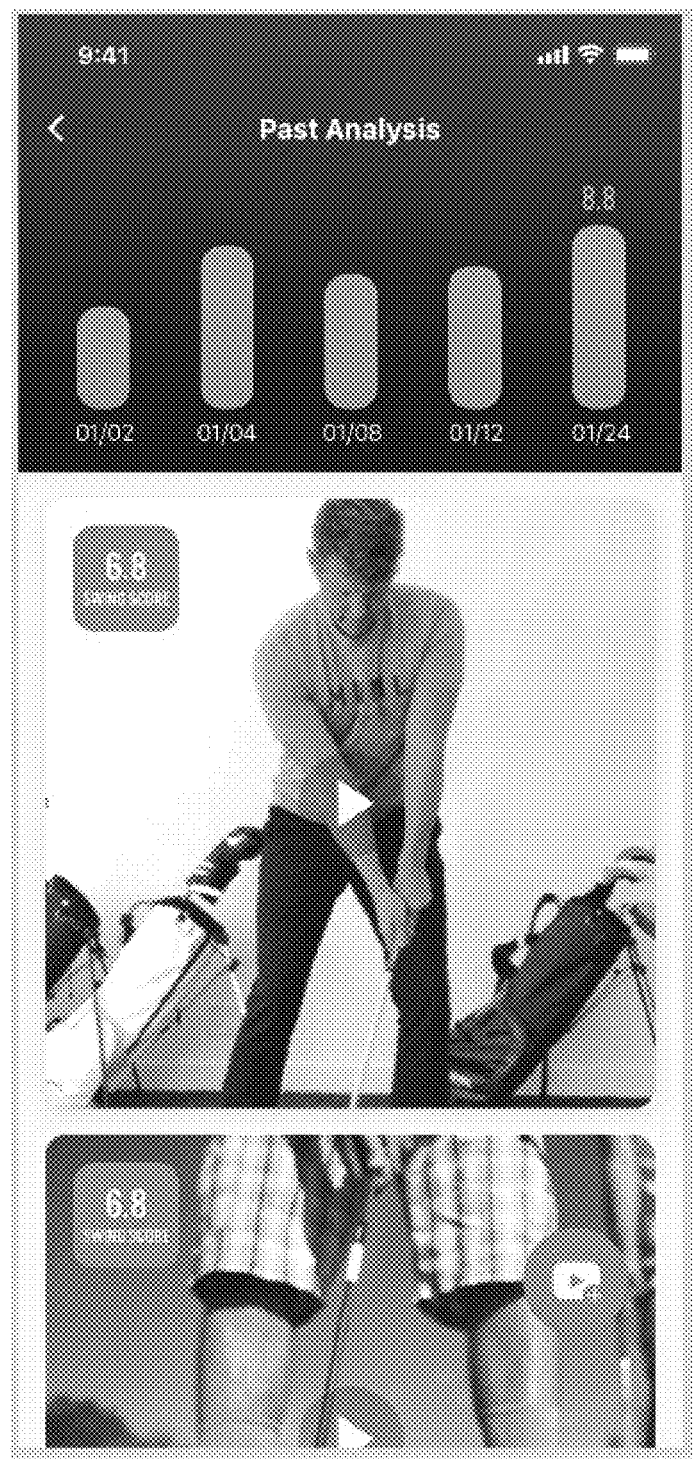
FIG. 23 shows a non-limiting golf swing analysis GUI; in this case, a GUI for viewing scores of past analyses.
Figure 24:
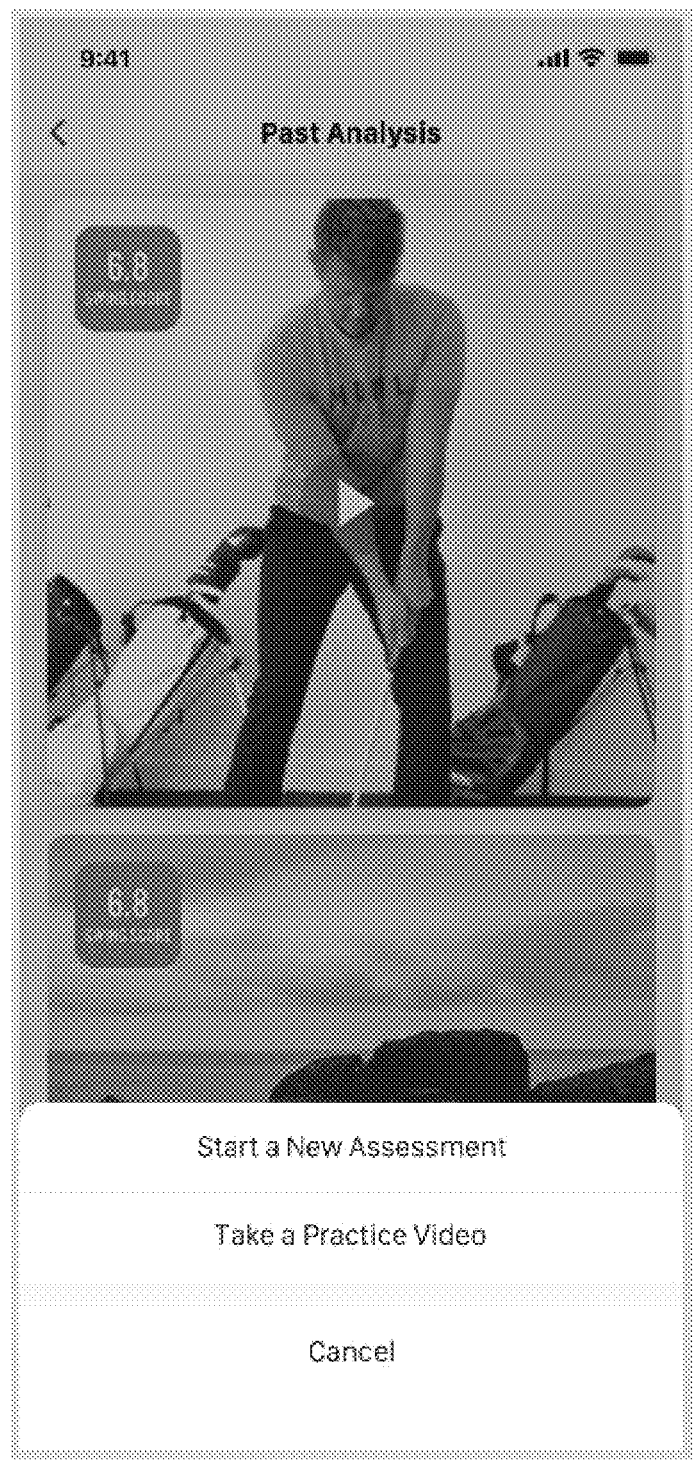
FIG. 24 shows a non-limiting golf swing analysis GUI; in this case, a GUI for starting a new assessment or practice video.
Figure 25:
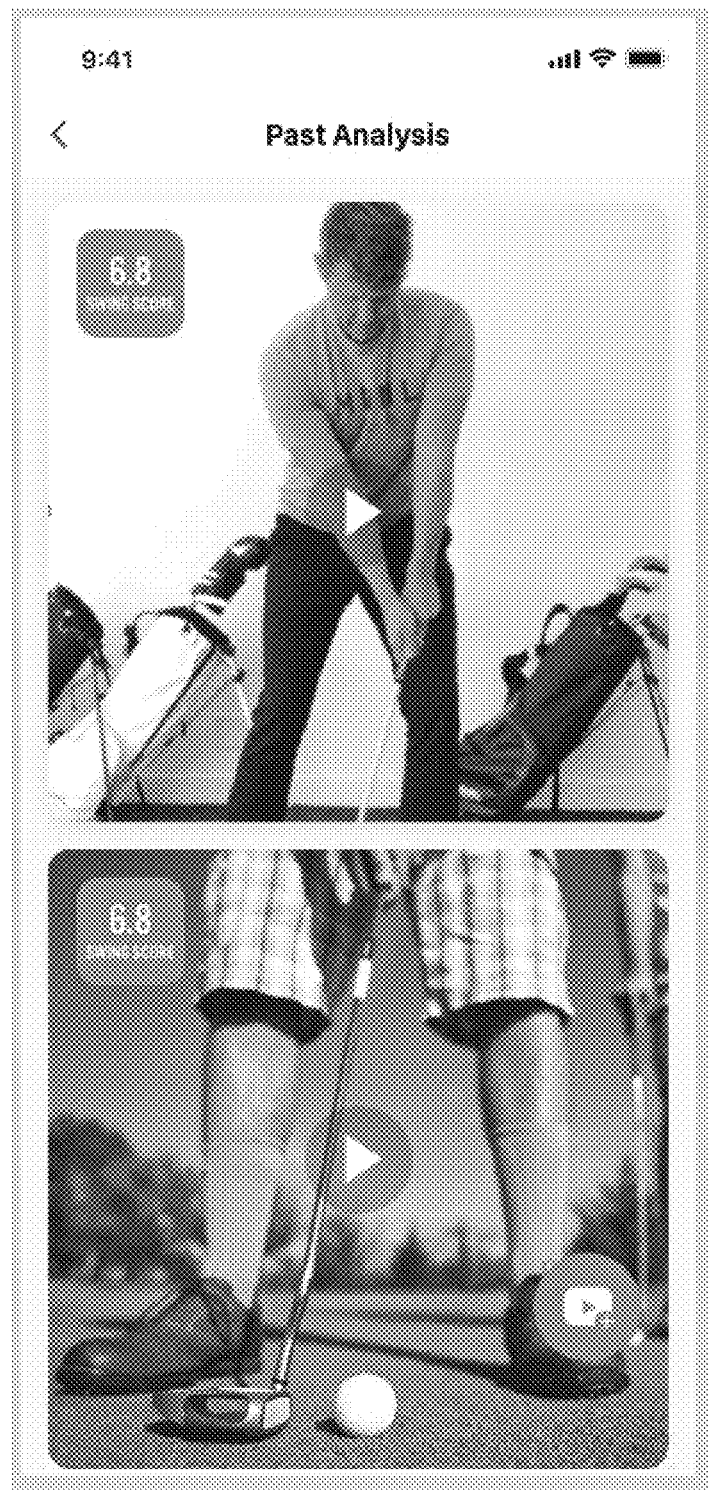
FIG. 25 shows a non-limiting golf swing analysis GUI; in this case, a GUI for viewing videos of past analyses.
Figure 26:
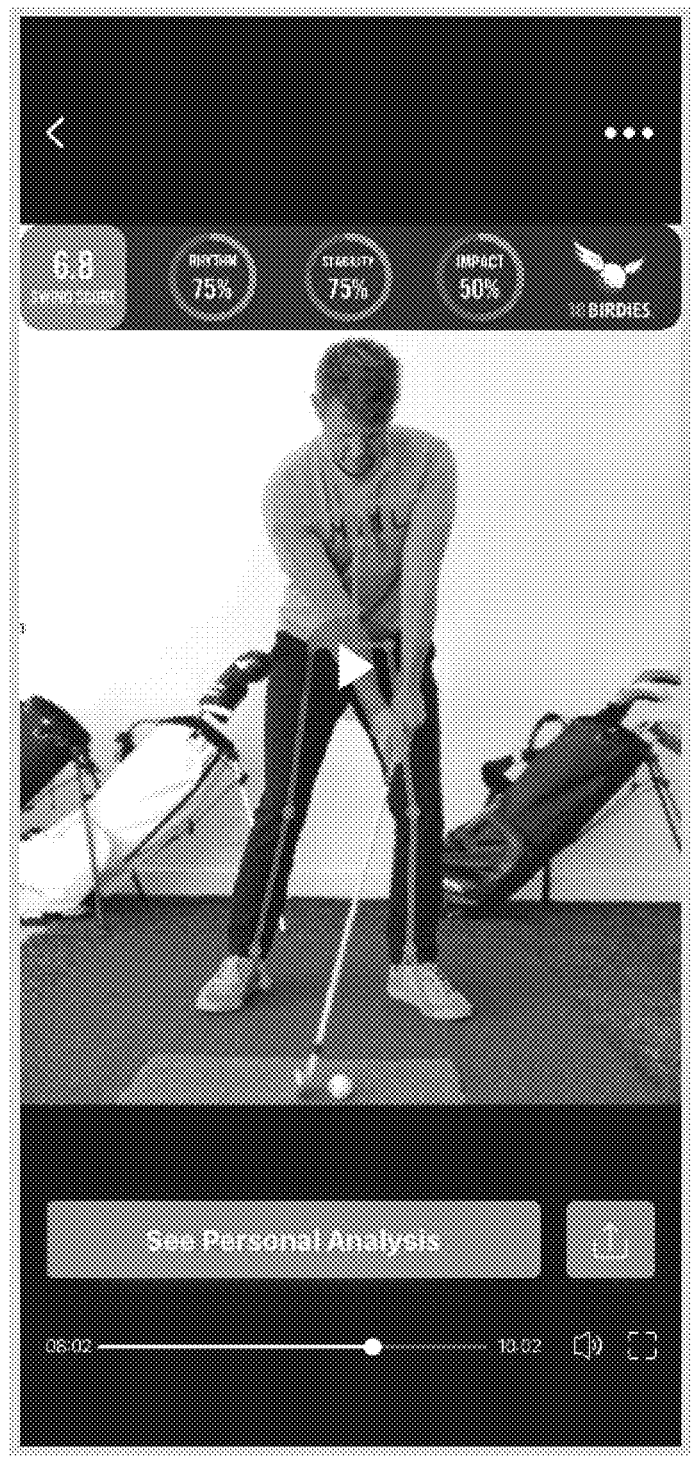
FIG. 26 shows a non-limiting golf swing analysis GUI; in this case, a GUI for viewing an analysis.
Figure 27:
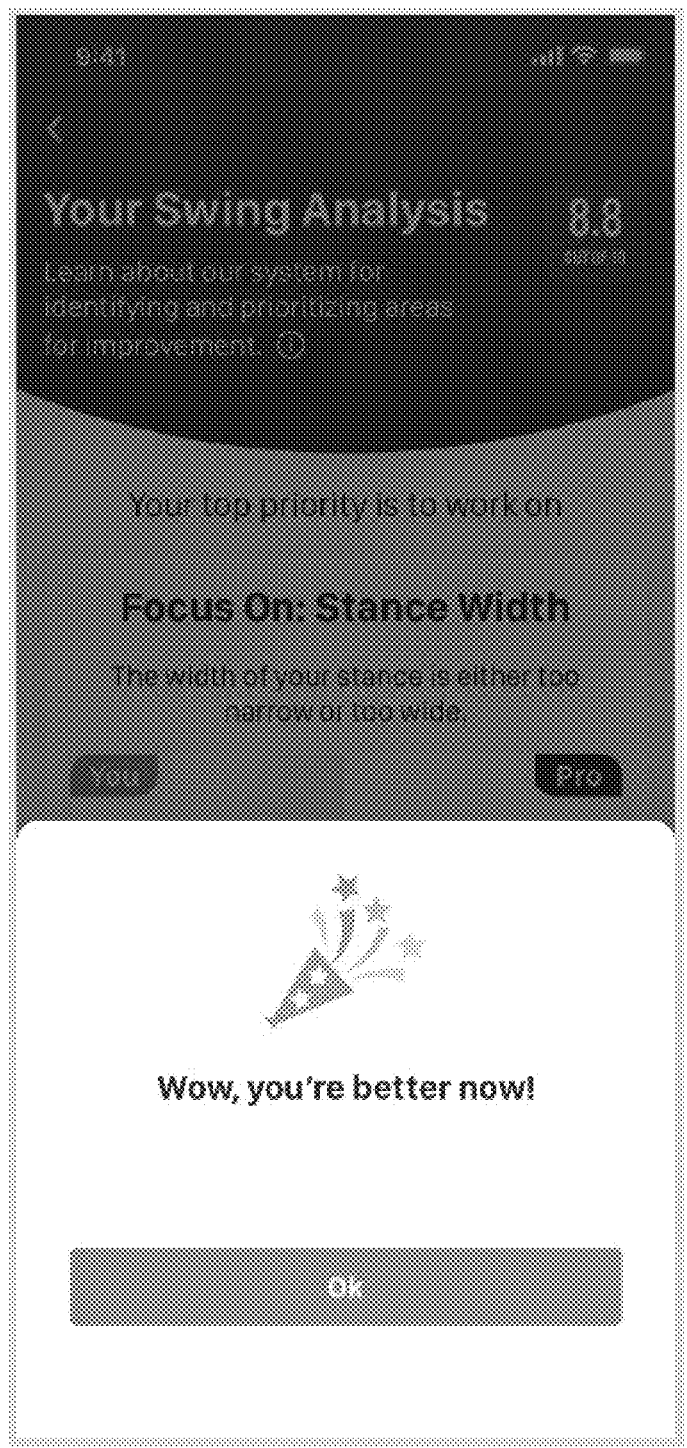
FIG. 27 shows a non-limiting golf swing analysis GUI; in this case, a GUI for an analysis improvement notification.
Figure 28:
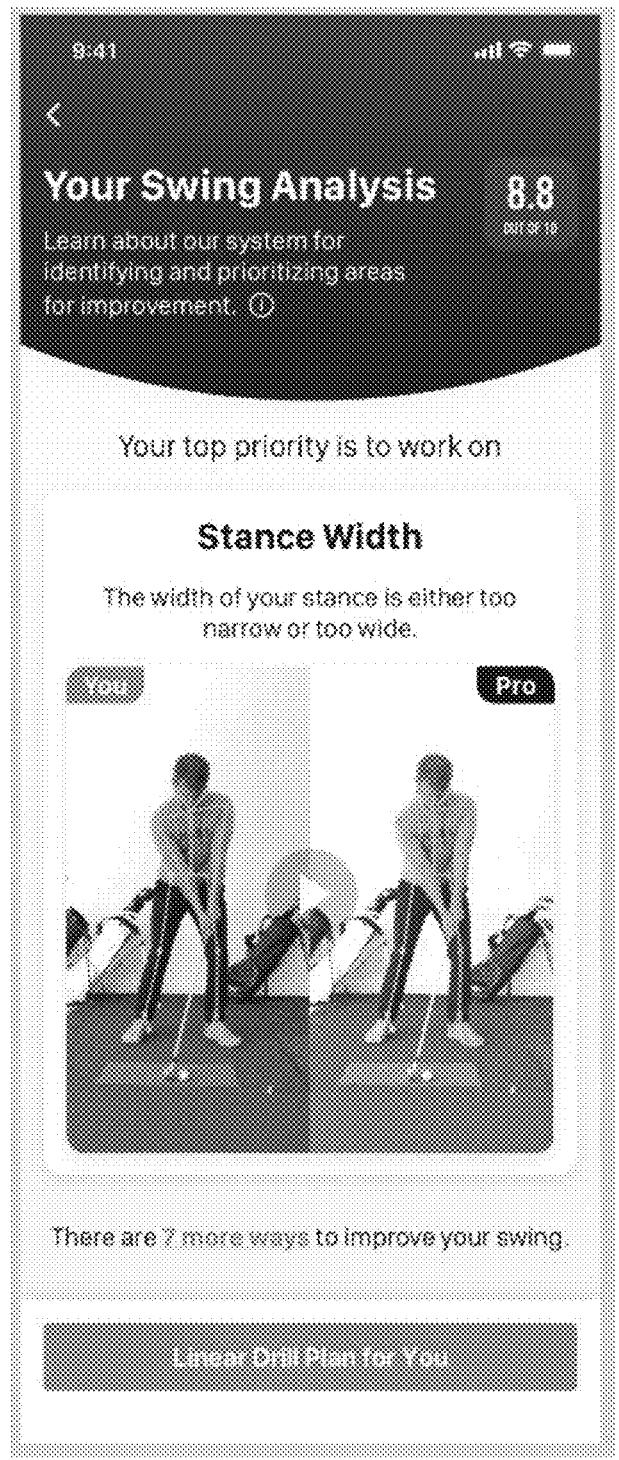
FIG. 28 shows a non-limiting golf swing analysis GUI; in this case, a GUI for showing one or more ways to improve a golf swing.
Figure 29:
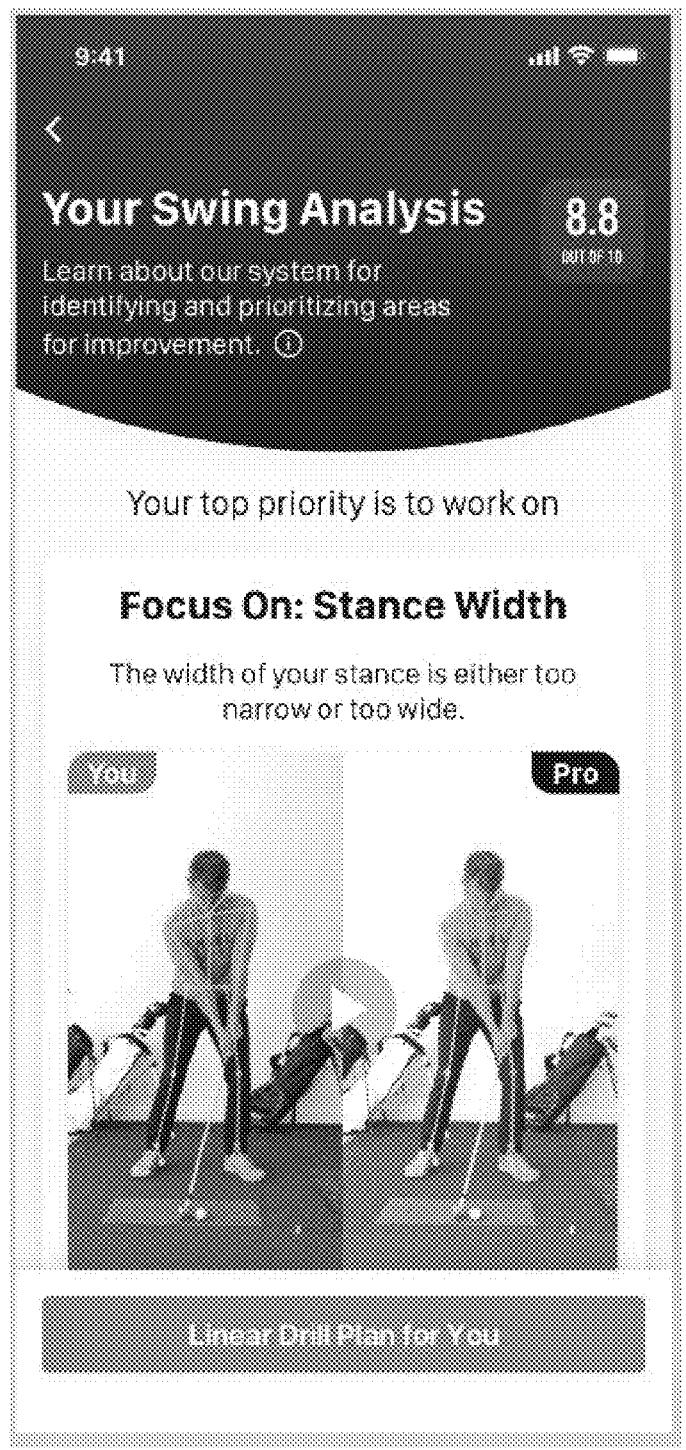
FIG. 29 shows a non-limiting golf swing analysis GUI; in this case, a GUI for a swing focus goal.
Figure 30:
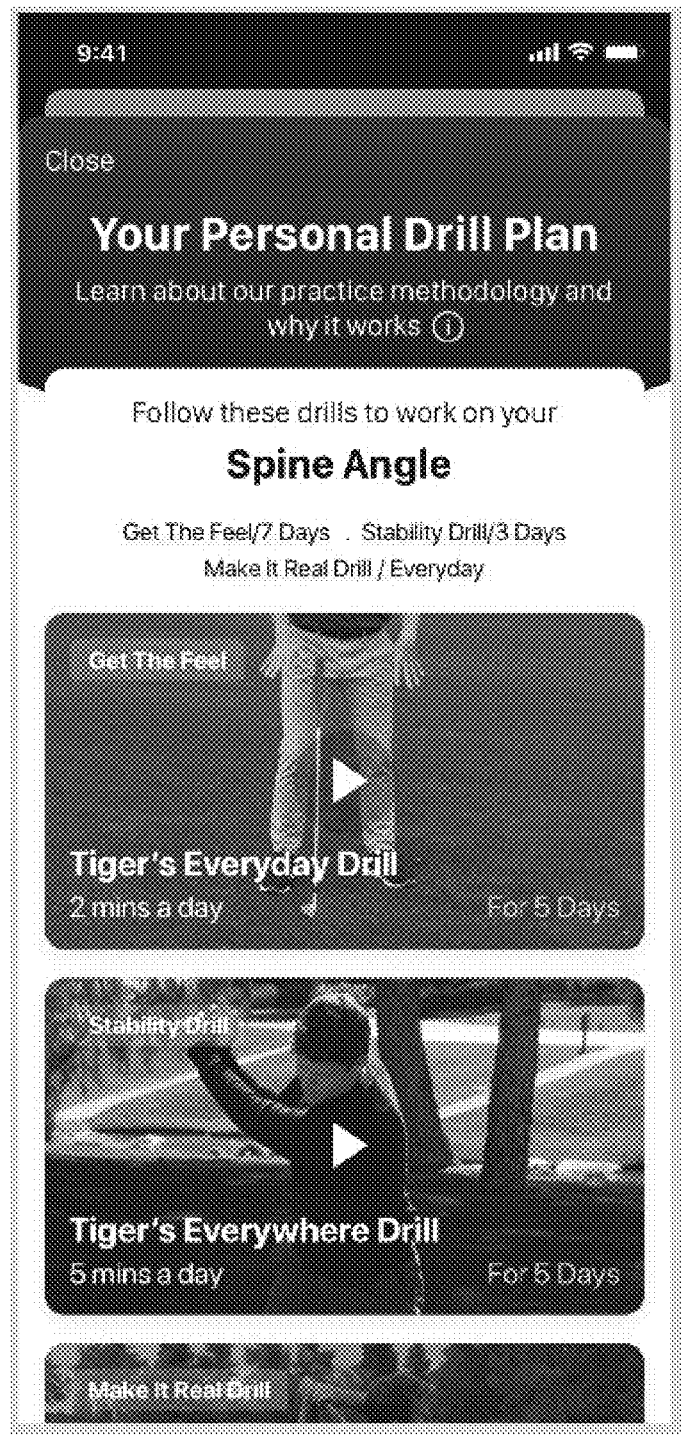
FIG. 30 shows a non-limiting golf swing analysis GUI; in this case, a GUI for displaying a personal drill plan.
Figure 31:
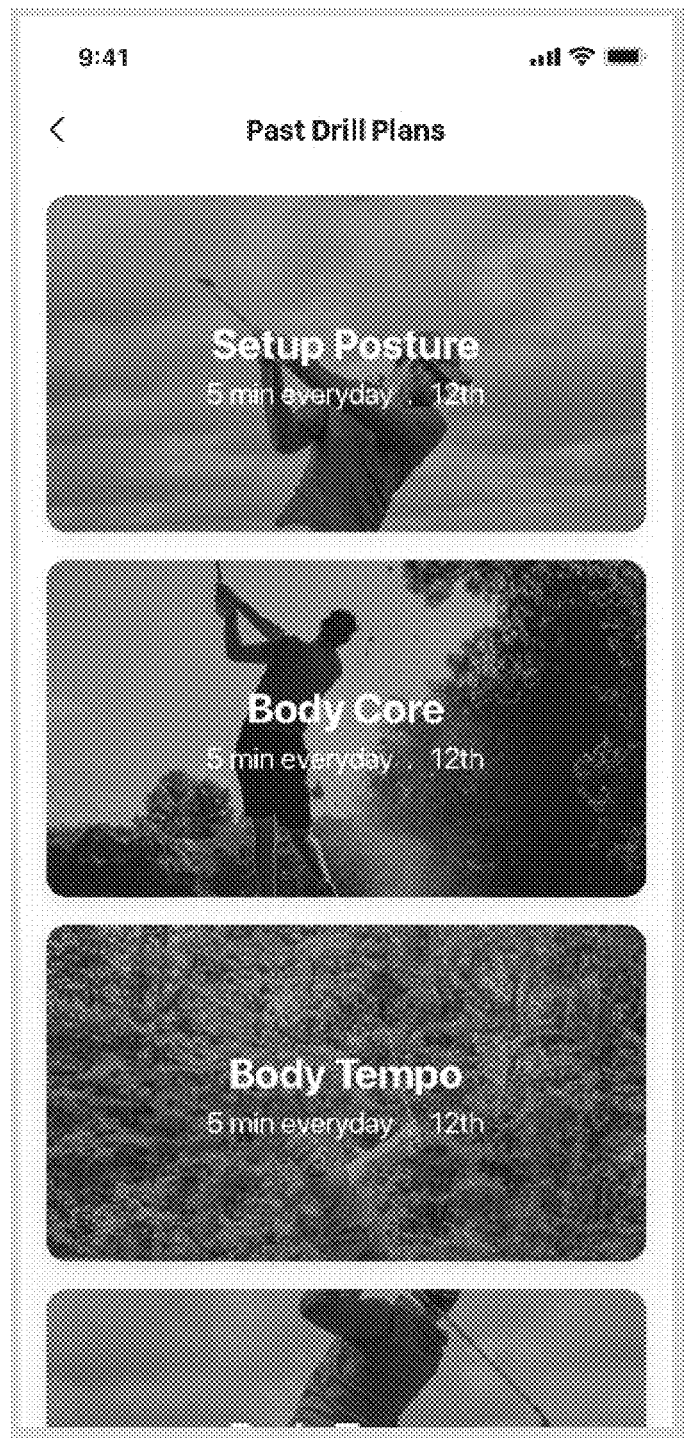
FIG. 31 shows a non-limiting golf swing analysis GUI; in this case, a GUI for displaying past drill plans.
Figure 32:
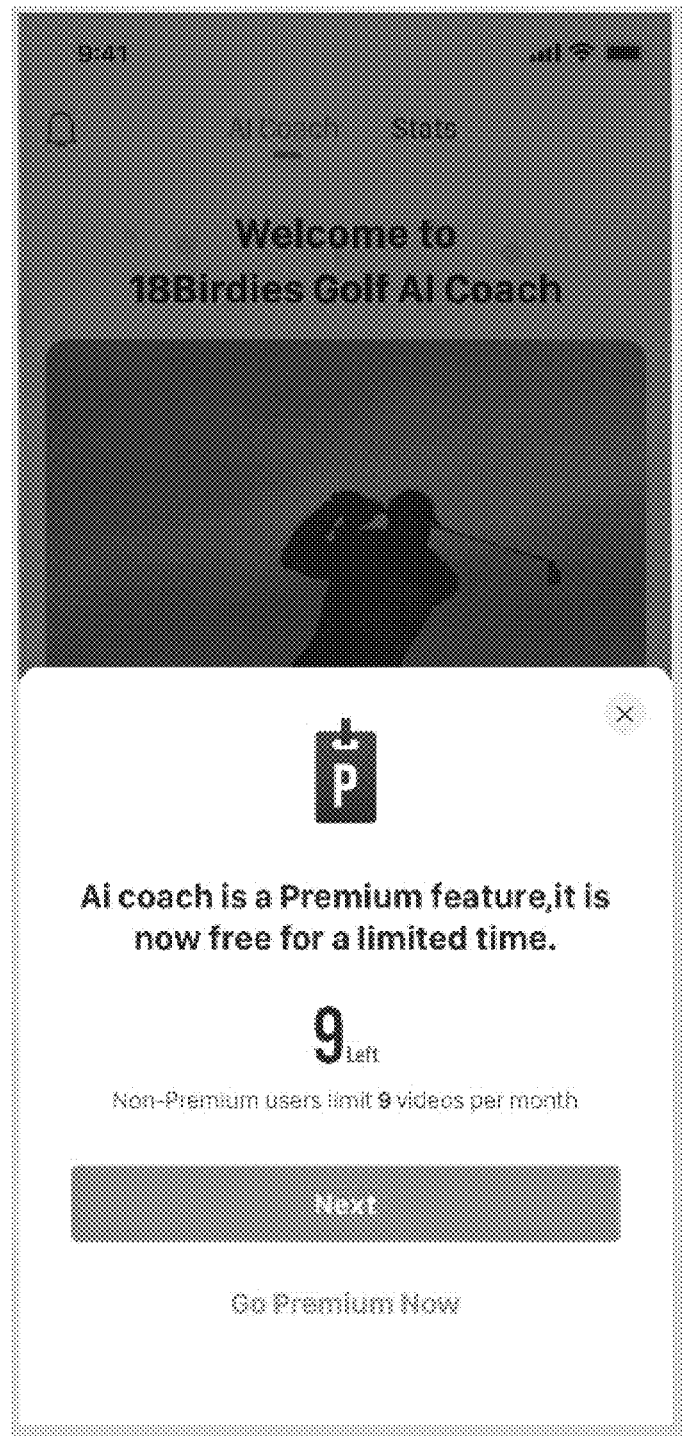
FIG. 32 shows a non-limiting golf swing analysis GUI; in this case, a GUI for displaying a notification of a number of non-premium videos remaining.
Figure 33:
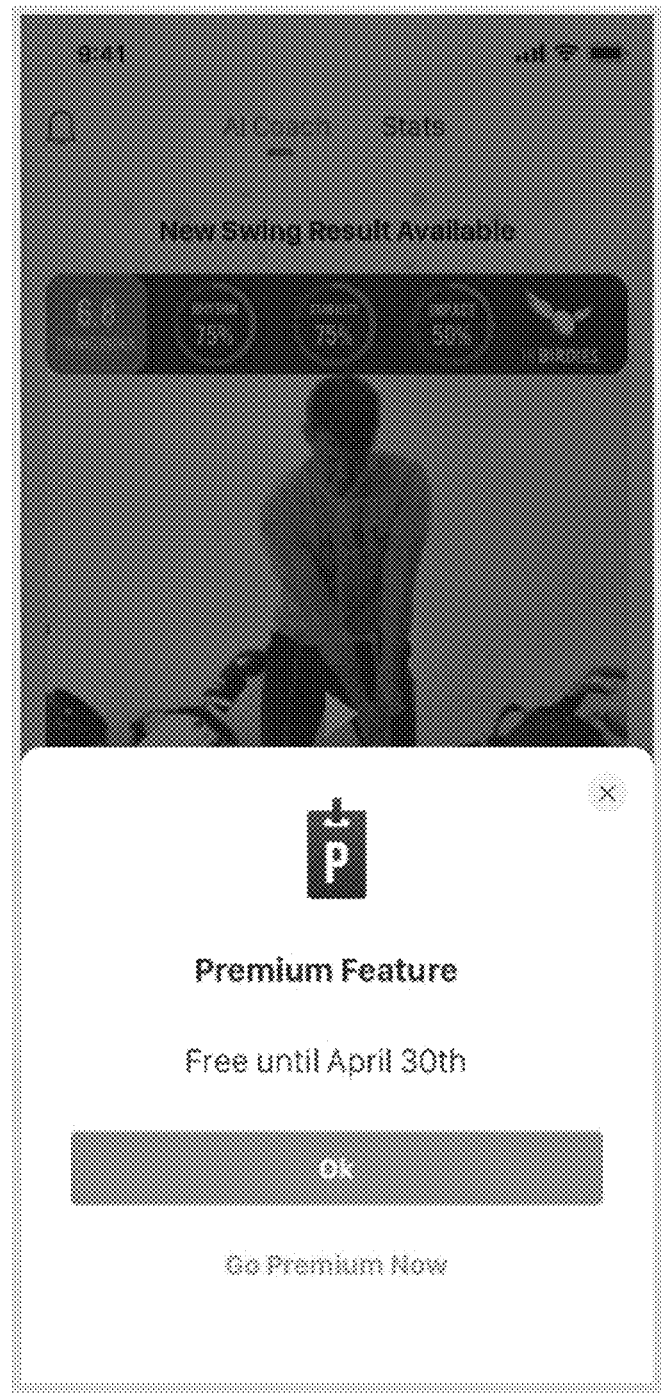
FIG. 33 shows a non-limiting golf swing analysis GUI; in this case, a GUI for a notification that a premium feature is free for a certain period.
Figure 34:
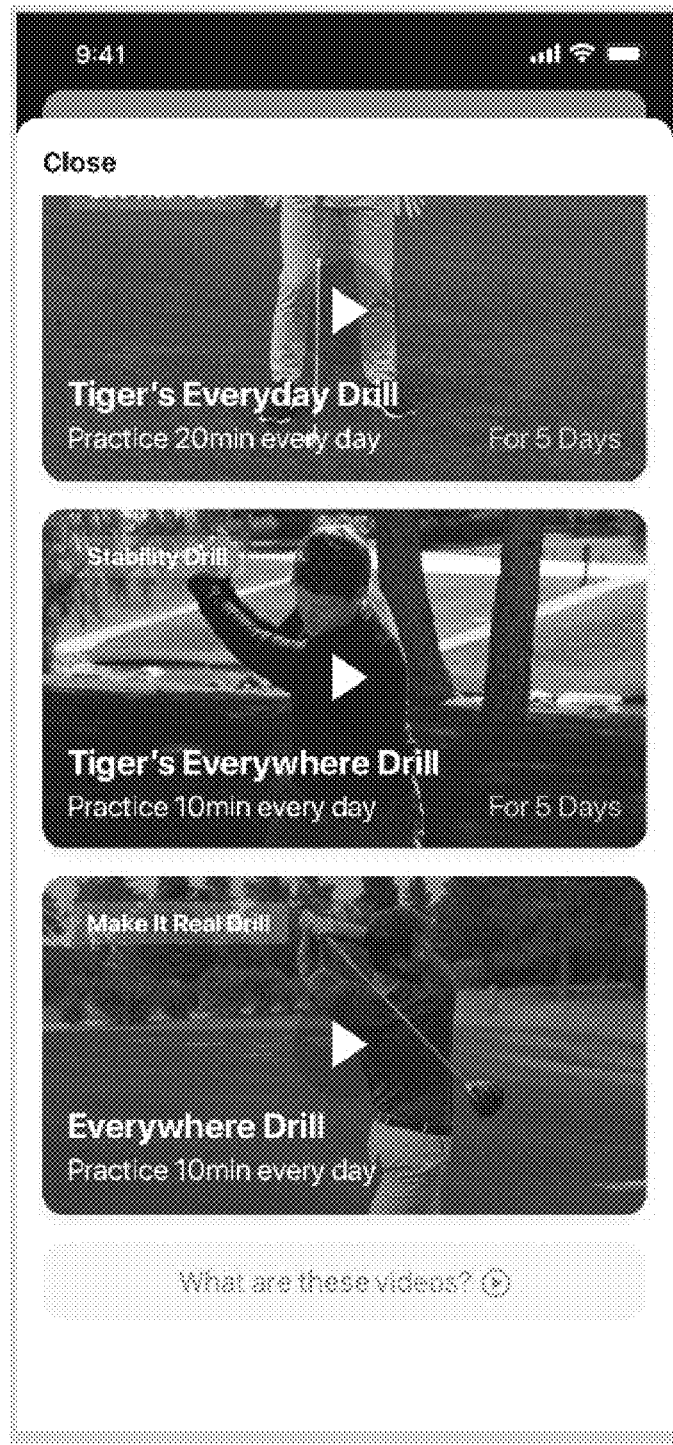
FIG. 34 shows a non-limiting golf swing analysis GUI; in this case, a GUI for accessing videos of drills.
Figure 35:
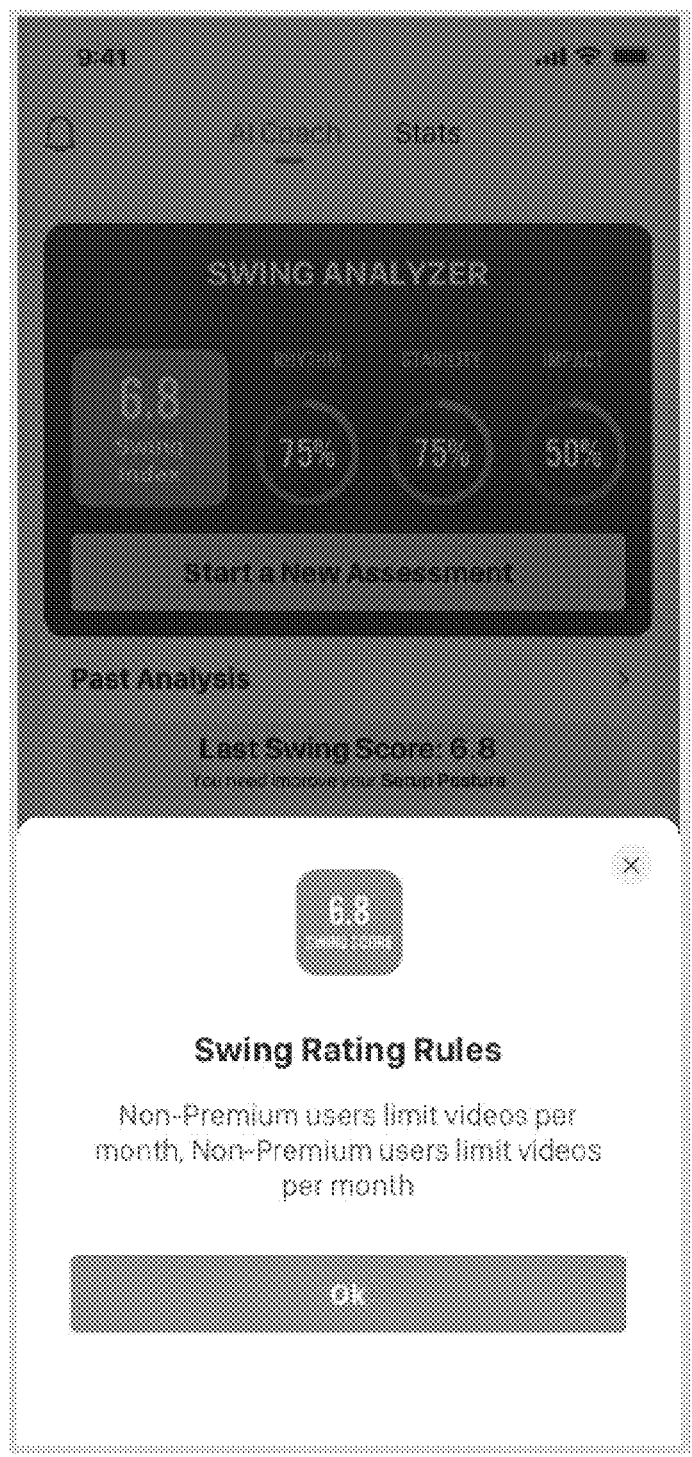
FIG. 35 shows a non-limiting golf swing analysis GUI; in this case, a GUI for a notification regarding swing rating rules.
Figure 36:
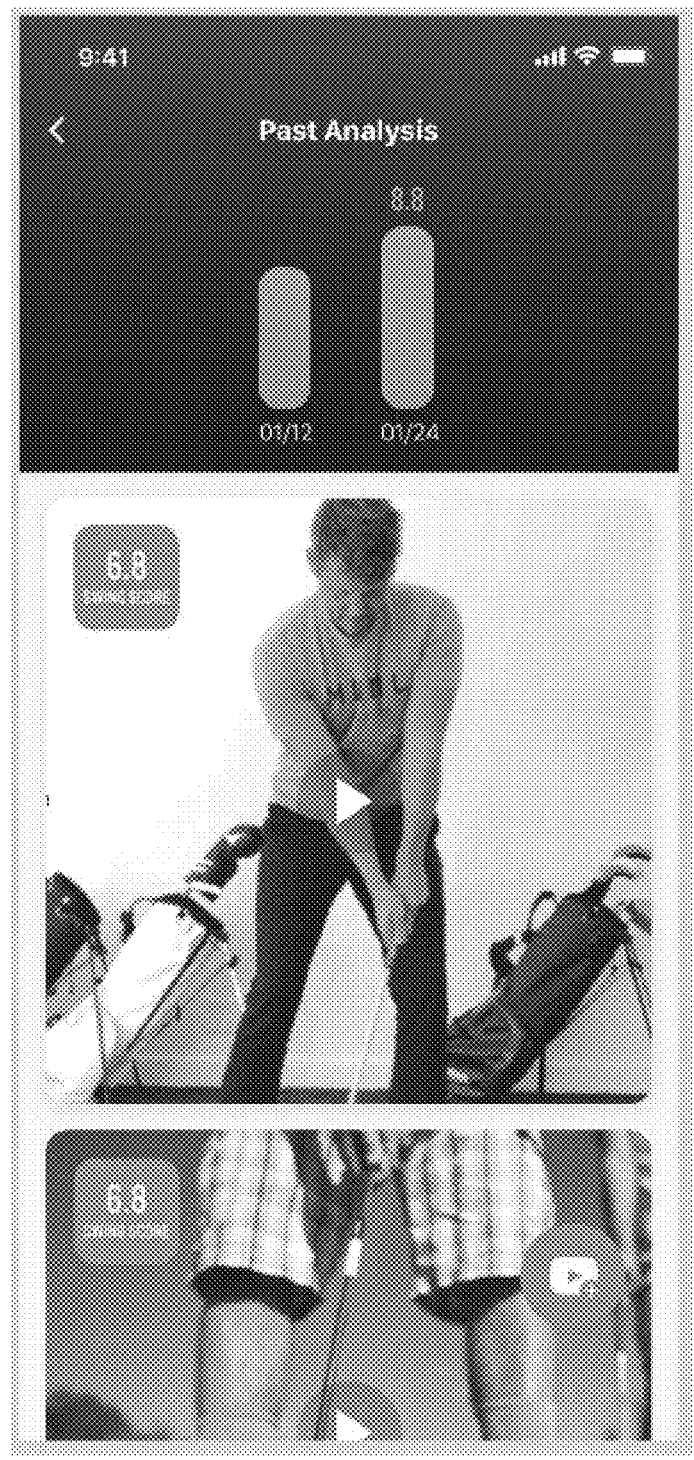
FIG. 36 shows a non-limiting golf swing analysis GUI; in this case, a GUI for accessing past analyses.
Figure 37:
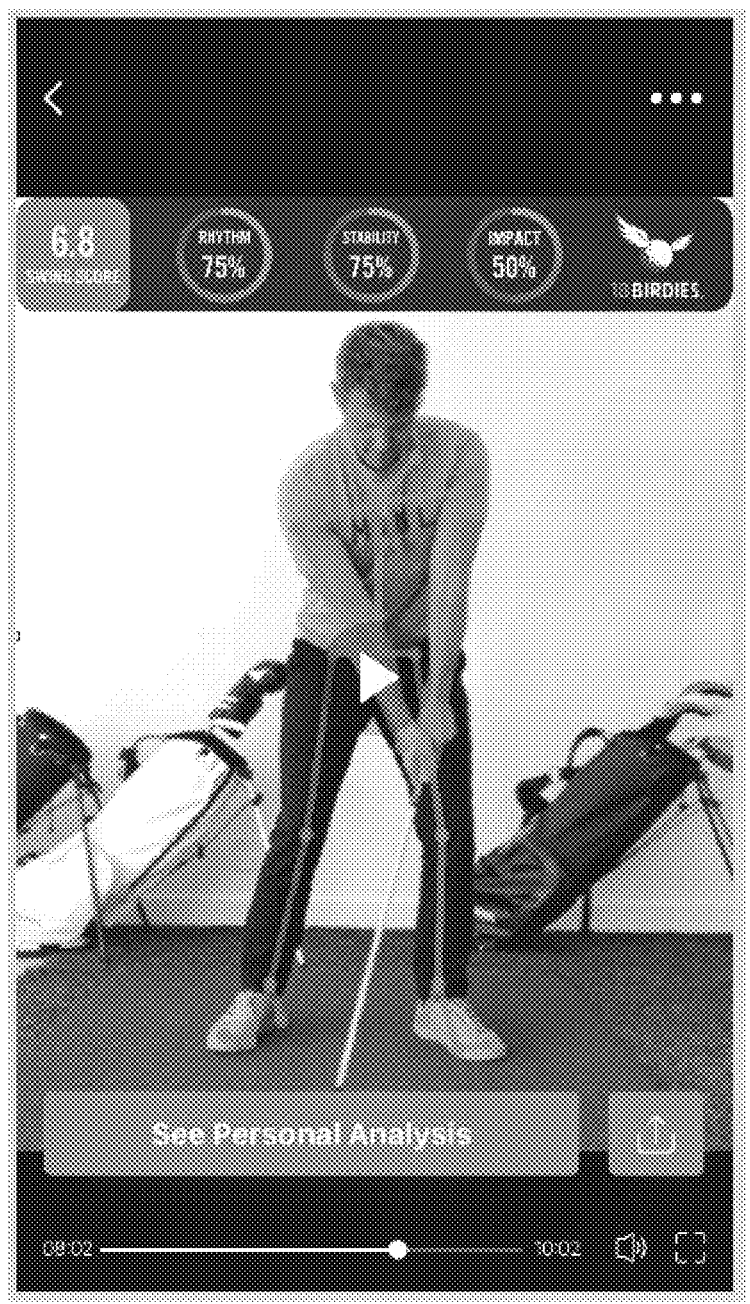
FIG. 37 shows a non-limiting golf swing analysis GUI; in this case, a GUI for viewing a personal analysis.
Figure 38:
FIG. 38 shows a non-limiting golf swing analysis GUI; in this case, a GUI for comparing a personal analysis to an analysis of a professional.
Figure 39:
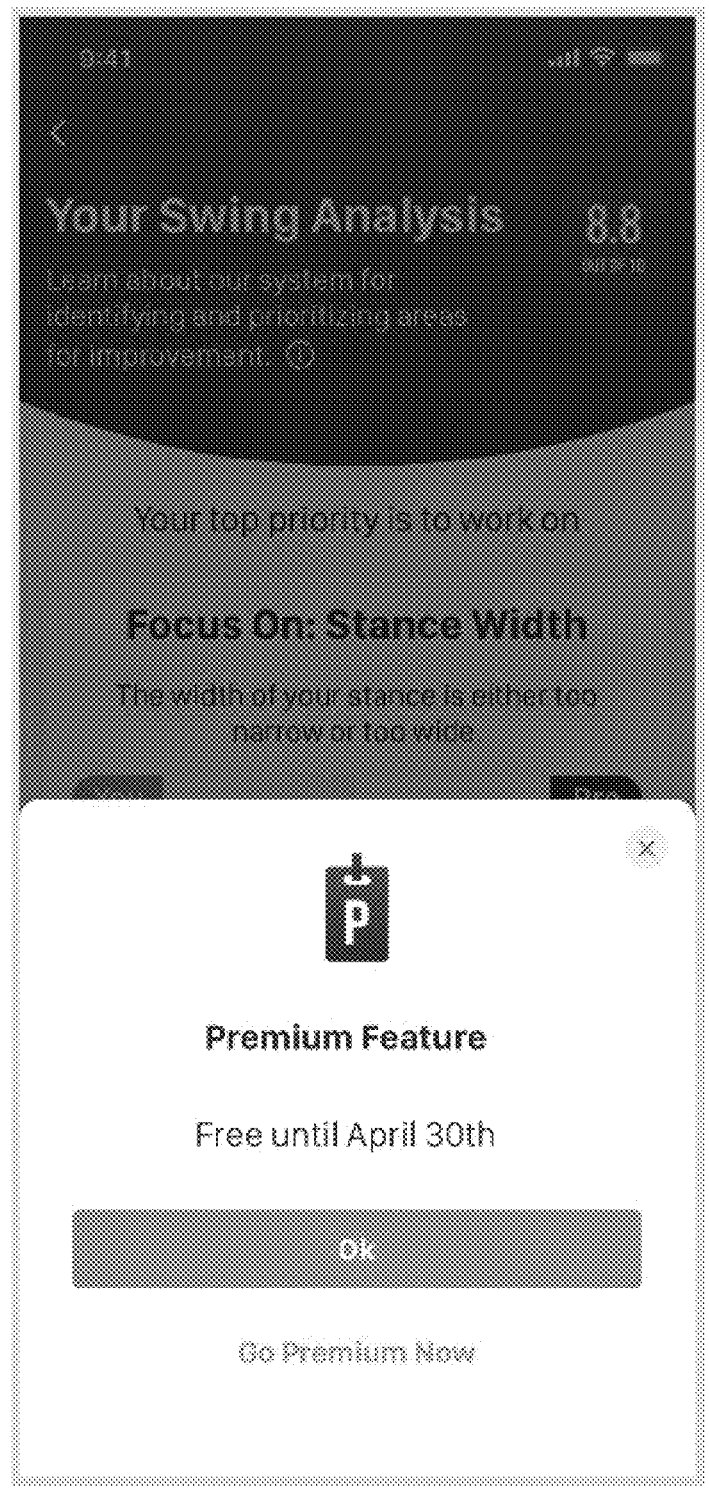
FIG. 39 shows a non-limiting golf swing analysis GUI; in this case, a GUI for notifying that a swing analysis is a premium feature available for a set time.
Figure 40:
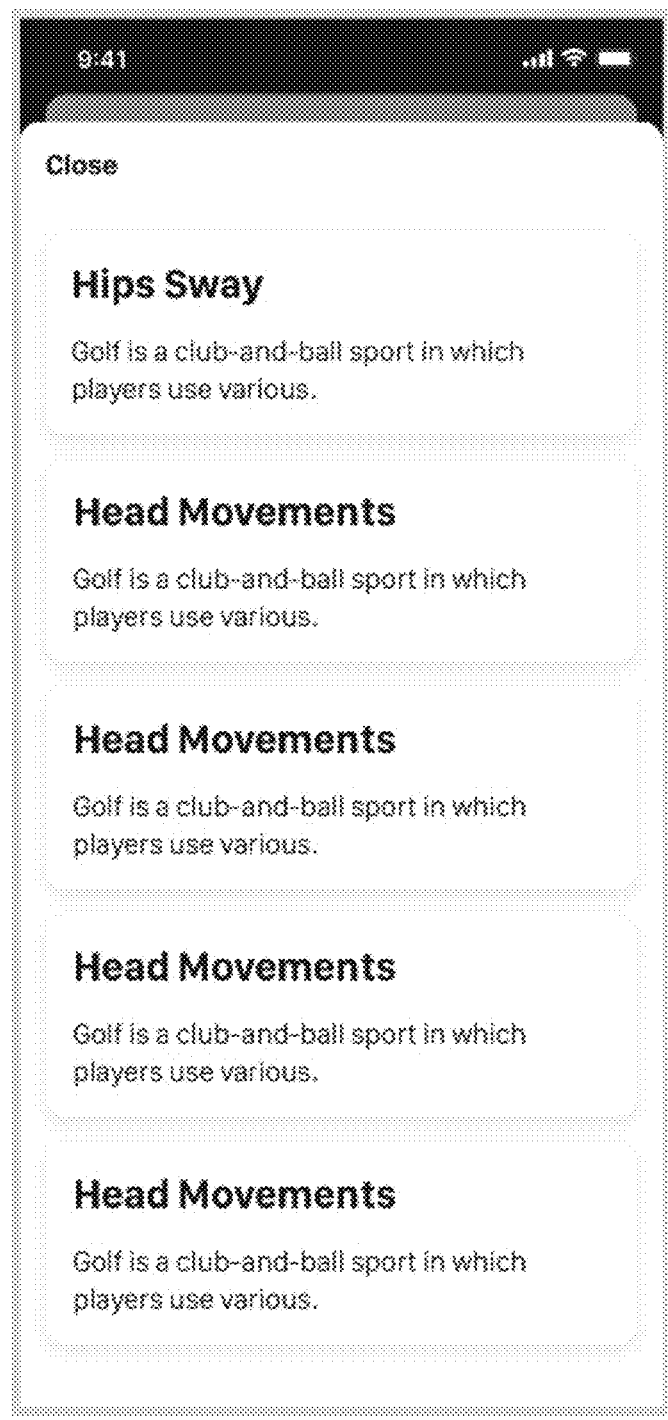
FIG. 40 shows a non-limiting golf swing analysis GUI; in this case, a GUI for describing body movements.
Figure 41:
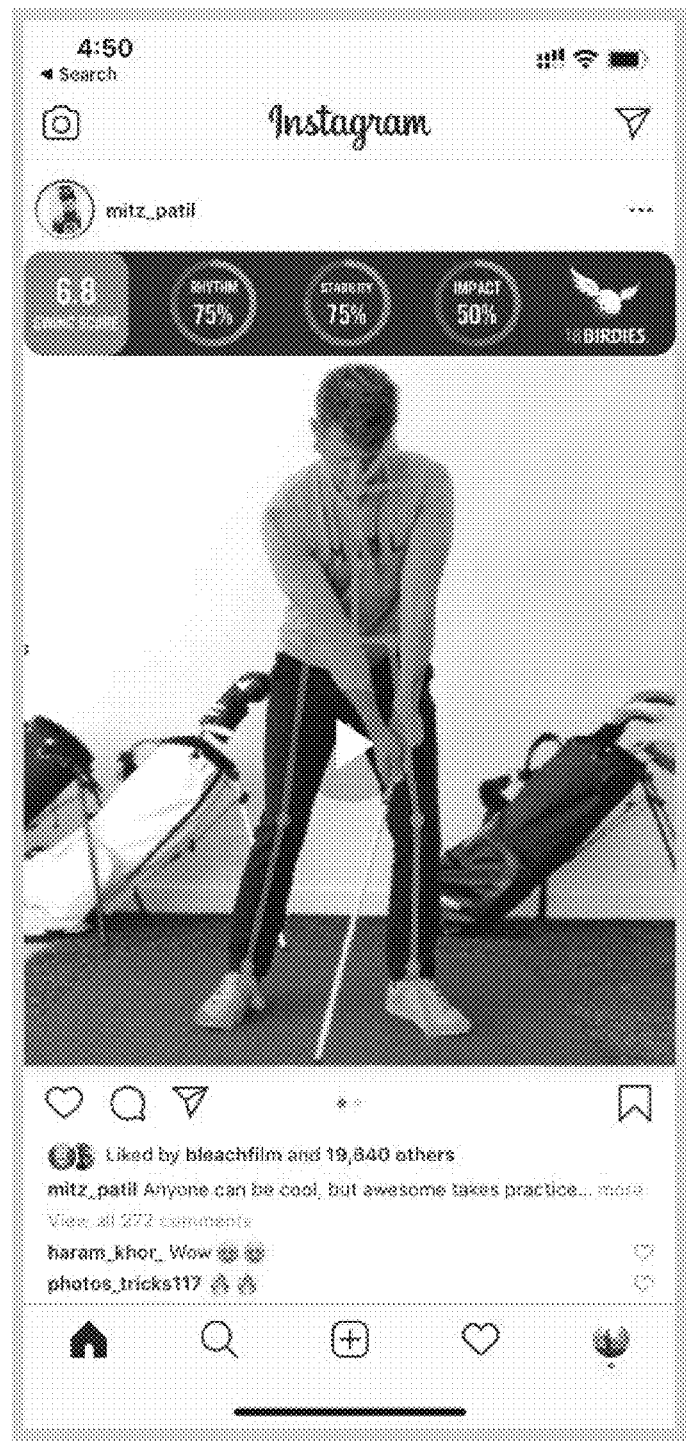
FIG. 41 shows a non-limiting golf swing analysis GUI; in this case, a GUI for sharing an analysis via a social media network.
Figure 42:
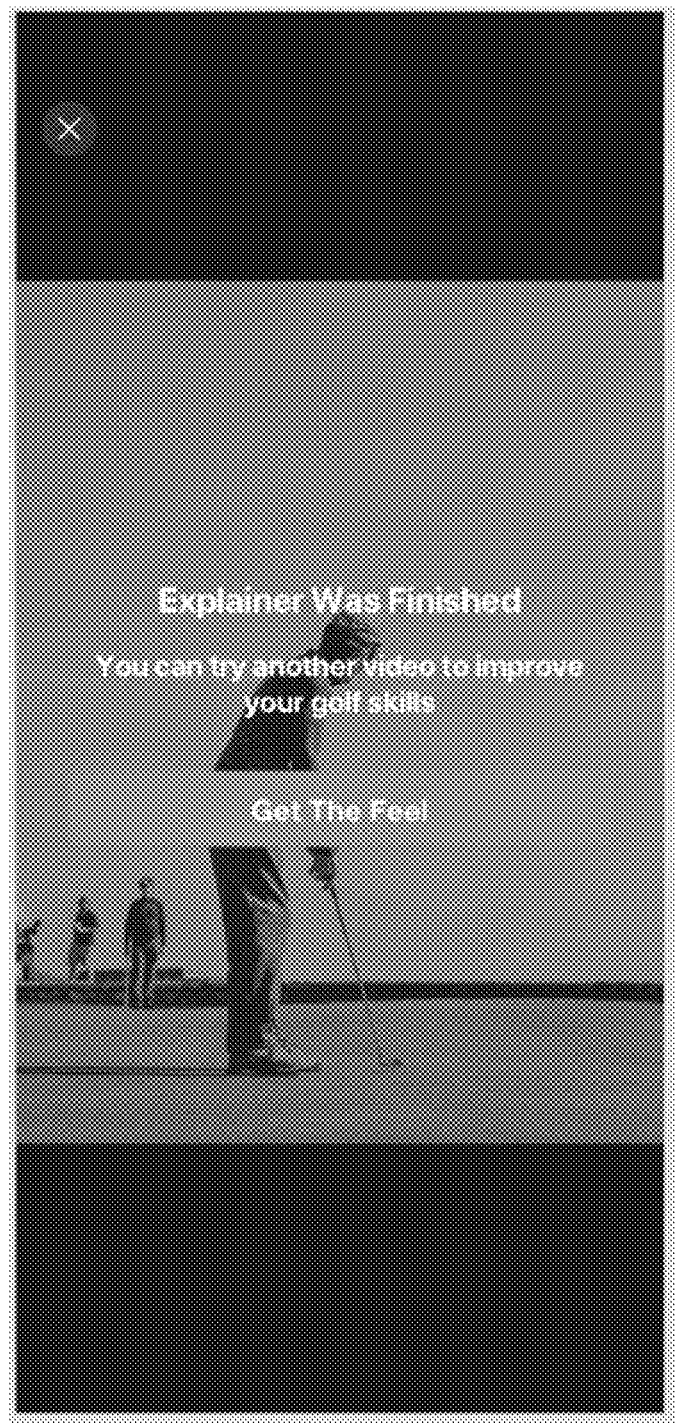
FIG. 42 shows a non-limiting golf swing analysis GUI; in this case, a GUI for notifying that the explainer video has ended.
Figure 43:
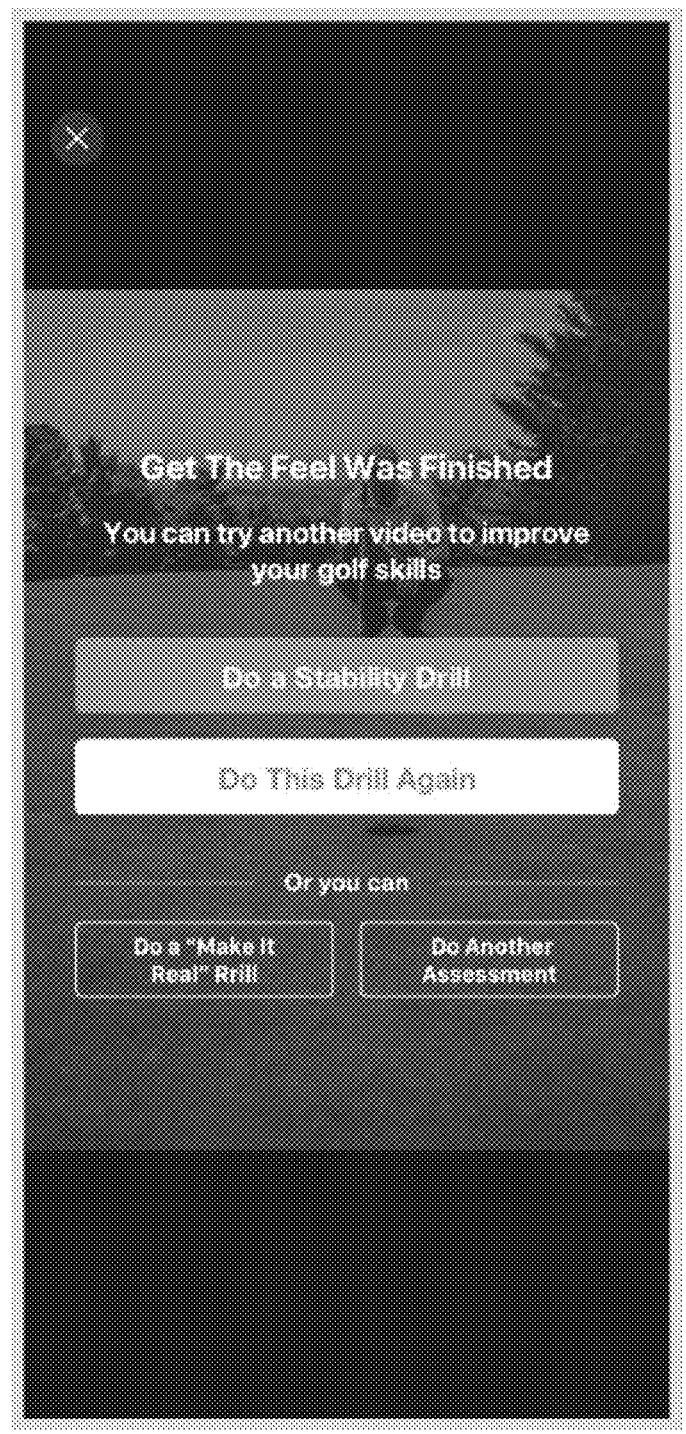
FIG. 43 shows a non-limiting golf swing analysis GUI; in this case, a GUI for selecting a next drill or assessment.
Figure 44:
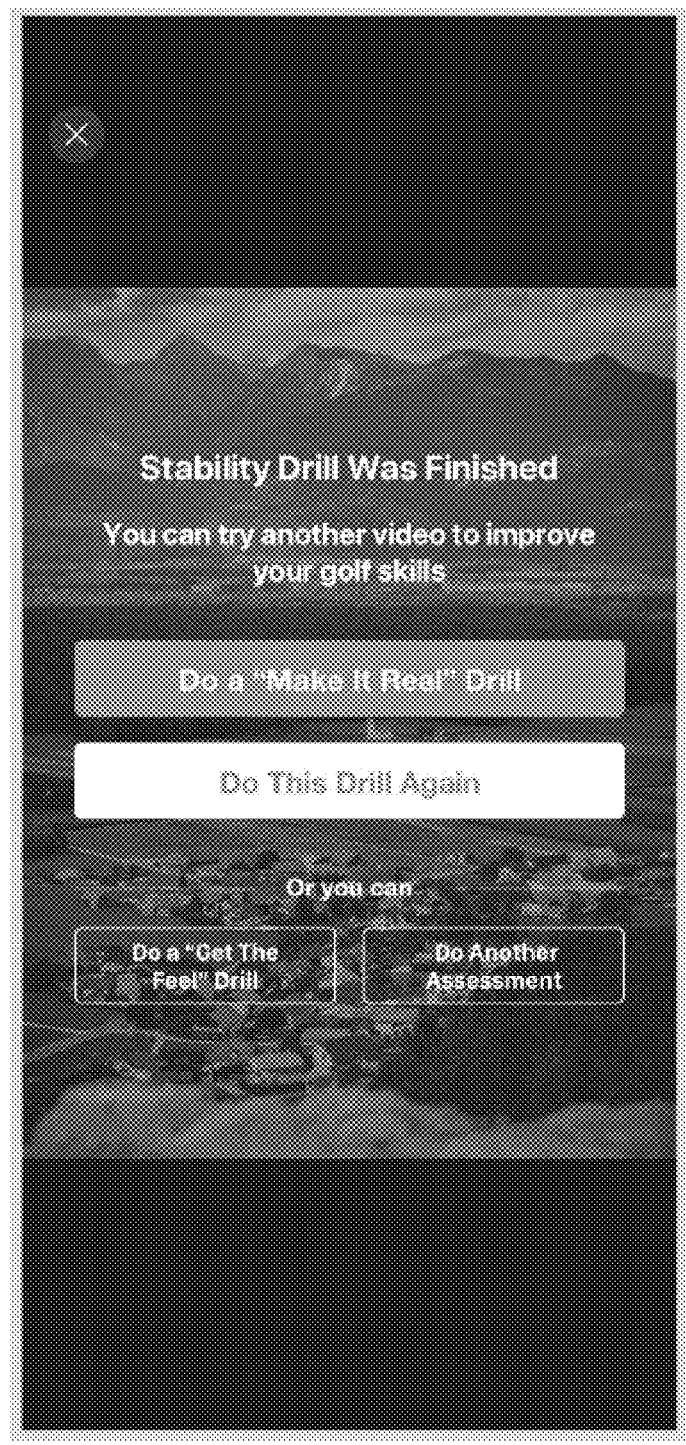
FIG. 44 shows a non-limiting golf swing analysis GUI; in this case, a GUI for notifying a user that their drill is complete.
Figure 45:
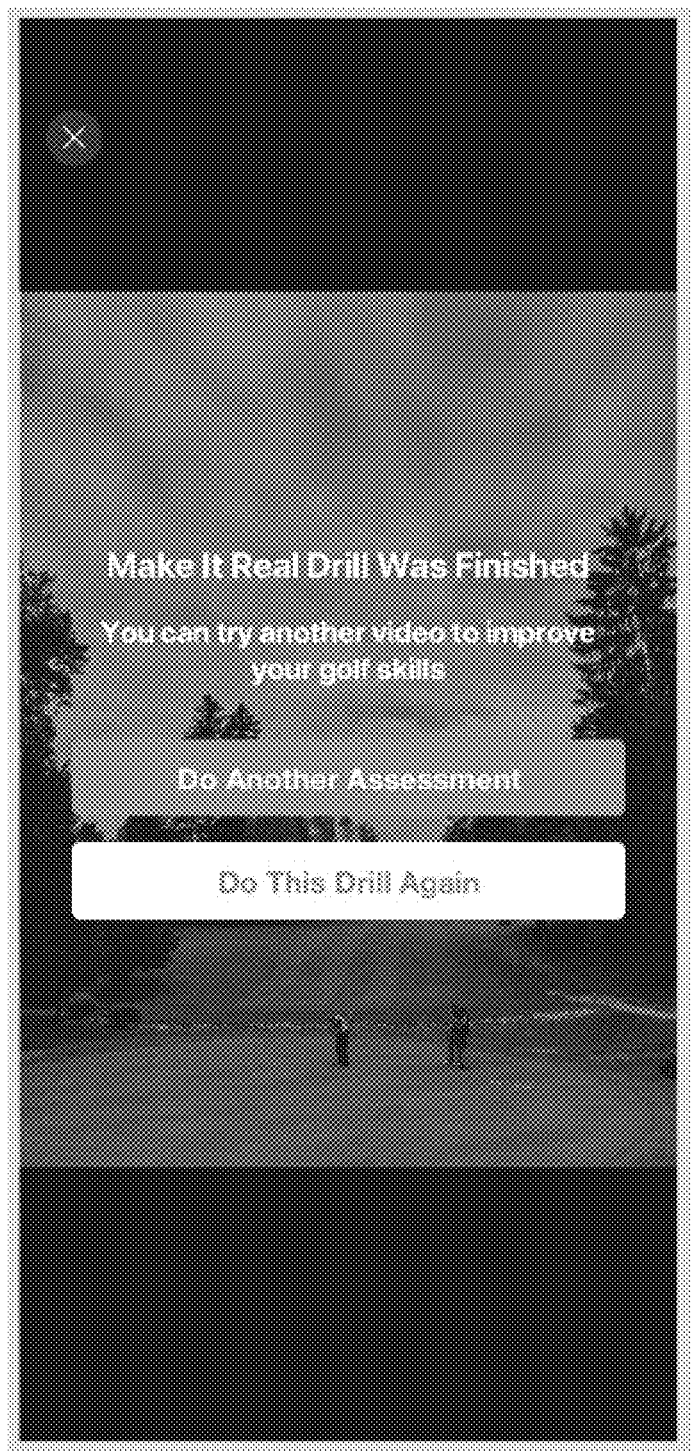
FIG. 45 shows a non-limiting golf swing analysis GUI; in this case, a GUI for allowing a user to repeat a drill.
Figure 46:
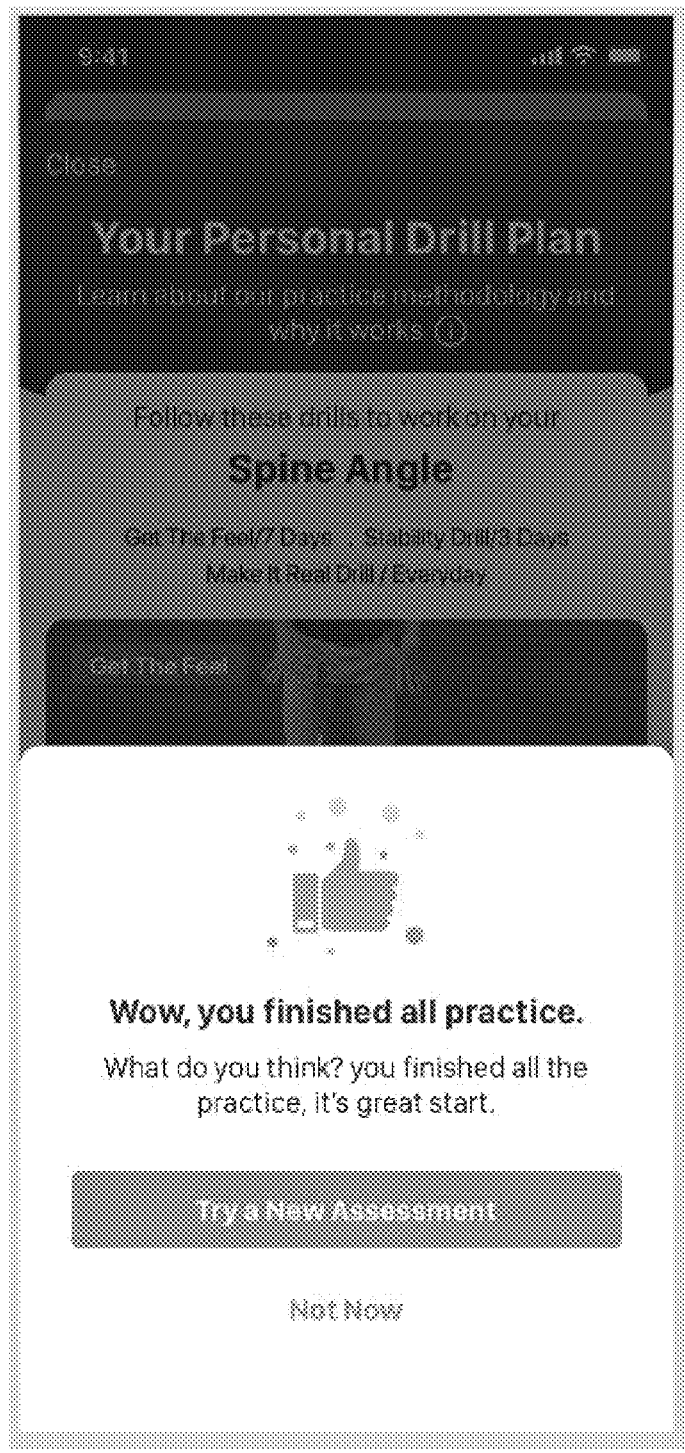
FIG. 46 shows a non-limiting golf swing analysis GUI; in this case, a GUI for a notification that all practices are complete.

FIGS. 4-46 show non-limiting graphical user interfaces (GUIs) associated with the platforms, systems, applications, media, and methods described herein. In some embodiments, per FIG. 4, the GUI provides recommendations and a reviews for golf courses. In some embodiments, per FIG. 5, the GUI allows a user to view a swing video. In some embodiments, per FIG. 6, the GUI allows a user to start a swing video. In some embodiments, per FIG. 7, the GUI presents a user with a first home screen. In some embodiments, per FIG. 8, the GUI presents a user with a second home screen. The example GUIs shown in FIGS. 6-8 include a "Get Started with a Swing Video" button that launches a video swing evaluation process described herein. In some embodiments, per FIG. 9, the GUI displays instructions for recording a golf swing video and includes a record button to start recording the video. In some embodiments, per FIG. 10, the GUI allows a user to record a golf swing video and includes markers to help frame and align the camera. In some embodiments, per FIG. 11, the GUI allows a user to view a golf swing video. In some embodiments, per FIG. 12, the GUI allows a user to view individual frames of a golf swing video. In some embodiments, per FIG. 13, the GUI allows a user to modify input variables associated with the golf swing video including, for example video style (e.g., down the line or face on), preferred hand (e.g., right hand or left hand), and club information (e.g., driver or iron). Further, as shown in FIG. 13, the GUI includes a "Start to Analyze your Video" button, which launches an analysis as described herein. In some embodiments, per FIG. 14, the GUI provides a notification that the golf swing video is be uploaded and includes elements allowing access to past analyses conducted. In some embodiments, per FIG. 15, the GUI provides a notification of a video upload speed improvement upon an upgraded membership. In some embodiments, per FIG. 16, the GUI allows a user to view a process queue for upload a golf swing video for a regular user. In some embodiments, per FIG. 17, the GUI allows a user to view a process queue for upload a golf swing video for a premium user. In some embodiments, per FIG. 18, the GUI allows a user to view the results of the analysis of the golf swing video; in this case, the results include a swing score and ratings for rhythm, stability, and impact. In some embodiments, per FIG. 19, the GUI displays a video analysis error; in this case, the video analysis algorithm could not detect a player (e.g., a person) in the video and the GUI includes a "Retake Video to Analyze" button. In some embodiments, per FIG. 20, the GUI allows a user to access a swing analyzer, past analyses (for comparison), and recommended drills. In some embodiments, per FIG. 21, the GUI allows a user to view a swing score and access a recommended drill based on the results of the analysis as well as past drill plans. In some embodiments, per FIG. 22, the GUI allows a user to view a swing analyzer without past drill plans. In some embodiments, per FIG. 23, the GUI allows a user to view scores of past analyses to see changes over time and even view past videos. In some embodiments, per FIG. 24, the GUI allows a user to start a new assessment or practice video. In some embodiments, per FIG. 25, the GUI allows a user to view videos of past analyses. In some embodiments, per FIG. 26, the GUI allows a user to view a personal analysis. In some embodiments, per FIG. 27, the GUI displays an analysis improvement notification. In some embodiments, per FIG. 28, the GUI displays one or more ways to improve a golf swing; in this case, the GUI includes a side-by-side comparison with a golf pro and identifies the top priority aspect of the swing that needs improvement as well as additional lower priority aspects. In some embodiments, per FIG. 29, the GUI provides a user with a swing focus goal. In some embodiments, per FIG. 30, the GUI allows a user to display a personal drill plan. In some embodiments, per FIG. 31, the GUI allows a user to display past drill plans. In some embodiments, per FIG. 32, the GUI displays a notification of a number of non-premium videos remaining. In some embodiments, per FIG. 33, displays a notification that a premium feature is free for a certain period. In some embodiments, per FIG. 34, the GUI allows a user to access videos of drills. In some embodiments, per FIG. 35, the GUI displays a notification regard swing rate rules. In some embodiments, per FIG. 36, the GUI allows a user to access past analyses. In some embodiments, per FIG. 37, the GUI allows a user to view a personal analysis wherein the video is overlaid with a skeleton of connected body points to illustrate body mechanics. In some embodiments, per FIG. 38, the GUI allows a user to compare a personal analysis to an analysis of a golf professional. In some embodiments, per FIG. 39, the GUI displays a notification that a swing analysis is a premium feature available for a set time. In some embodiments, per FIG. 40, the GUI displays descriptions of body movements. In some embodiments, per FIG. 41, the GUI allows a user to share an analysis via a social media network. In some embodiments, per FIG. 42, the GUI provides a notification that the explainer video has ended. In some embodiments, per FIG. 43, the GUI allows a user to select a next drill or assessment. In some embodiments, per FIG. 44, the GUI notifies a user that that their drill is complete. In some embodiments, per FIG. 45, the GUI allows a user to repeat a drill. FIG. 46, the GUI provides a notification that all practices are complete.

Certain Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

Computing System

Figure 47:
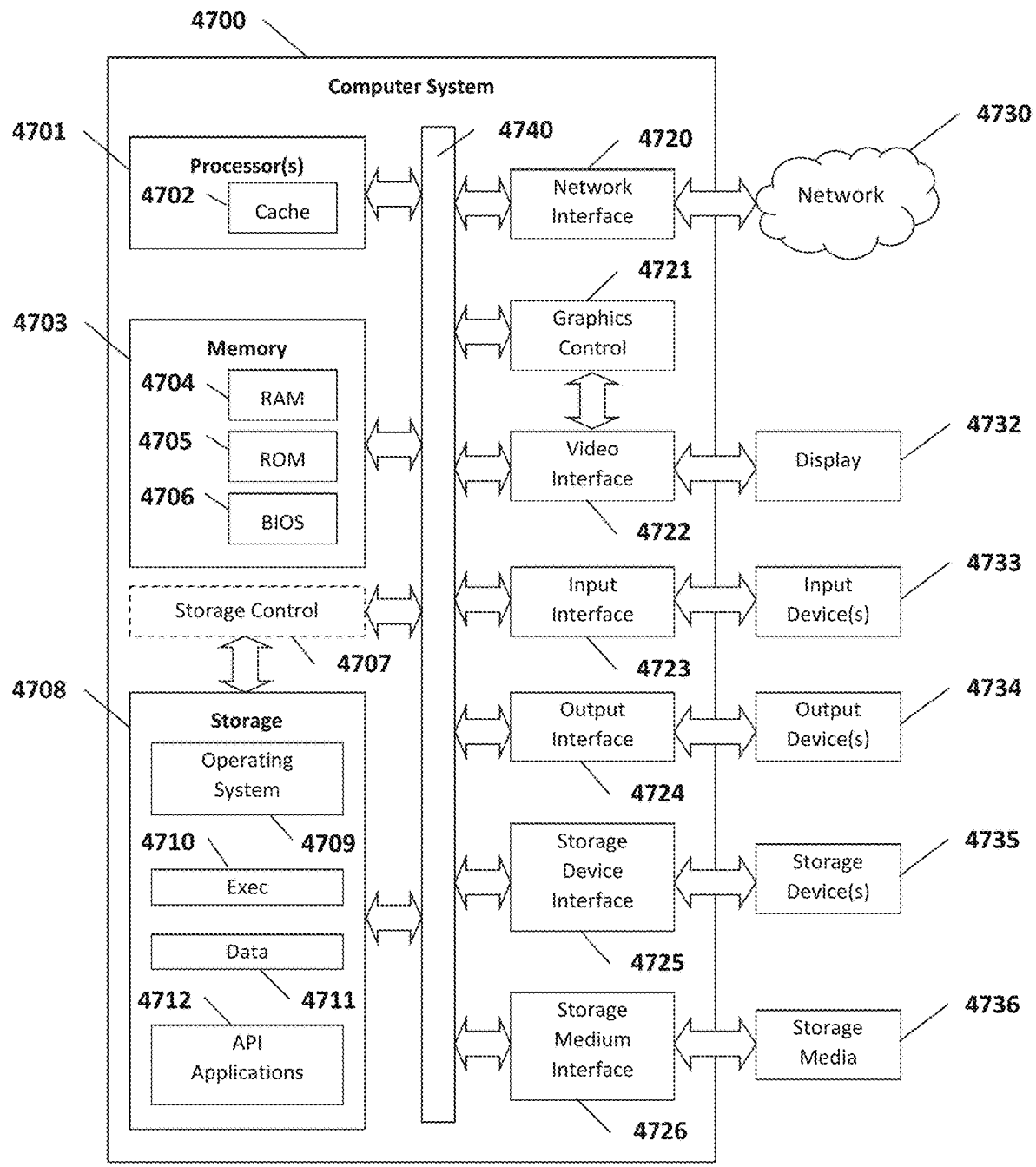
FIG. 47 shows a non-limiting example of a computing device; in this case, a device with one or more processors, memory, storage, and a network interface.

Referring to FIG. 47, a block diagram is shown depicting an exemplary machine that includes a computer system 4700 (e.g., a processing or computing system) within which a set of instructions can execute for causing a device to perform or execute any one or more of the aspects and/or methodologies for static code scheduling of the present disclosure. The components in FIG. 47 are examples only and do not limit the scope of use or functionality of any hardware, software, embedded logic component, or a combination of two or more such components implementing particular embodiments.

Computer system 4700 may include one or more processors 4701, a memory 4703, and a storage 4708 that communicate with each other, and with other components, via a bus 4740. The bus 4740 may also link a display 4732, one or more input devices 4733 (which may, for example, include a keypad, a keyboard, a mouse, a stylus, etc.), one or more output devices 4734, one or more storage devices 4735, and various tangible storage media 4736. All of these elements may interface directly or via one or more interfaces or adaptors to the bus 4740. For instance, the various tangible storage media 4736 can interface with the bus 4740 via storage medium interface 4726. Computer system 4700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 4700 includes one or more processor(s) 4701 (e.g., central processing units (CPUs), general purpose graphics processing units (GPGPUs), or quantum processing units (QPUs)) that carry out functions. Processor(s) 4701 optionally contains a cache memory unit 4702 for temporary local storage of instructions, data, or computer addresses. Processor(s) 4701 are configured to assist in execution of computer readable instructions. Computer system 4700 may provide functionality for the components depicted in FIG. 47 as a result of the processor(s) 4701 executing non-transitory, processor-executable instructions embodied in one or more tangible computer-readable storage media, such as memory 4703, storage 4708, storage devices 4735, and/or storage medium 4736. The computer-readable media may store software that implements particular embodiments, and processor(s) 4701 may execute the software. Memory 4703 may read the software from one or more other computer-readable media (such as mass storage device(s) 4735, 4736) or from one or more other sources through a suitable interface, such as network interface 4720. The software may cause processor(s) 4701 to carry out one or more processes or one or more steps of one or more processes described or illustrated herein. Carrying out such processes or steps may include defining data structures stored in memory 4703 and modifying the data structures as directed by the software.

The memory 4703 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 4705), and any combinations thereof. ROM 4705 may act to communicate data and instructions unidirectionally to processor(s) 4701, and RAM 4704 may act to communicate data and instructions bidirectionally with processor(s) 4701. ROM 4705 and RAM 4704 may include any suitable tangible computer-readable media described below. In one example, a basic input/output system 4706 (BIOS), including basic routines that help to transfer information between elements within computer system 4700, such as during start-up, may be stored in the memory 4703.

Fixed storage 4708 is connected bidirectionally to processor(s) 4701, optionally through storage control unit 4707. Fixed storage 4708 provides additional data storage capacity and may also include any suitable tangible computer-readable media described herein. Storage 4708 may be used to store operating system 4709, executable(s) 4710, data 4711, applications 4712 (application programs), and the like. Storage 4708 can also include an optical disk drive, a solid-state memory device (e.g., flash-based systems), or a combination of any of the above. Information in storage 4708 may, in appropriate cases, be incorporated as virtual memory in memory 4703.

In one example, storage device(s) 4735 may be removably interfaced with computer system 4700 (e.g., via an external port connector (not shown)) via a storage device interface 4725. Particularly, storage device(s) 4735 and an associated machine-readable medium may provide non-volatile and/or volatile storage of machine-readable instructions, data structures, program modules, and/or other data for the computer system 4700. In one example, software may reside, completely or partially, within a machine-readable medium on storage device(s) 4735. In another example, software may reside, completely or partially, within processor(s) 4701.

Bus 4740 connects a wide variety of subsystems. Herein, reference to a bus may encompass one or more digital signal lines serving a common function, where appropriate. Bus 4740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 4700 may also include an input device 4733. In one example, a user of computer system 4700 may enter commands and/or other information into computer system 4700 via input device(s) 4733. Examples of an input device(s) 4733 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 4733 may be interfaced to bus 4740 via any of a variety of input interfaces 4723 (e.g., input interface 4723) including, but not limited to, serial, parallel, game port, USB, FIREWIRE, THUNDERBOLT, or any combination of the above.

In particular embodiments, when computer system 4700 is connected to network 4730, computer system 4700 may communicate with other devices, specifically mobile devices and enterprise systems, distributed computing systems, cloud storage systems, cloud computing systems, and the like, connected to network 4730. Communications to and from computer system 4700 may be sent through network interface 4720. For example, network interface 4720 may receive incoming communications (such as requests or responses from other devices) in the form of one or more packets (such as Internet Protocol (IP) packets) from network 4730, and computer system 4700 may store the incoming communications in memory 4703 for processing. Computer system 4700 may similarly store outgoing communications (such as requests or responses to other devices) in the form of one or more packets in memory 4703 and communicated to network 4730 from network interface 4720. Processor(s) 4701 may access these communication packets stored in memory 4703 for processing.

Examples of the network interface 4720 include, but are not limited to, a network interface card, a modem, and any combination thereof. Examples of a network 4730 or network segment 4730 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 4730, may employ a wired and/or a wireless mode of communication. In general, any network topology may be used.

Information and data can be displayed through a display 4732. Examples of a display 4732 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 4732 can interface to the processor(s) 4701, memory 4703, and fixed storage 4708, as well as other devices, such as input device(s) 4733, via the bus 4740. The display 4732 is linked to the bus 4740 via a video interface 4722, and transport of data between the display 4732 and the bus 4740 can be controlled via the graphics control 4721. In some embodiments, the display is a video projector. In some embodiments, the display is a head-mounted display (HIVID) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 4732, computer system 4700 may include one or more other peripheral output devices 4734 including, but not limited to, an audio speaker, a printer, a storage device, and any combinations thereof. Such peripheral output devices may be connected to the bus 4740 via an output interface 4724. Examples of an output interface 4724 include, but are not limited to, a serial port, a parallel connection, a USB port, a FIREWIRE port, a THUNDERBOLT port, and any combinations thereof.

In addition, or as an alternative, computer system 4700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony®PS3®, Sony® PS4®, Microsoft® Xbox 360®, Microsoft Xbox One, Nintendo® Wii®, Nintendo® Wii U®, and Ouya®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 48:
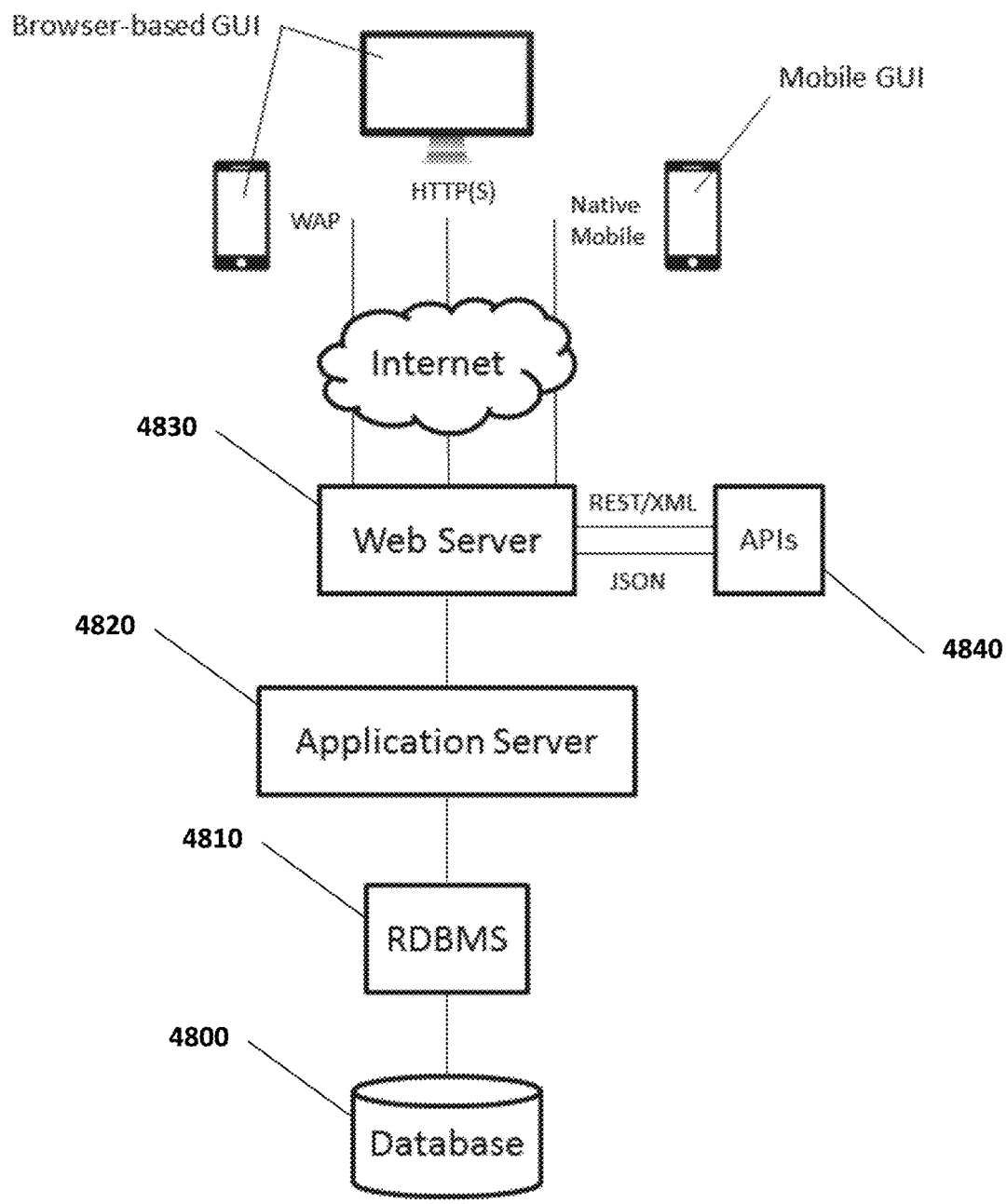
FIG. 48 shows a non-limiting example of a web/mobile application provision system; in this case, a system providing browser-based and/or native mobile user interfaces.

Referring to FIG. 48, in a particular embodiment, an application provision system comprises one or more databases 4800 accessed by a relational database management system (RDBMS) 4810. Suitable RDBMSs include Firebird, MySQL, PostgreSQL, SQLite, Oracle Database, Microsoft SQL Server, IBM DB2, IBM Informix, SAP Sybase, Teradata, and the like. In this embodiment, the application provision system further comprises one or more application severs 4820 (such as Java servers, .NET servers, PHP servers, and the like) and one or more web servers 4830 (such as Apache, IIS, GWS and the like). The web server(s) optionally expose one or more web services via app application programming interfaces (APIs) 4840. Via a network, such as the Internet, the system provides browser-based and/or mobile native user interfaces.

Figure 49:
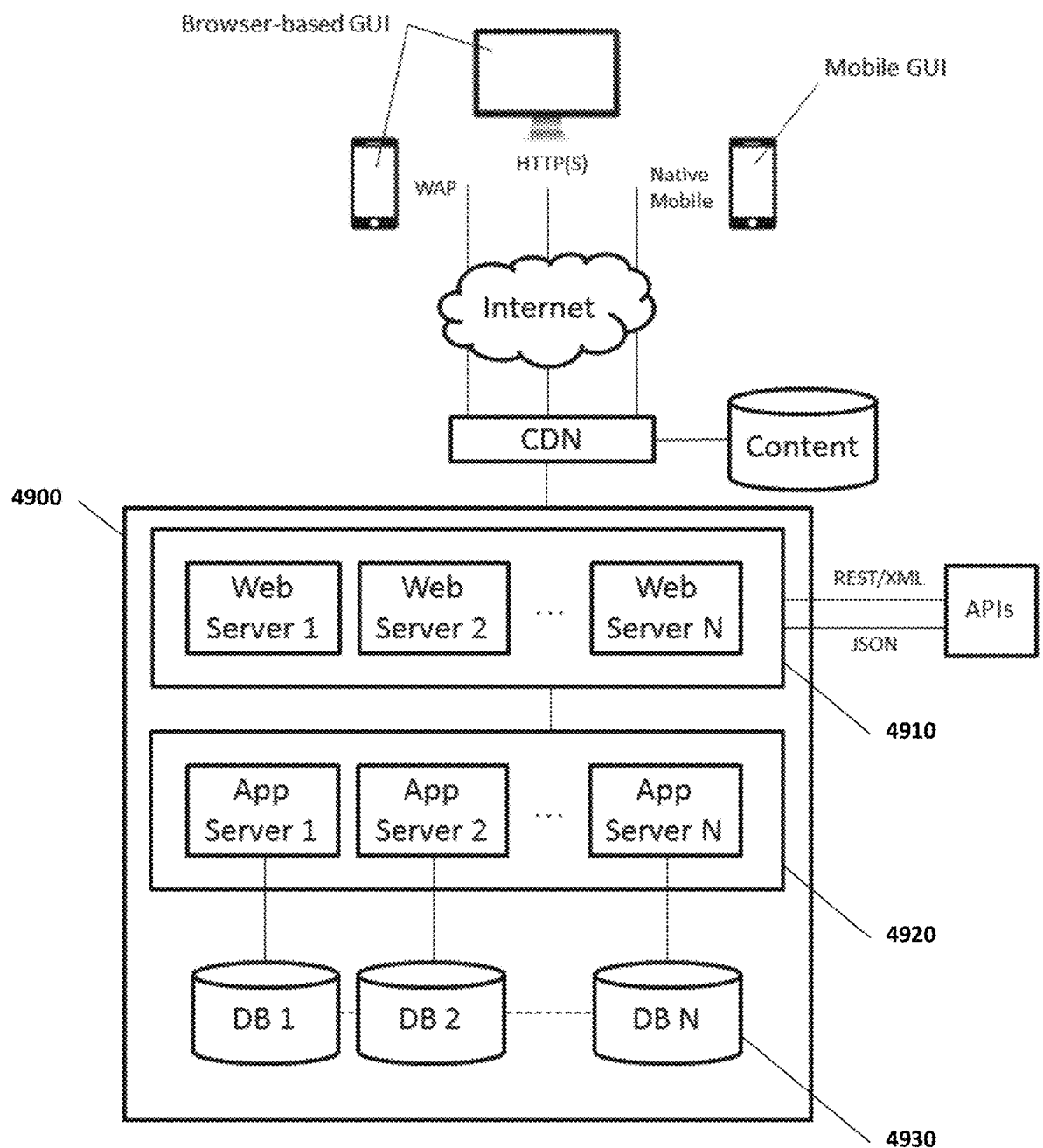
FIG. 49 shows a non-limiting example of a cloud-based web/mobile application provision system; in this case, a system comprising an elastically load balanced, auto-scaling web server and application server resources as well synchronously replicated databases.

Referring to FIG. 49, in a particular embodiment, an application provision system alternatively has a distributed, cloud-based architecture 4900 and comprises elastically load balanced, auto-scaling web server resources 4910 and application server resources 4920 as well synchronously replicated databases 4930

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer® , Mozilla® Firefox , Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSPTM browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of golfer, video, keyframe, swing, score, flaw, drill, and training information. In various embodiments, suitable databases include, by way of non-limiting examples, relational databases, non-relational databases, object oriented databases, object databases, entity-relationship model databases, associative databases, XML databases, and document oriented databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A platform comprising a client device and a back-end computing infrastructure:
   a) the client device comprising at least one processor and instructions executable to cause the client device to perform at least the following:
      i) capture a video of an individual performing a golf swing; and
      ii) upload the video to the back-end computing infrastructure;
   b) the back-end computing infrastructure comprising at least one processor and instructions executable to cause the back-end computing infrastructure to perform at least the following:
      i) receive the video uploaded by the client device;
      ii) apply an image processing algorithm to perform at least:
         1. identify a plurality of body nodes of the individual in a plurality of frames of the video; and
         2. generate a virtual skeleton by connecting the plurality of body nodes in the plurality of frames of the video;
      iii) identify a plurality of key frames of the video;
      iv) apply at least one mathematical swing flaw evaluation to each key frame of the video to identify any swing flaws of the individual;
      v) calculate a swing tempo based at least in part on the plurality of body nodes in the plurality of frames of the video, wherein the at least one mathematical swing flaw evaluation comprises a swing tempo evaluation;
      vi) generate a swing score for the individual; and
      vii) provide access to one or more training modules based at least on any swing flaws of the individual identified and the swing score for the individual.

2. The platform of claim 1, wherein the video is captured from a down-the-line perspective.

3. The platform of claim 1, wherein the video is captured from a face-on perspective.

4. The platform of claim 1, wherein the back-end computing infrastructure is configured to perform data compression processing on the video uploaded by the client device.

5. The platform of claim 1, wherein the back-end computing infrastructure is configured to persist video data pertaining to the video uploaded by the client device to a data storage system.

6. The platform of claim 1, wherein the plurality of body nodes comprise one or more of: nose, neck, mid hip, right ear, right eye, right shoulder, right elbow, right wrist, right hip, right knee, right ankle, left ear, left eye, left shoulder, left elbow, left wrist, left hip, left knee, and left ankle.

7. The platform of claim 1, wherein the plurality of body nodes comprise at least 10, at least 15, at least 20, or at least 25 body nodes.

8. The platform of claim 1, wherein the back-end computing infrastructure is configured to identify one or more of a golf club head and a golf club shaft in the plurality of frames of the video.

9. The platform of claim 1, wherein the back-end computing infrastructure is configured to identify a golf ball in the plurality of frames of the video.

10. The platform of claim 1, wherein the back-end computing infrastructure is configured to identify three key frames of the video.

11. The platform of claim 1, wherein the plurality of key frames are identified at least in part by generating a function graph of distance from wrist body node to heel body node vs. video frame.

12. The platform of claim 1, wherein the plurality of key frames comprise: a set-up frame, a top of back-swing frame, and an impact frame.

13. The platform of claim 12, wherein the at least one mathematical swing flaw evaluation applied to the set-up frame comprises one or more of: a shaft plane evaluation, a spine angle evaluation, a stance width evaluation, and a hand position evaluation.

14. The platform of claim 12, wherein the at least one mathematical swing flaw evaluation applied to the top of back-swing frame comprises one or more of: a head movement evaluation, a spine angle evaluation, a posterior position evaluation, a hip sway evaluation, and a hip rotation evaluation.

15. The platform of claim 12, wherein the at least one mathematical swing flaw evaluation applied to the impact frame comprises one or more of: a head movement evaluation, a spine angle evaluation, a posterior position evaluation, a hand placement evaluation, a hip rotation evaluation, and a hip sway evaluation.

16. The platform of claim 1, wherein the at least one mathematical swing flaw evaluation comprises at least 10 or at least 15 mathematical swing flaw evaluations.

17. The platform of claim 1, wherein the swing score comprises one or more of: a rhythm score, a stability score, an impact score, and an overall score.

18. The platform of claim 1, wherein the back-end computing infrastructure is configured to generate a list of one or more ranked swing flaws.

19. The platform of claim 18, wherein the one or more training modules address the one or more ranked swing flaws in rank order.

20. The platform of claim 1, wherein the one or more training modules comprise an instructional video.

21. The platform of claim 1, wherein the one or more training modules comprise one or more drills.

* * * * *